(12) United States Patent
Sakamoto et al.

(10) Patent No.: US 8,264,822 B2
(45) Date of Patent: Sep. 11, 2012

(54) IMAGE DISPLAY APPARATUS AND HOUSING ASSEMBLY CONFIGURATION

(75) Inventors: Michitaka Sakamoto, Kanagawa-ken (JP); Shigehiro Masuji, Tokyo-to (JP); Takenori Yaguchi, Kanagawa-ken (JP); Hideki Hoshino, Kanagawa-ken (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 247 days.

(21) Appl. No.: 12/662,048

(22) Filed: Mar. 29, 2010

(65) Prior Publication Data

US 2010/0265638 A1  Oct. 21, 2010

(30) Foreign Application Priority Data

| Mar. 30, 2009 | (JP) | ............................... P2009-081573 |
| Apr. 2, 2009 | (JP) | ............................... P2009-089774 |
| Apr. 3, 2009 | (JP) | ............................... P2009-091276 |

(51) Int. Cl.
  *G06F 1/16* (2006.01)
(52) U.S. Cl. ................. 361/679.01; 248/419; 312/334.5; 165/104.13
(58) Field of Classification Search .................. 248/404, 248/477, 544, 419, 124.1; 361/695, 726, 361/679.33, 679.46, 679.5, 679.51, 679.01, 361/679.02, 679.08, 679.21; 312/223.1, 312/223.2, 265.1, 334.8, 334.5; 360/97.02, 360/69, 31; 165/104.33, 80.4, 104.13; 349/58, 349/65, 67
See application file for complete search history.

(56) References Cited

U.S. PATENT DOCUMENTS

| 7,280,352 B2 * | 10/2007 | Wilson et al. ............ 361/679.33 |
| 8,031,290 B2 * | 10/2011 | Fu ................................... 349/58 |
| 2005/0067550 A1 | 3/2005 | Kim et al. |

(Continued)

FOREIGN PATENT DOCUMENTS

EP  1 783 582 A1  5/2007

(Continued)

OTHER PUBLICATIONS

European Search Report, EPO Form 1507N, Application No. EP 10 00 3486, mailed on Feb. 16, 2011.

(Continued)

*Primary Examiner* — Hung Duong
(74) *Attorney, Agent, or Firm* — Nath, Goldberg & Meyer; Jerald L. Meyer; Stanley N. Protigal

(57) ABSTRACT

An image display apparatus includes an image display apparatus main body and a pedestal part supporting the image display apparatus main body. The image display main body has a display module, a center frame, a left R cover, a right R cover, and an upper pedestal fixing member connecting part. The display module displays an image on a front face. The center frame is connected to the back face of the display module, and a part thereof is exposed to the outside. The left R cover and the right R cover are connected to the center frame, and cover the back face of the display module. The upper pedestal fixing member connecting part is provided protruding backward from the center frame. The pedestal part has a bottom plate part, a pedestal fixing member, and an upper center frame connecting part. The pedestal fixing member is provided in the bottom plate part. The upper center frame connecting part is provided in the pedestal fixing member, and supports the image display apparatus main body via the upper pedestal fixing member connecting part.

10 Claims, 35 Drawing Sheets

U.S. PATENT DOCUMENTS

2008/0013272 A1* 1/2008 Bailey et al. .................. 361/685
2008/0094789 A1 4/2008 Lee
2008/0204624 A1 8/2008 Fu

FOREIGN PATENT DOCUMENTS

| EP | 2 224 278 A1 | 9/2010 |
| --- | --- | --- |
| JP | 2000-305066 A | 11/2000 |
| JP | 3097842 U | 2/2004 |
| JP | 3110945 U | 7/2005 |
| JP | 2005-352332 A | 12/2005 |
| JP | 2008-003149 A | 1/2008 |
| JP | 2008-298964 A | 12/2008 |
| WO | 2008/152920 A1 | 12/2008 |

OTHER PUBLICATIONS

Partial European Search Report issued Nov. 5, 2010, in counterpart European Application No. 10003486.7, eight (8) pages.

* cited by examiner

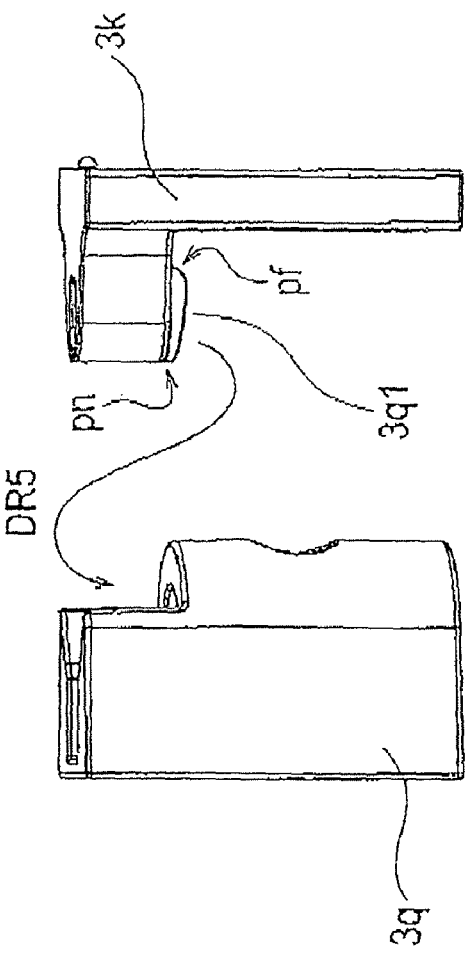
FIG. 21E
FIG. 21D
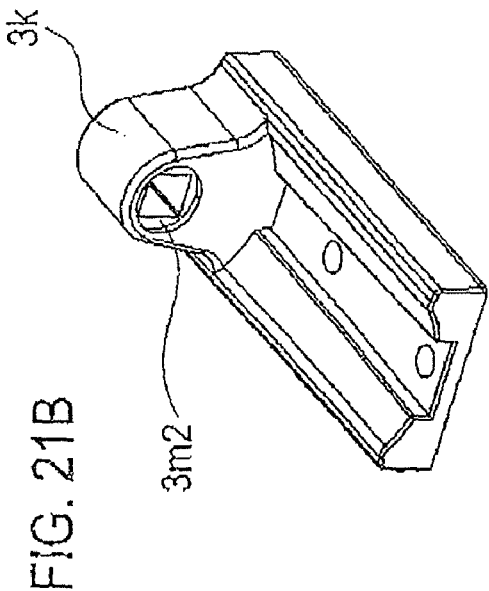
FIG. 21B
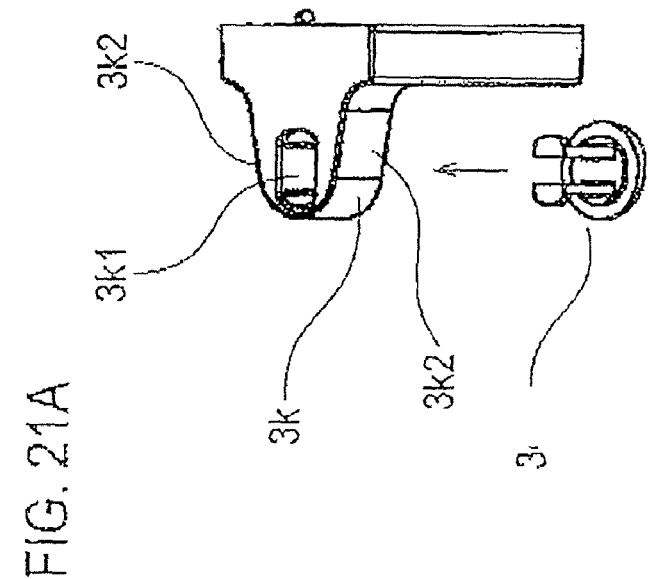
FIG. 21A
FIG. 21C

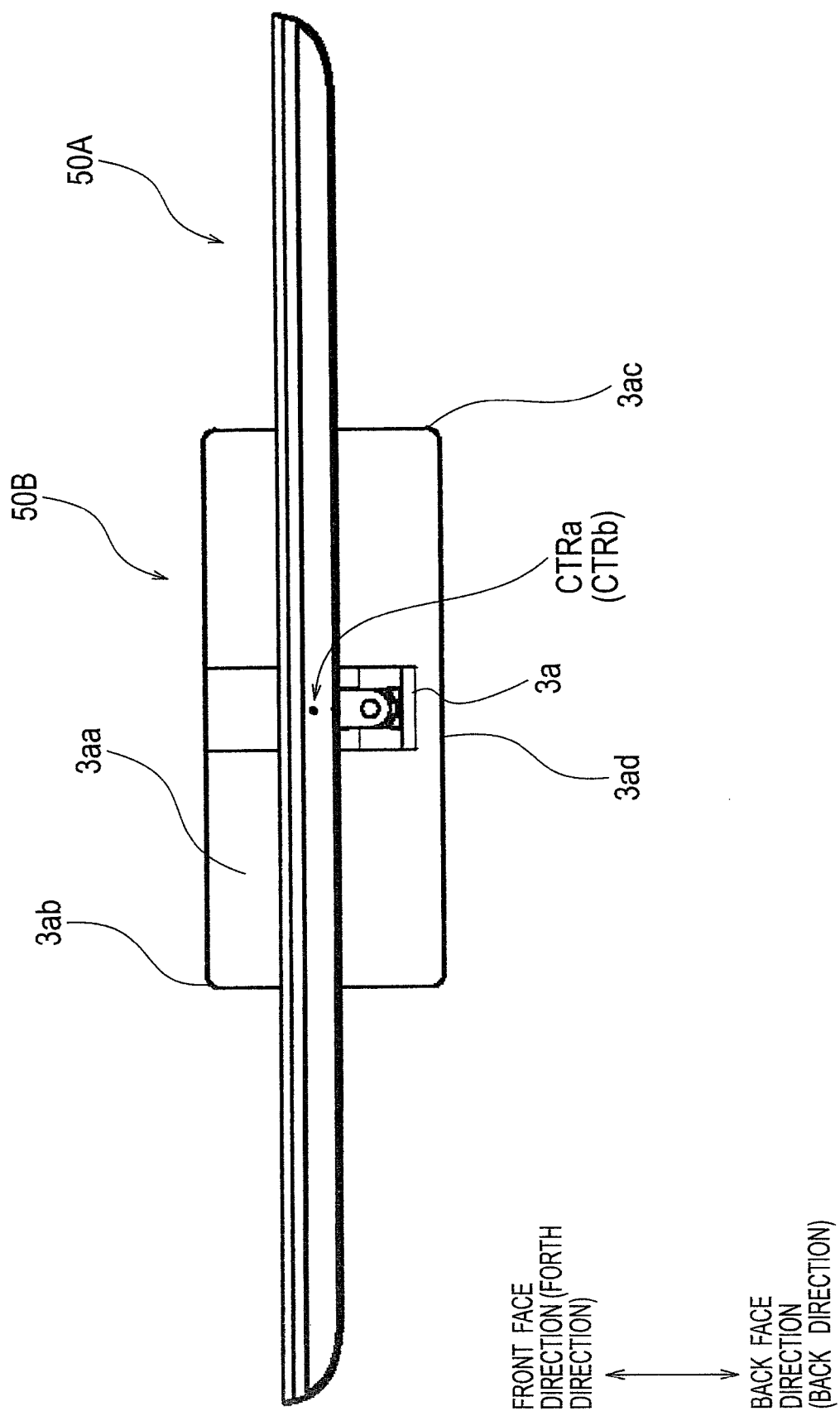

FIG. 32
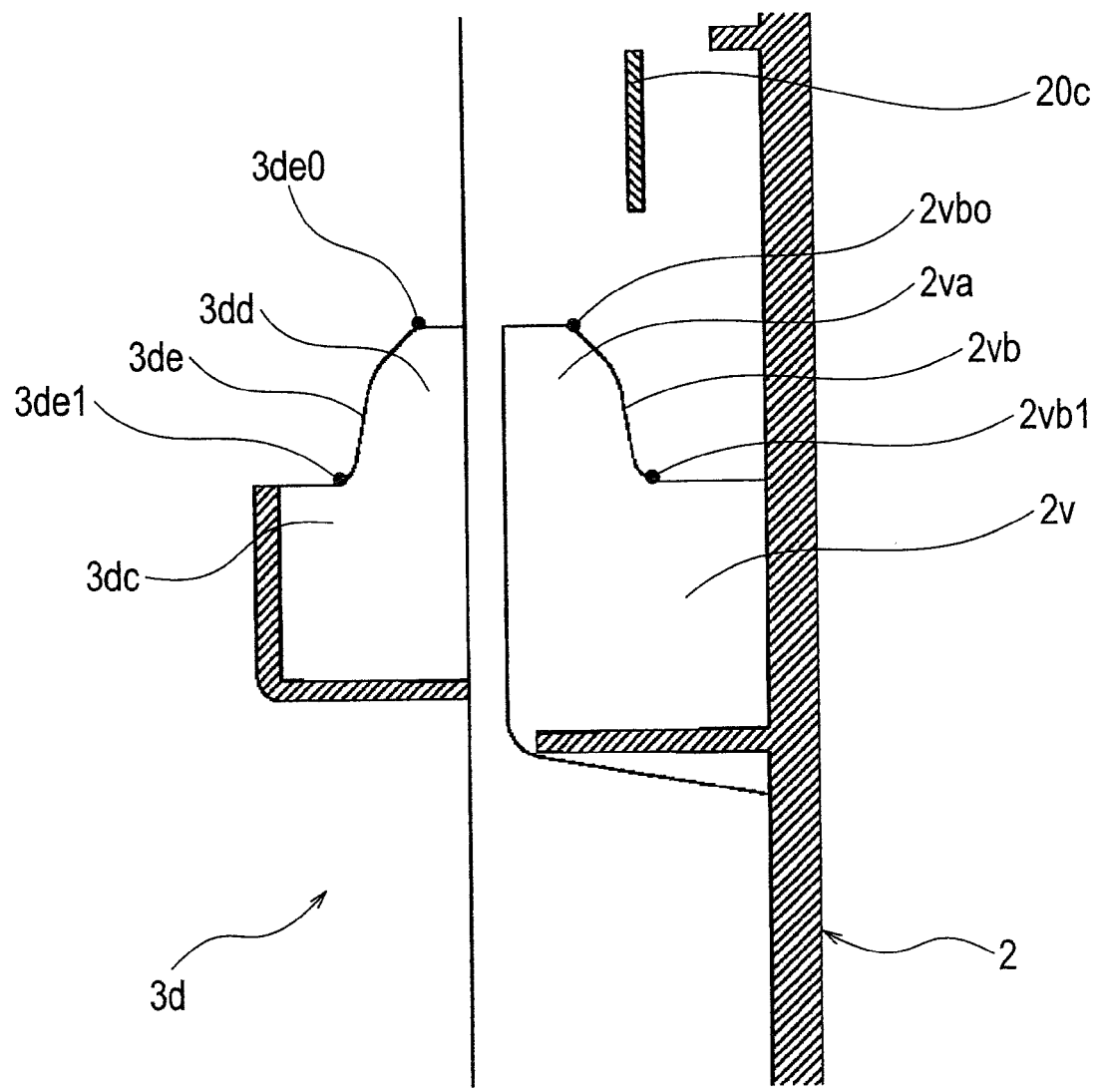
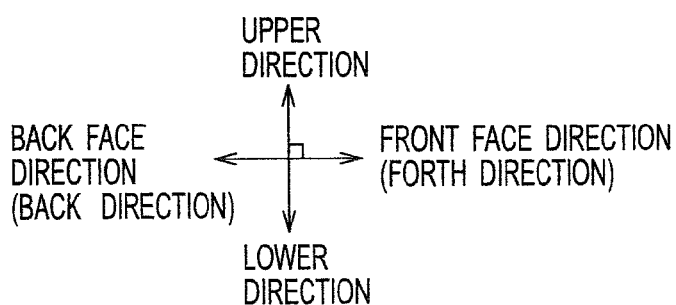

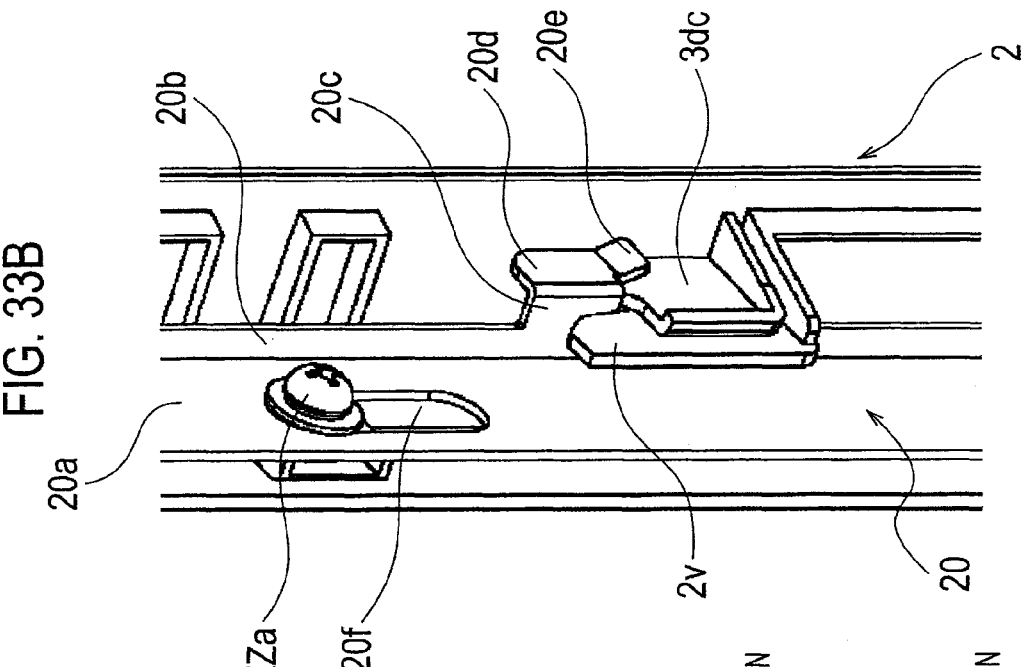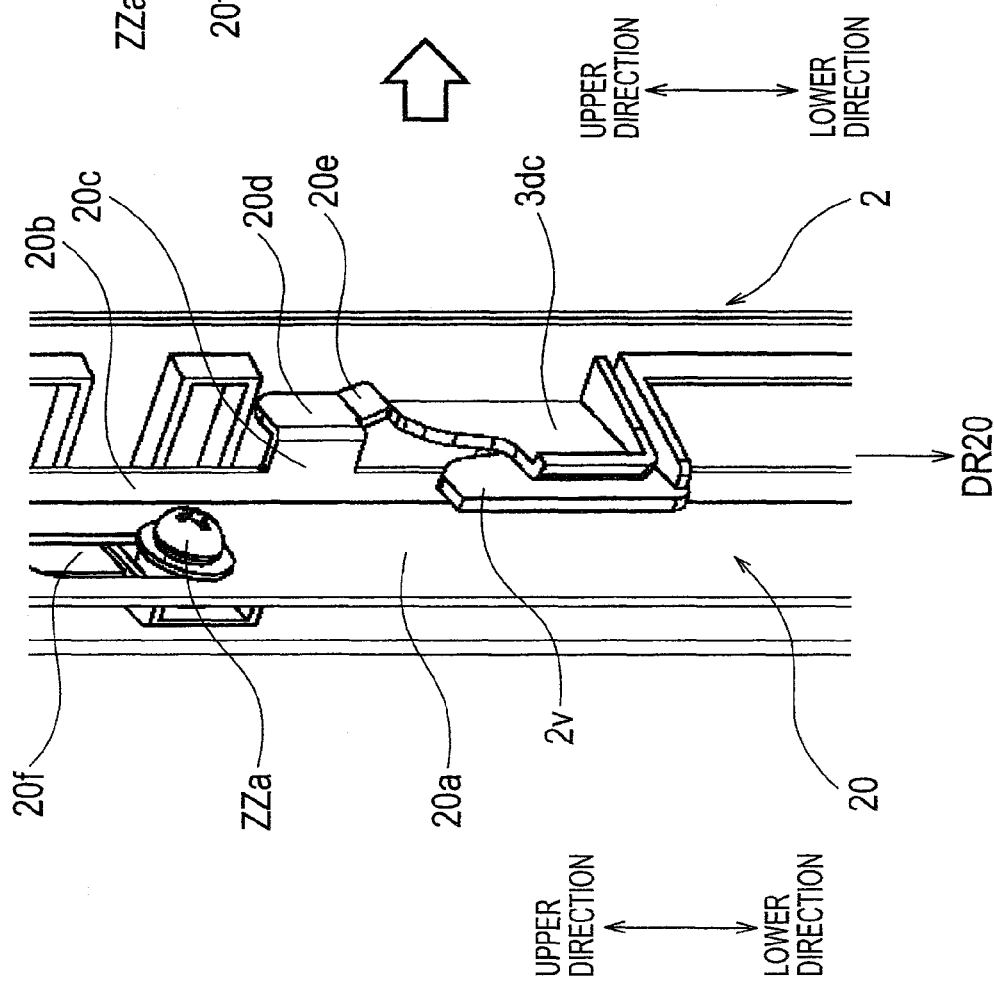

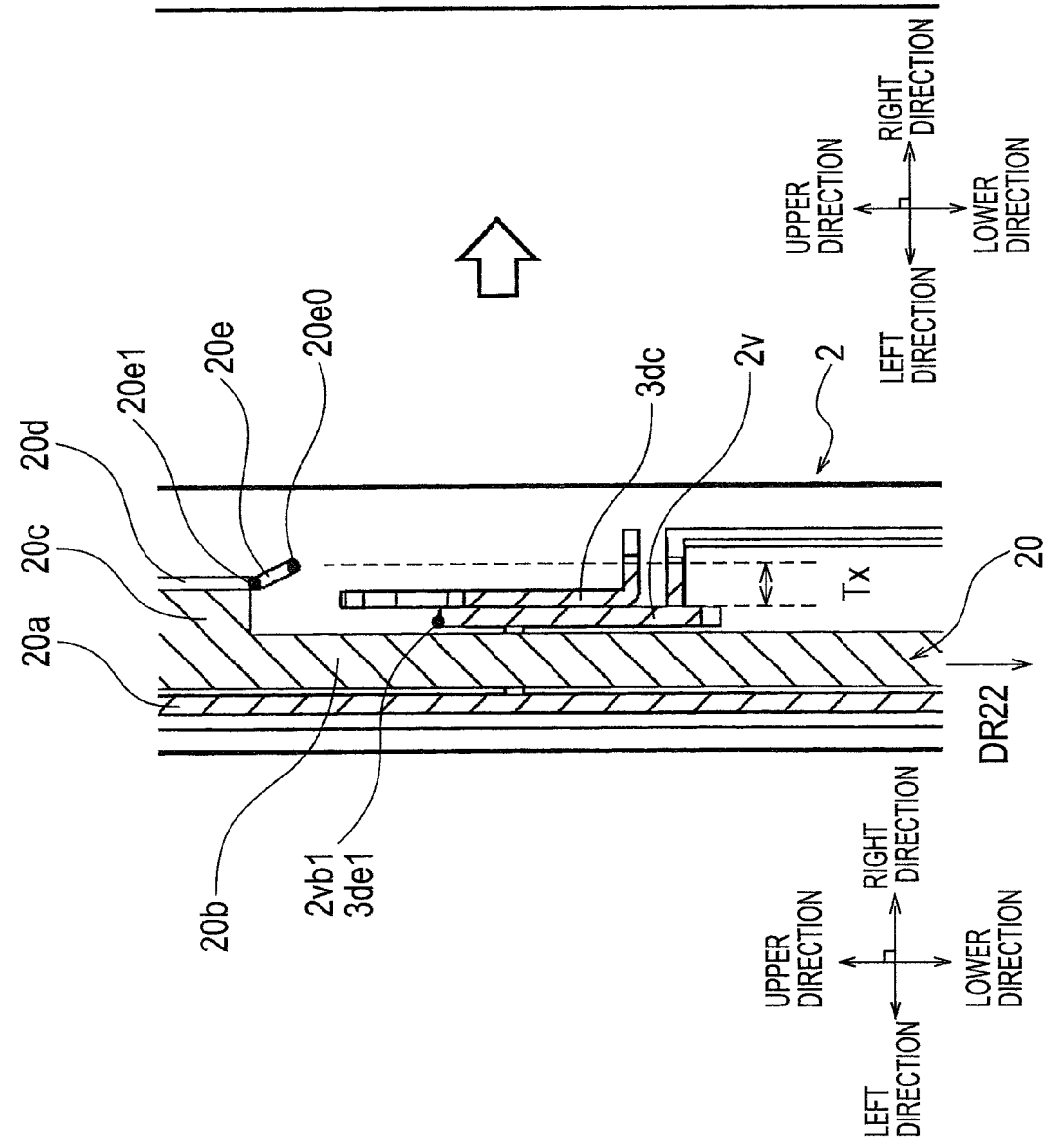

IMAGE DISPLAY APPARATUS AND HOUSING ASSEMBLY CONFIGURATION

TECHNICAL FIELD

The present invention relates to image display apparatuses and housing assembly configurations, and more specifically, relates to an image display apparatus and housing assembly configuration that easily achieve a reduction in the thickness and mass of an image display apparatus main body and are suitable for a large-size image display apparatus.

BACKGROUND ART

Recently, image display apparatuses (e.g., a display apparatus, a television apparatus, and the like) that display an image using a display module, such as a liquid crystal panel, are rapidly becoming popular. Usually, the image display apparatus includes: a display panel part (image display apparatus main body) having a display module and a housing that houses therein the display module so that an image display face of the display module can be viewed from the outside; and a stand (pedestal part) supporting the display panel part and being capable of rotation, such as a swivel. If a liquid crystal panel is used in the display module, aback light is required. A linear light source, such as a cold cathode fluorescent lamp (CCFL) or an external electrode fluorescent lamp (EEFL), or an LED light source using an LED (light emitting diode) is used as the back light source, for example.

In such an image display apparatus, as the technique to connect the image display apparatus main body to the pedestal part that rotatably supports the housing, the following two configurations are known. Patent Document 1 (Japanese Patent Laid-Open No. 2008-003149) discloses a configuration, wherein a display apparatus is fixed in a self-standing manner via one metal plate which is installed on the upper part of a turntable of a pedestal part and is assembled by folding. Patent Document 2 (Japanese Utility Model Registration No. 3097842) discloses a configuration, wherein a column is fit into the center of a pedestal part, a swivel adjusting device is installed on the column and is connected to an image display apparatus main body, and the image display apparatus main body is adjusted at a predetermined angle.

Moreover, in such an image display apparatus, as the technique to fix the pedestal part that supports a housing, the following two configurations are known. Patent Document 3 (Japanese Utility Model Registration No. 3110945) discloses a configuration, wherein a front cabinet with a liquid crystal panel is fixed in a self-standing manner using a stand. Patent Document 4 (Japanese Patent Laid-Open No. 2005-352332) discloses a configuration, wherein a die-cast frame is spanned like a bridge between two sides (i.e., upper and lower sides or right and left sides) of the back face of a display module, and a bearing surface for attaching a stand is formed in the center or center bottom end of the frame.

Furthermore, in such an image display apparatus, as the technique to assemble and fix the housing for housing therein the display module, the following two configurations are known. Patent Document 5 (Japanese Patent Laid-Open No. 2008-298964) discloses a configuration, wherein a front cabinet is held by a front cover and a rear cabinet. Patent Document 6 (Japanese Patent Laid-Open No. 2000-305066) discloses a configuration that adapts to multiple types of color liquid crystal displays by modifying an internal bracket without providing a setscrew hole in a liquid crystal display base and its cover.

The conventional image display apparatus main body includes a frame-like bezel made of metal, wherein the frame-like bezel and a back plate (sheet-metal frame) of a display module are formed from an iron material, and wherein the liquid crystal module is relatively thick. For such an image display apparatus main body, recently, with an increase in the size of the screen, a reduction in the thickness and mass by reducing the thickness of an image display apparatus main body as much as possible is demanded. In order to achieve a reduction in the thickness and mass of the image display apparatus main body, a display module or the interior of a housing that occupies the most of the volume or mass of the interior of the image display apparatus main body needs to be thinned and the mass thereof needs to be reduced.

In the configuration disclosed in Patent Document 1, in the case of a large-size image display apparatus, since the display module is supported by the lower part of the image display apparatus, an appropriate size or mass is required for the bottom plate part (supporting base) of a pedestal part. Specifically, the width in the back and forth direction (in the thickness direction) of the image display apparatus increases and mass sufficient for preventing the image display apparatus from being easily overturned is required. In particular, if the pedestal part projects backward, a problem occurs that the image display apparatus main body cannot be moved to a wall for installation.

The configuration disclosed in Patent Document 2 causes a problem that because the stand is installed in the vicinity of the center of the bottom plate part of the rear cabinet, even if a reduction in the thickness of the display module is achieved, the thickness, volume, and mass of the image display apparatus main body increase by the thickness of the rear cabinet, and a reduction in the thickness and mass of the image display apparatus main body cannot be easily achieved.

The configuration disclosed in Patent Document 3 causes a problem that because the stand is installed at the center of the bottom plate part of the rear cabinet and a reinforcing plate is installed in the stand itself, even if a reduction in the thickness of the display module is achieved, the thickness, volume, and mass of the image display apparatus main body increase by the thickness of the rear cabinet or reinforcing plate, and a reduction in the thickness and mass of the image display apparatus main body cannot be easily achieved.

The configuration disclosed in Patent Document 4 causes a problem that because the stand is installed in the lower part of the frame that is spanned like a bridge, even if a reduction in the thickness of the display module is achieved, the thickness, volume, and mass of the image display apparatus main body increase by the thickness of the frame that is spanned like a bridge, and a reduction in the thickness and mass of the image display apparatus main body cannot be easily achieved.

Moreover, when a configuration that achieves a reduction in the thickness and mass of the display module or the image display apparatus main body is employed, the mass of a frame member or the like that supports the display module is reduced and therefore the strength or rigidity of the whole image display apparatus may decrease as compared with the conventional configuration.

When each of the configurations disclosed in Patent Documents 1 to 4 is applied to a configuration that achieves a reduction in the thickness and mass of the display module or image display apparatus main body, a stand is installed in a part of the frame (sheet-metal frame) of a back light (e.g., in the lower part of the frame of the back light). For this reason, the load on the frame of the back light may concentrate on a part of the frame when the image display apparatus main body is tilted forward and installed or depending on the use conditions, such as the ambient temperature or the like. As a result, the strength or rigidity of the display module or the whole image display apparatus cannot be maintained, and a bend, distortion, or the like may occur in a part of the back light and may degrade the display image quality, such as a degradation in the uniformity of luminance of a screen.

Furthermore, there is also a problem that heat is unlikely to be radiated from the inside of the housing to the outside because the thickness of the image display apparatus main body is reduced. In particular, since the housing is covered with a resin material having a poor thermal conductivity, there is a problem that the heat generated from a driver part and back light part of a liquid crystal panel or the heat generated from a power supply part, and signal processing part, and the like of an image display apparatus is likely to be accumulated inside the housing.

In addition, with the increase of the popularity of the image display apparatus, market demands for the aesthetic appearance in appearance design, such as a reduction in the width of a frame edge, for example, which reduces the width of an outer frame (frame edge portion) surrounding the display face of a display panel part as narrow (thin) as possible, are becoming strong, and an image display apparatus achieving such a reduction is always expected to be provided. Moreover, the interior nature of a home electric appliance is also emphasized. In portions, such as right in front, right beside, right behind, or the like, which are likely to catch the eyes of a user, a design is also requested, wherein the exterior face is designed so as to be flat as much as possible by eliminating or hiding the fastening portions of screws and also by hiding the end faces of members.

Usually, the image display apparatus main body includes a housing being made of resin (plastic) and comprising a combination of a front cover on the front face side (hereinafter, referred to as an F cover) and a rear cover on the back face side (hereinafter, referred to as an R cover). The resin-made housing is a molding member by injection molding. Note that in the market, there are also some image display apparatuses with a housing comprising a metal member. However, for example, if this metal housing is applied to a large-size screen with the size equal to or greater than 30 inches, there is a problem that the mass of the whole image display apparatus increases.

If a resin-made housing is applied to each of the configurations disclosed in Patent Documents 5, 6, the resin-made housing is suitable in a relatively small-size image display apparatus while in a relatively large-size image display apparatus, there is a problem in that the manufacturing variation of the resin-made housing cannot be neglected. The resin-made molding member causes a thermal shrinkage when it is cooled after injection molding, and its shape changes in the direction of slightly shrinking. Since this thermal shrinkage occurs locally, the resin-made housing is designed taking into consideration the variation in the shrinkage amount in advance at the time of design. However, in a large-size image display apparatus, since the shrinkage amount increases, the variation occurs between the shrinkage amount of the F cover and the shrinkage amount of the R cover. For this reason, at the time of assembly of the F cover and the R cover, the probability of occurrence of a defective product having an unallowable variation in the shrinkage amount increases, resulting in an increase in the cost of the image display apparatus.

As a method of suppressing the variation in the shrinkage amount due to thermal shrinkage, a method of increasing the number of fastening portions of screws when assembling the F cover and the R cover can be contemplated. However, if the number of fastening portions of screws is increased, there are problems that the number of components or the assembly man-hours increases and that the aesthetic appearance in appearance design degrades.

SUMMARY OF INVENTION

It is a first object of the present invention to provide an image display apparatus, wherein the thickness, volume, and mass of an image display apparatus main body are reduced by achieving a reduction in the thickness and mass of a display module.

It is a second object of the present invention to provide an image display apparatus, wherein the thickness or mass of an image display apparatus main body is reduced by achieving a reduction in the thickness and mass of a display module and a reduction in the size and mass of a pedestal part supporting the image display apparatus main body is achieved.

It is a third object of the present invention to provide an image display apparatus, wherein a reduction in the mass of a frame member supporting a display module is achieved while maintaining the rigidity of an image display main body, and the size (in particular, the width (depth) in the back and forth direction) of a bottom plate part of a pedestal part supporting the image display apparatus main body and having a horizontal swivel function is reduced without depending on the installation conditions and without degrading the quality of a display image.

It is a fourth object of the present invention to provide an image display apparatus, wherein a reduction in the mass of a frame member supporting a display module is achieved while maintaining the rigidity of an image display main body or the quality of a display image, and the heat generated in the inside of the display module or inside a housing of the image display apparatus is directly and efficiently radiated to the outside.

It is a fifth object of the present invention to provide a housing assembly configuration capable of stably assembling a housing without depending on a molding variation of a housing, and an image display apparatus with this configuration.

It is a sixth object of the present invention to provide a housing assembly configuration capable of obtaining an excellent interior nature without degrading the aesthetic appearance in appearance design, and an image display apparatus with this configuration.

A first invention provides an image display apparatus comprising: an image display apparatus main body, wherein the image display main body includes: a display module that displays an image on a front face thereof; a columnar member that is connected to a back face of the display module, wherein a part thereof is exposed to an outside; a rear cover that is connected to the columnar member and covers the back face of the display module; and a supported part that is provided protruding backward from the columnar member; and a pedestal part that supports the image display apparatus main body, wherein the pedestal part includes: a bottom plate part; a column that is provided in the bottom plate part; and a supporting part that is provided in the column and supports the image display apparatus main body via the supported part.

A second invention provides the image display apparatus of the first invention, wherein the supporting part supports the supported part rotatably about an axis line extending in a vertical direction when the pedestal part is horizontally installed.

A third invention provides the image display apparatus of the first invention, wherein the display module is connected to the column via a metallic material.

A fourth invention provides the image display apparatus of the first invention, wherein the image display main body further includes at least one other supported part that is provided protruding backward from the columnar member, wherein a supporting member of the pedestal part supports the image display apparatus via the supported part and the at least one other supported part, and wherein the supported part and the at least one other supported part are arranged spaced apart from each other in a vertical direction in a state where the image display apparatus is installed.

A fifth invention provides an image display apparatus comprising: a display module that has on a front face thereof a display face for displaying an image; a columnar member that is connected to a rear face of the display module; and a housing that houses the display module therein, wherein the columnar member includes a base that connects sides of the display module, the sides facing each other, and wherein the base is exposed to an outside as a part of the housing.

A sixth invention provides the image display apparatus of the fifth invention, further comprising: a supporting part that supports the housing, wherein the supporting part is fixed to a position symmetric with respect to a center portion of the columnar member in a longitudinal direction thereof.

A seventh invention provides the image display apparatus of the fifth invention, wherein the housing and the base of the columnar member are continuously formed without a step on the same plane in a back face of the image display apparatus.

An eighth invention provides the image display apparatus of the fifth invention, wherein a through-hole or groove extending in parallel to a long side of the base is formed on the display module side of the base.

A ninth invention provides the image display apparatus of the eighth invention, wherein the columnar member is installed so that a longitudinal direction of the columnar member becomes a vertical direction, and wherein the housing includes a through-hole corresponding to an upper opening of the through-hole or the groove.

A tenth invention provides a housing assembly configuration comprising a housing that houses a rectangular and tabular housed body, wherein the housing includes: a first cover that has a rectangular profile, is disposed so as to cover at least a part of one face side of the housed body, and has flange parts each protruding toward other face side of the housed body in a first pair of edges facing each other; and a second cover that has a rectangular profile, is disposed so as to cover at least a part of the other face side of the housed body, and has bent parts each being bent so that an end face faces the first cover, in a second pair of edges not facing the first pair of edges, wherein the end faces of the bent parts in the second cover face and abut on or come close to an inner face of a third pair of edges different from the first pair of edges in the first cover, and wherein the first cover is combined with the second cover so that end faces of a fourth pair of edges different from the second pair of edges in the second cover face and abut on or come close to an inner face of the flange parts in the first cover.

An eleventh invention provides the housing assembly configuration of the tenth invention, further comprising: a slide bracket that is provided in the inner face of the third pair of edges in the first cover so as to slide along the third pair of edges; a slide part that is connected to the slide bracket and causes the slide bracket to slide from an outside; and an engagement part that, when the slide bracket slides, engages with an inner face of the second pair of edges in the second cover so as to guide the slide bracket in a direction getting close to the first cover.

A twelfth invention provides the housing assembly configuration of the tenth invention, wherein the first cover is fastened to the second cover with a screw, only in the flange part.

A thirteenth invention provides an image display apparatus comprising: a rectangular and tabular image display module; and a housing that houses the image display module, wherein the housing includes: a first cover that has a rectangular profile, is disposed so as to cover at least a part of one face side of the image display module, and has flange parts each protruding toward other face side of the image display module in a first pair of edges facing each other; and a second cover that has a rectangular profile, is disposed so as to cover at least a part of the other face side of the image display module, and has bent parts each being bent so that an end face faces the first cover, in a second pair of edges not facing the first pair of edges, wherein the end faces of the bent parts in the second cover face and abut on or come close to an inner face of a third pair of edges different from the first pair of edges in the first cover, and wherein the first cover is combined with the second cover so that end faces of a fourth pair of edges different from the second pair of edges in the second cover face and abut on or come close to an inner face of the flange parts in the first cover.

According to the present invention, it is possible to reduce the thickness, volume, and mass of an image display apparatus main body by achieving a reduction in the thickness and mass of a display module.

According to the present invention, it is possible to reduce the thickness, volume, and mass of an image display apparatus main body by achieving a reduction in the thickness and mass of a display module, and also to achieve a reduction in the size and mass of a pedestal part supporting the image display apparatus main body.

According to the present invention, it is possible to achieve a reduction in the mass of a frame member supporting a display module while maintaining the rigidity of an image display apparatus main body, and also possible to reduce the size (in particular, the width (depth) in the back and forth direction) of a bottom plate part of a pedestal part having a horizontal swivel function, the pedestal part supporting the image display apparatus main body, without depending on the installation conditions and without degrading the quality of the display image.

According to the present invention, it is possible to achieve a reduction in the mass of a frame member supporting a display module while maintaining the rigidity of a whole image display apparatus or the quality of a display image, and also possible to directly and efficiently radiate the heat generated in the inside of the display module or inside a housing of an image display apparatus to the outside.

According to the present invention, it is possible to stably assemble a housing without depending on a molding variation of the housing.

According to the present invention, it is possible to obtain an excellent interior nature without degrading the aesthetic appearance in appearance design.

BRIEF DESCRIPTION OF DRAWINGS

FIGS. 21A to 21E are exploded views for illustrating a lower pedestal fixing member connecting part and a lower center frame connecting part shown in an area DT7 of FIG. 19.

FIG. 22 is a top view of the image display apparatus according to the embodiment of the present invention.

FIG. 32 is a cross-sectional image view of a fitted part of the F cover, a fitted part of the right R cover, and a fitted part of a slide bracket according to the embodiment of the present invention.

FIG. 33A is a perspective view showing a state prior to fitting the F cover and the right R cover 3 by means of the slide bracket according to the embodiment of the present invention.

FIG. 33B is a perspective view showing a state after fitting the F cover and the right R cover 3 by means of the slide bracket according to the embodiment of the present invention.

FIG. 35A is a cross sectional view when an A-a cross section in FIG. 34A is seen in a direction from a reference back face of the R cover to a reference front face of the F cover.

FIG. 35B is a cross sectional view when a B-b cross section in FIG. 34B is seen in a direction from the reference back face of the R cover to the reference front face of the F cover.

DESCRIPTION OF EMBODIMENTS

An embodiment of the present invention will be described with reference to FIG. 1 to FIG. 35B.

Figure 1:
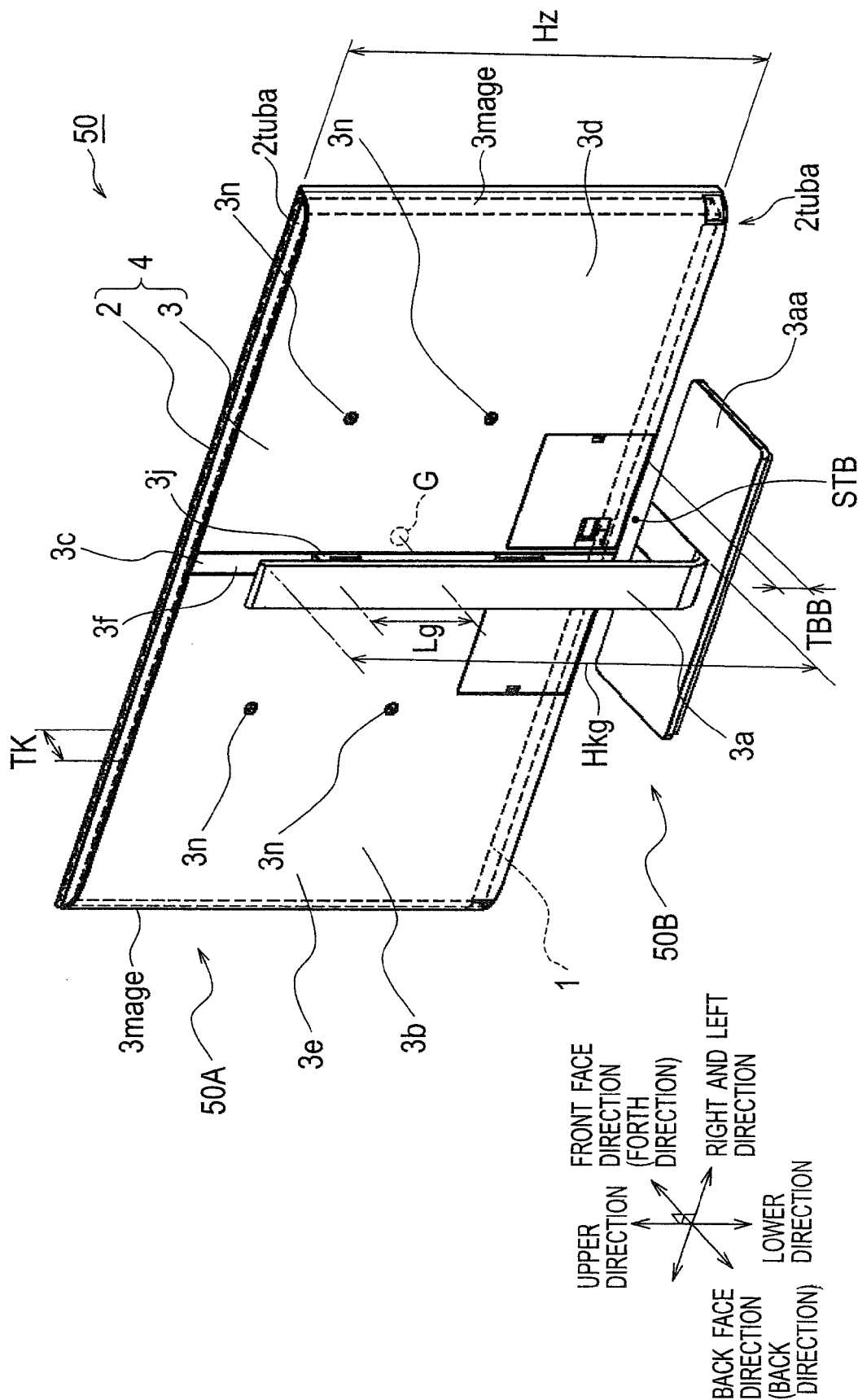
FIG. 1 is an external perspective view on the back face side of an image display apparatus according to an embodiment of the present invention.
Figure 2:
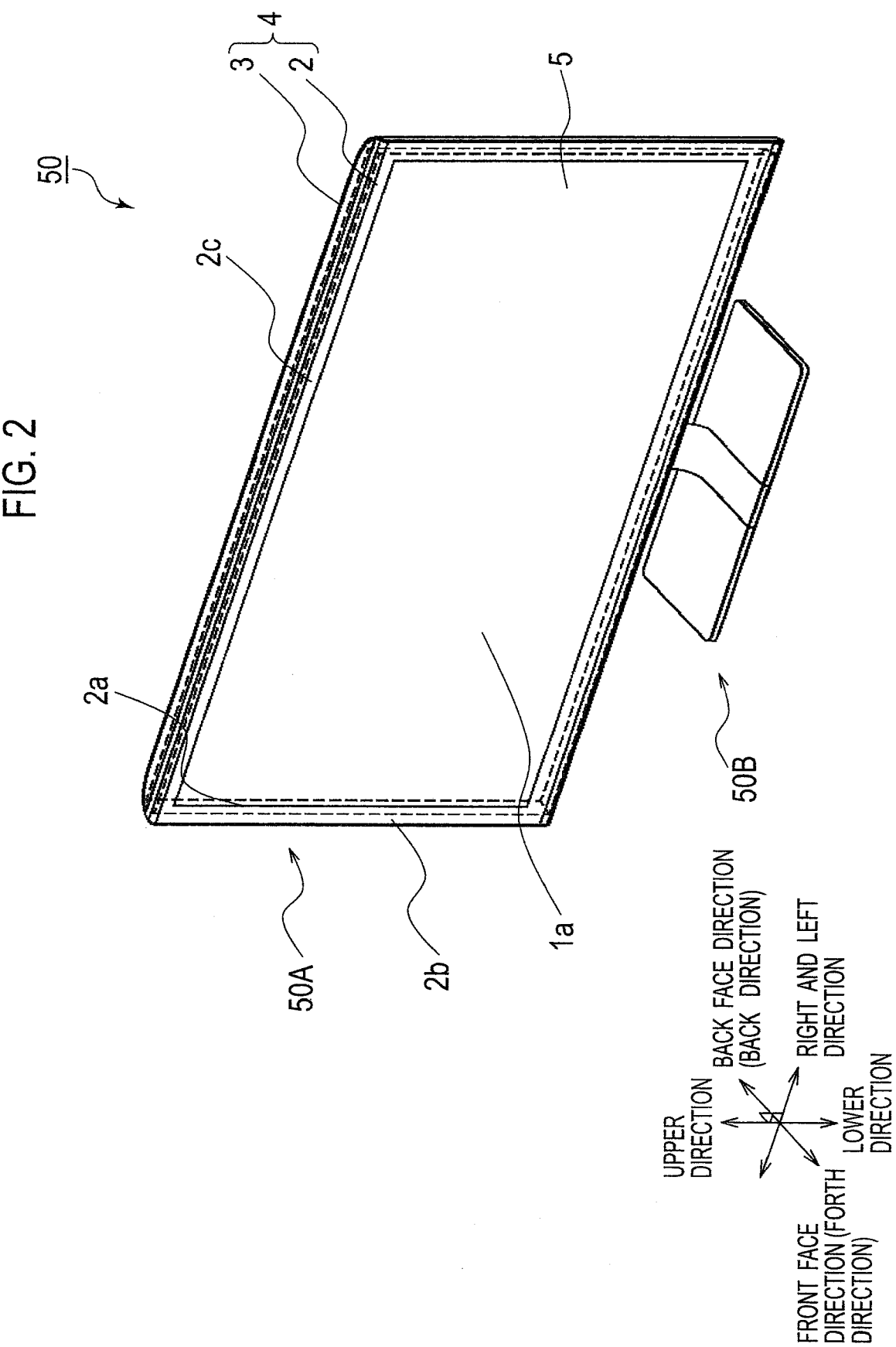
FIG. 2 is an external perspective view on the front face side of the image display apparatus according to the embodiment of the present invention.

FIGS. 1, 2 are external perspective views of an image display apparatus. FIG. 1 is an external perspective view of an image display apparatus 50 when seen from an oblique upper direction on the back face side of the image display apparatus 50. FIG. 2 is an external perspective view of the image display apparatus 50 when seen from an oblique upper direction on the front face side of the image display apparatus 50.

This embodiment will be described with a television apparatus with a screen size of 42 inches taken as an example of the image display apparatus 50 according to this embodiment. This embodiment will be described with a liquid crystal module taken as an example of a display module according to this embodiment.

As shown in FIGS. 1, 2, the image display apparatus 50 includes an image display apparatus main body 50A and a pedestal part 50B. The image display apparatus main body 50A houses a liquid crystal module 1 therein. The pedestal part 50B supports the image display apparatus main body 50A so as to allow its swing movement in the vertical direction and the horizontal direction within a predetermined angle range.

The image display apparatus main body 50A has a resin-made housing 4 comprising a combination of a front cover 2 (hereinafter, referred to as an F cover 2) on the front face side and a rear cover 3 (hereinafter, referred to as an R cover 3) on the back face side. The F cover 2 is formed in a frame shape. The R cover 3 is formed in a flat box shape with one side opened. The R cover 3 comprises a center frame 3c (a unit configured to fix), a left R cover 3e, and a right R cover 3d. The center frame 3c is a metal columnar member disposed in the center of the R cover 3. The left R cover 3e is disposed on the left side of the center frame 3c. The right R cover 3d is disposed on the right side of the center frame 3c. The R cover 3 is formed in a plane shape without a step on the back face side of the image display apparatus 50 when the center frame 3c, the left R cover 3e, and the right R cover 3d are combined.

The liquid crystal module 1 is fixed to the inside of the housing 4 with a fixing configuration to be described later. A liquid crystal panel 5 and a back light part 6 are incorporated into the liquid crystal module 1 (see FIGS. 3, 4). Moreover, a board having circuits, such as a signal processing circuit of the image display apparatus 50, mounted thereon, a power supply part (illustration is omitted), and the like are housed inside the housing 4. As shown in FIG. 1, the pedestal part 50B includes a pedestal fixing member 3a and a bottom plate part 3aa. The pedestal fixing member 3a is a metal pillar member, and is erected from a backward side of the bottom plate part 3aa. A height Hkg from the bottom plate part 3aa of the pedestal fixing member 3a is no less than one half of a height Hz of the image display apparatus main body 50A. The pedestal fixing member 3a is fixed to the center frame 3c. The image display apparatus main body 50A is supported by the pedestal part 50B via the pedestal fixing member 3a and the center frame 3c.

As shown in FIG. 2, an opening 2a is formed in the F cover 2. The opening 2a exposes an image display face 1a of the liquid crystal module 1. Note that the image display face 1a is the display face formed in the front face of the liquid crystal module 1. A frame edge part 2c is a frame part surrounding the opening 2a. The front side face of the F cover 2 is referred to as a reference front face 2b. The back side face of the R cover 3 excluding the center frame 3c is referred to as a reference back face 3b (see FIG. 1). The front side face of the F cover 2 is a planar surface of the F cover 2 extending in a direction approximately perpendicular to the back and forth direction of the image display apparatus 50. The back side face of the R cover 3 is a planar surface of the R cover 3 extending in a direction approximately perpendicular to the back and forth direction of the image display apparatus 50. Four female screw parts 3n are provided on the reference back face 3b. The female screw part 3n is a receptacle part for attaching a wall hanging member. The thickness of the housing 4 of the image display apparatus main body 50A excluding the center frame 3c is TK. The thickness TK is a distance between the reference front face 2b and the reference back face 3b. Reducing the thickness TK means a reduction in the thickness of the image display apparatus 50.

Figure 3:
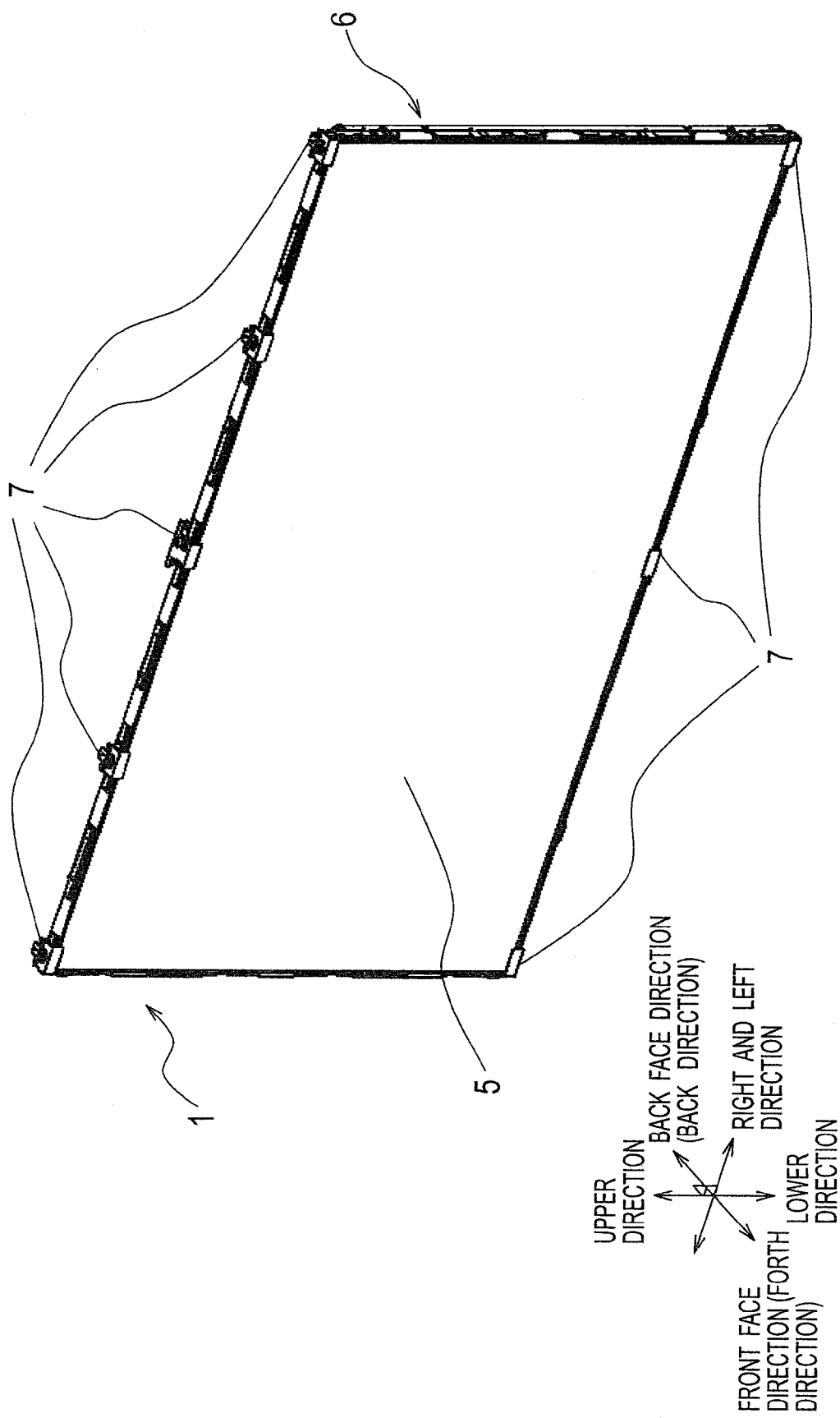
FIG. 3 is an external perspective view of a liquid crystal module according to the embodiment of the present invention.

FIG. 3 is an external perspective view of the liquid crystal module. The liquid crystal module 1 has the rectangular and flat liquid crystal panel 5 and the back light part 6. The liquid crystal panel 5 and the back light part 6 are overlapped with each other and are integrated by a plurality of fixing members 7 to be described later. In this embodiment, five fixing members 7 are used on the upper side (upper side of FIG. 3) of the liquid crystal module 1, and three fixing members are used on the lower side (lower side of FIG. 3) of the liquid crystal module 1.

Figure 4:
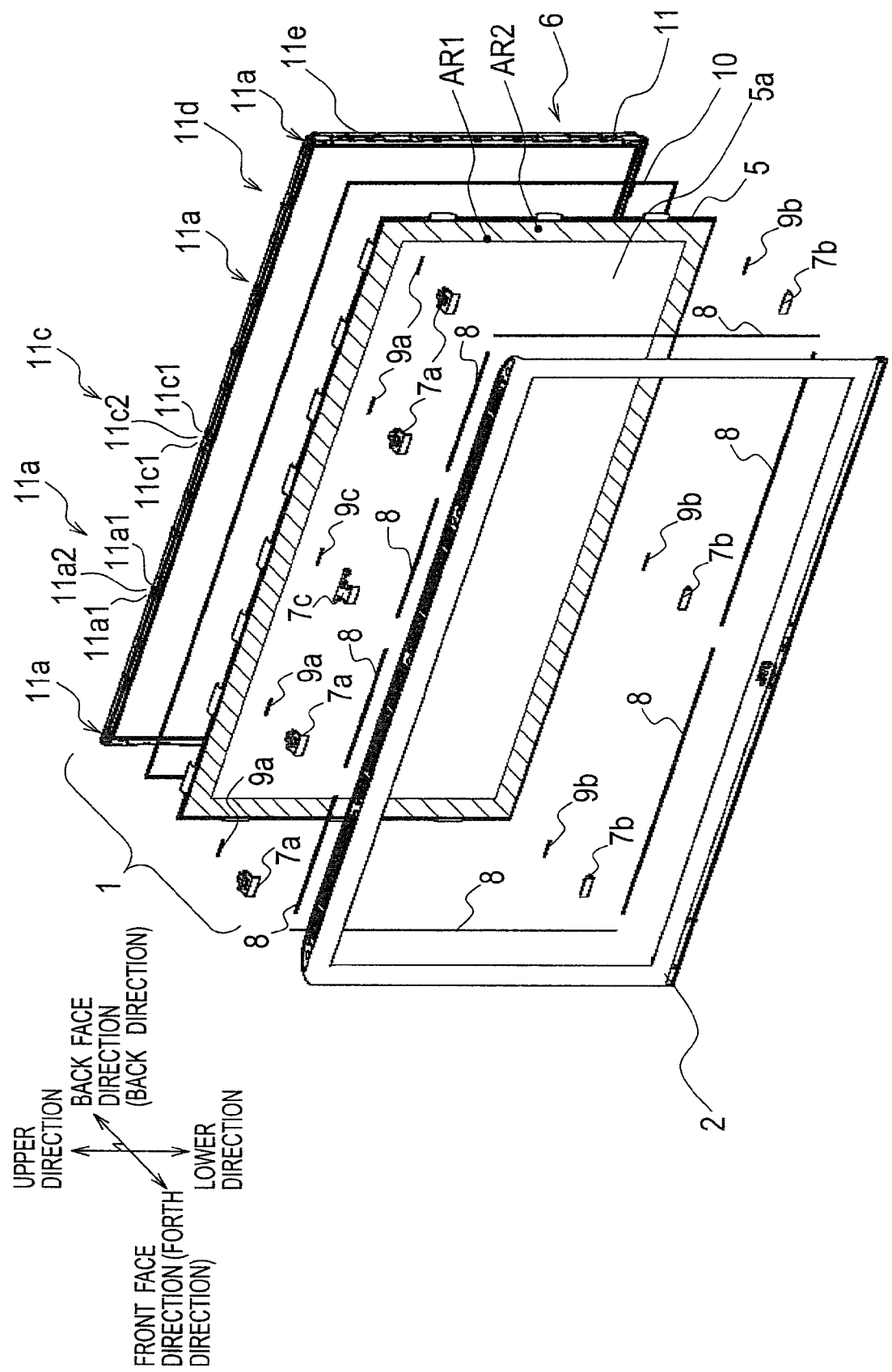
FIG. 4 is an exploded perspective view illustrating a fixing configuration for fixing the liquid crystal module and an F cover to each other, according to the embodiment of the present invention.

FIG. 4 is an exploded perspective view illustrating a fixing configuration for fixing the liquid crystal module 1 and the F cover 2 to each other. With reference to FIG. 4, the fixing configuration of the liquid crystal module 1 is described.

The liquid crystal module 1 comprises the liquid crystal panel 5, the back light part 6, a buffer member 10, and the fixing member 7 (7a-7c). The buffer member 10 is formed in a frame shape, and is held between the liquid crystal panel 5 and the back light part 6. The fixing member 7 integrates the liquid crystal panel 5 and the back light part 6 by urging the liquid crystal panel 5 and the back light part 6 so as to be close to each other. The fixing member 7 includes four upper fixing members 7a, three lower fixing members 7b, and one upper center fixing member 7c. The upper center fixing member 7c is disposed in the center portion of the side on the upper side of the liquid crystal module 1 to fix the liquid crystal panel 5 and the back light part 6. The upper fixing members 7a are split into two upper fixing members 7a disposed on the left side of the upper center fixing member 7c and two upper fixing members 7a disposed on the right side of the upper center fixing member 7c to fix the liquid crystal panel 5 and the back light part 6. The lower fixing member 7b fixes the liquid crystal panel 5 and the back light part 6 in the side on the lower side of the liquid crystal module 1. The liquid crystal module 1 is attached to the F cover 2 from the back face side of the F cover 2. Note that the buffer member 10 may be omitted.

In the back face of the F cover 2, a buffer member 8 is mounted to an outer area AR2 (area attached with slant lines in FIG. 4) of an image display region AR1 in a display face 5a of the liquid crystal panel 5 in advance. Specifically, the buffer member 8 is mounted to the outer area AR2, so that the buffer member 8 does not interfere with the fixing member 7 when the liquid crystal panel 5 is attached to the back light part 6 with the fixing member 7 and also so that there is no space or a minimum space between the buffer member 8 and the fixing member 7 when the liquid crystal panel 5 is attached to the F cover 2. A buffer member 9a is attached to the upper fixing member 7a so as to interpose between the liquid crystal panel 5 and the upper fixing member 7a. A buffer member 9b is attached to the lower fixing member 7b so as to interpose between the liquid crystal panel 5 and the lower fixing member 7b. A buffer member 9c is attached to the upper center fixing member 7c so as to interpose between the liquid crystal panel 5 and the upper center fixing member 7c.

Since the buffer member 8 is held between the liquid crystal module 1 and the F cover 2 when the liquid crystal module 1 is attached to the F cover 2, an impact or vibration applied from the F cover 2 to the liquid crystal panel 5 is effectively absorbed by the buffer member 8. Moreover, the buffer member 8 prevents a foreign substance, such as a dust or dirt from entering from the opening 2a of the F cover 2 into the inside of the back light part 6 positioned in the back face of the liquid crystal panel 5.

The back light part 6 includes a panel chassis 11 formed in flat box shape. The panel chassis 11 includes a flat plate part 11d on the back face side of the panel chassis 11, and a peripheral wall 11e rising from the peripheral edge of the flat plate part 11d. The buffer member 10 is sandwiched between the liquid crystal panel 5 and the panel chassis 11 so as to fit into the inside of the peripheral wall 11e when disposed between the liquid crystal panel 5 and the back light part 6.

The fixing members 7a, 7b and 7c are fixed to the panel chassis 11 with male screws (e.g., male screw ZZ1 and male screw ZZ2 shown in FIG. 9) in the upper face and lower face of the back light part 6. Moreover, the fixing members 7a and 7c are fixed to the F cover 2 from the upper face side of the F cover 2 with male screws ZZ shown in FIG. 8.

According to the above-described configuration, in order to integrally fix the liquid crystal panel 5 and the back light part 6, instead of using a frame-like bezel covering the peripheral portion of the liquid crystal module 1, the fixing member 7 much smaller and lighter as compared with the bezel is used and therefore the thickness, mass, and volume of the liquid crystal module can be reduced. Even if a configuration (configuration wherein as the frame member the fixing member 7 is used) achieving a reduction in the size and mass of the frame member is employed, the liquid crystal panel 5 itself contributes to the strength of the back light part 6 because the liquid crystal panel 5 and the back light part 6 are integrally fixed. For this reason, the above-described configuration can withstand an impact or vibration applied from the outside, can prevent a bend or internal distortion due to a change in temperature and the like from occurring, and can maintain the strength or rigidity of the whole liquid crystal module.

Next, the above-described primary members are described in detail.

Figure 5:
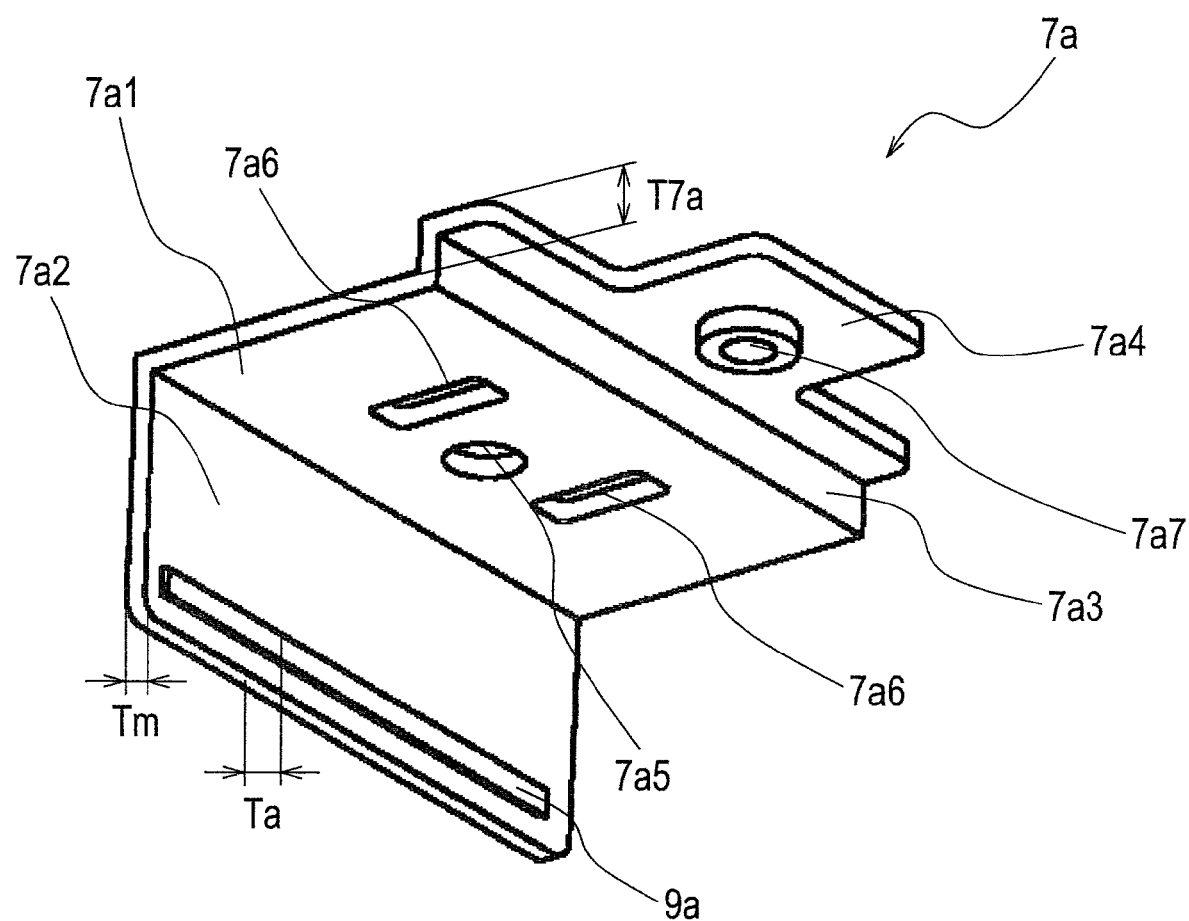
FIG. 5 is a perspective view of an upper fixing member according to the embodiment of the present invention.

FIG. 5 is a perspective view of the upper fixing member 7a. The upper fixing member 7a is formed by pressing a metal plate, and includes a chassis connecting section 7a1, a panel holding section 7a2, a step section 7a3, and an F cover holding section 7a4. The chassis connecting section 7a1 is formed in a generally rectangular shape. The panel holding section 7a2 is continuously connected to one long side of the chassis connecting section 7a1 and is extended downward. The step section 7a3 is continuously connected to the other long side of the chassis connecting section 7a1 and is extended upward. The F cover holding section 7a4 is continuously connected to the step section 7a3 and is extended in parallel to the chassis connecting section 7a1.

A metal plate comprising the chassis connecting section 7a1 and the panel holding section 7a2 is folded downward. Specifically, the panel holding section 7a2 is folded by approximately 90° with respect to the chassis connecting section 7a1. A metal plate comprising the chassis connecting section 7a1, the step section 7a3, and the F cover holding section 7a4 is folded in two steps upward. Specifically, the step section 7a3 is folded by approximately 90° with respect to the chassis connecting section 7a1. The F cover holding section 7a4 is folded by approximately 90° with respect to the step section 7a3.

The inner face of the panel holding section 7a2 is the face to contact the liquid crystal panel 5. The buffer member 9a is stuck to the inner face of the panel holding section 7a2. The buffer member 9a is stuck to the inner face of the panel holding section 7a2 so that the buffer member 9a, when the upper fixing member 7a is fixed to the panel chassis 11, may abut against the vicinity of the outer side of the outer area AR2 without entering the image display region AR1 of the liquid crystal panel 5. The upper fixing member 7a, in a state of being attached to the panel chassis 11, holds the liquid crystal panel 5 by making the buffer member 9a abut against the liquid crystal panel 5. In FIG. 5, a thickness Ta is a combined thickness of a thickness Tm of the upper fixing member 7a and a thickness of the buffer member 9a.

In the center portion of the chassis connecting section 7a1, a through-hole 7a5 is formed. In the chassis connecting section 7a1, a pair of long holes 7a6 is formed with the through-hole 7a5 therebetween.

In the panel chassis 11, in a portion to be attached with the upper fixing member 7a, protruding parts 11a1 (see FIG. 9) are provided corresponding to the long holes 7a6 of the upper fixing member 7a, and a female screw 11a2 (see FIG. 9) is provided corresponding to the through-hole 7a5 of the upper fixing member 7a, respectively. The upper fixing member 7a is positioned and fixed to the panel chassis 11 by engaging the protruding parts 11a1 with the long holes 7a6, respectively. The liquid crystal panel 5 and the back light part 6 are integrally fixed by inserting the male screw ZZ1 (see FIG. 9) into the through-hole 7a5 and fastening these parts together with the female screw 11a2 after positioning and fixing the upper fixing member 7a to the panel chassis 11. That is, the liquid crystal panel 5 is sandwiched between the panel holding section 7a2 and the panel chassis 11. At this time, the buffer member 9a may be compressed to some extent. In that case, if the buffer member 10 is held between the liquid crystal panel 5 and the back light part 6, the buffer member 10 is compressed to some extent. A height T7a of the step section 7a3 is higher than that of the screw head of the male screw ZZ1 inserted into the through-hole 7a5. The height of the screw head of the male screw ZZ1 is set to a height enough for the screw head to be contained inside the housing 4 (F cover 2).

In the center portion of the F cover holding section 7a4, a female screw 7a7 is formed by burring. In the inner face of the F cover 2, in a state where the liquid crystal module 1 is attached to the F cover 2, a seat 2jz (see FIG. 8) against which the F cover 2 abuts is provided in a portion corresponding to the F cover holding section 7a4. Moreover, in the seat 2jz, a through-hole 2j (see FIG. 8) is provided in a portion corresponding to the female screw 7a7. By inserting the male screw ZZ (see FIG. 8) into the through-hole 2j and tightening these parts together with the female screw 7a7, the liquid crystal module 1 is attached to the F cover 2.

Figure 6:
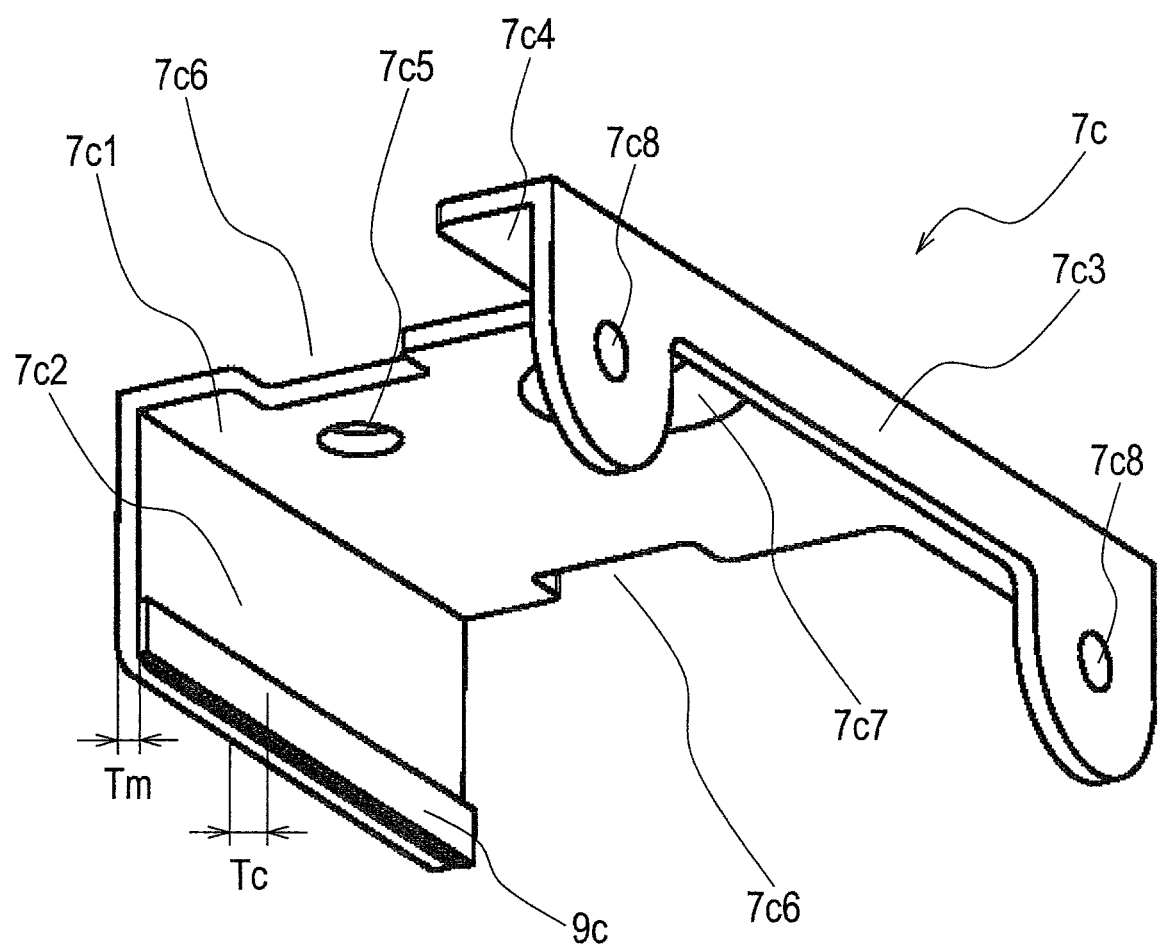
FIG. 6 is a perspective view of an upper center fixing member according to the embodiment of the present invention.

FIG. 6 is a perspective view of the upper center fixing member 7c. The upper center fixing member 7c is formed by pressing a metal plate, and includes a chassis connecting part 7C1, a panel holding section 7c2, an R cover holding section 7c3, and an F cover holding section 7c4. The chassis connecting section 7c1 is formed in a generally rectangular shape. The panel holding section 7c2 is continuously connected to one long side of the chassis connecting section 7c1 and is extended downward. The F cover holding section 7c4 is continuously connected to and provided in the other long side of the panel holding section 7c2. The R cover holding section 7c3 is continuously connected to the F cover holding section 7c4 and is extended downward. The F cover holding section 7c4 and the chassis connecting section 7c1 form the same plane in the back face of the image display apparatus 50A.

The panel holding section 7c2 is folded by approximately 90° with respect to the chassis connecting section 7c1. The inner face of the panel holding section 7c2 is the face to contact the liquid crystal panel 5. A buffer member 9c is stuck to the inner face of the panel holding section 7c2. The buffer member 9c is stuck to the inner face of the panel holding part 7c, so that the buffer member 9c may abut against the vicinity of the outer side of the outer area AR2 without entering the image display region AR1 of the liquid crystal panel 5 when the upper center fixing member 7c is fixed to the panel chassis 11. The upper center fixing member 7c, in a state of being attached to the panel chassis 11, holds the liquid crystal panel 5 by making the buffer member 9c abut against the liquid crystal panel 5. In FIG. 6, a thickness Tc is a combined thickness of the thickness Tm of the upper center fixing member 7c and the thickness of the buffer member 9c.

In the chassis connecting section 7c1, a through-hole 7c5 is formed. Moreover, in the chassis connecting section 7c1, a pair of cutouts 7c6 is provided with the through-hole 7c5 therebetween.

In the panel chassis 11, in a portion to be attached with the upper center fixing member 7c, protruding parts 11c1 (see FIG. 9) are provided corresponding to notches 7c6 of the upper center fixing member 7c, respectively, and a female screw 11c2 (see FIG. 9) is provided corresponding to the through-hole 7c5 of the upper center fixing member 7c. The upper center fixing member 7c is positioned and fixed to the panel chassis 11 by engaging the protruding parts 11c1 with the notches 7c6, respectively. The liquid crystal panel 5 and the back light part 6 are integrally fixed by inserting a female screw ZZ2 (see FIG. 9) into the through-hole 7c5 and tightening these parts together with the female screw 11c2, after positioning and fixing the upper center fixing member 7c to the panel chassis 11. That is, the liquid crystal panel 5 is sandwiched between the panel holding section 7c2 and the panel chassis 11. At this time, the buffer member 9c may be compressed to some extent. In this case, if the buffer member 10 is held between the liquid crystal panel 5 and the back light part 6, the buffer member 10 is compressed to some extent.

In the F cover holding part 7c4, a female screw 7c7 protruding upward of FIG. 6 is formed by burring. In the inner face of the F cover 2, in a state where the liquid crystal module 1 is attached to the F cover 2, a seat 2gz (see FIG. 8) against which the F cover 2 abuts is provided in a portion corresponding to the F cover holding section 7c4. Moreover, in the seat 2gz, a through-hole 2g (see FIG. 8) is provided in a portion corresponding to the female screw 7c7. By inserting the male screw ZZ (see FIG. 8) into the through-hole 2g and tightening these parts together with the female screw 7c7, the liquid crystal module 1 is attached to the F cover 2. A burring height of the female screw 7c7 is higher than the height of the screw head of the male screw ZZ2 inserted into the through-hole 7c5. The height of the screw head of the male screw ZZ2 is set to a height enough for the screw head to be contained inside the housing 4 (F cover 2).

In both ends of the R cover holding section 7c3, a pair of female screws 7c8 is provided. The center frame 3c shown in FIG. 1 abuts against the outer face of the R cover holding section 7c3. In the center frame 3c, in a state where the center frame 3c abuts against the R cover holding section 7c3, through-holes 3c1, 3c2 (see FIG. 13) are provided in portions corresponding to the female screws 7c8, respectively. By inserting male screws ZZ3 (see FIG. 15) into the through-holes 3c1, 3c2 and tightening these parts together with the female screws 7c8, respectively, the image display apparatus main body 50A (liquid crystal module 1) is fixed to the pedestal part 50B (pedestal fixing member 3a) via the center frame 3c.

Figure 7:
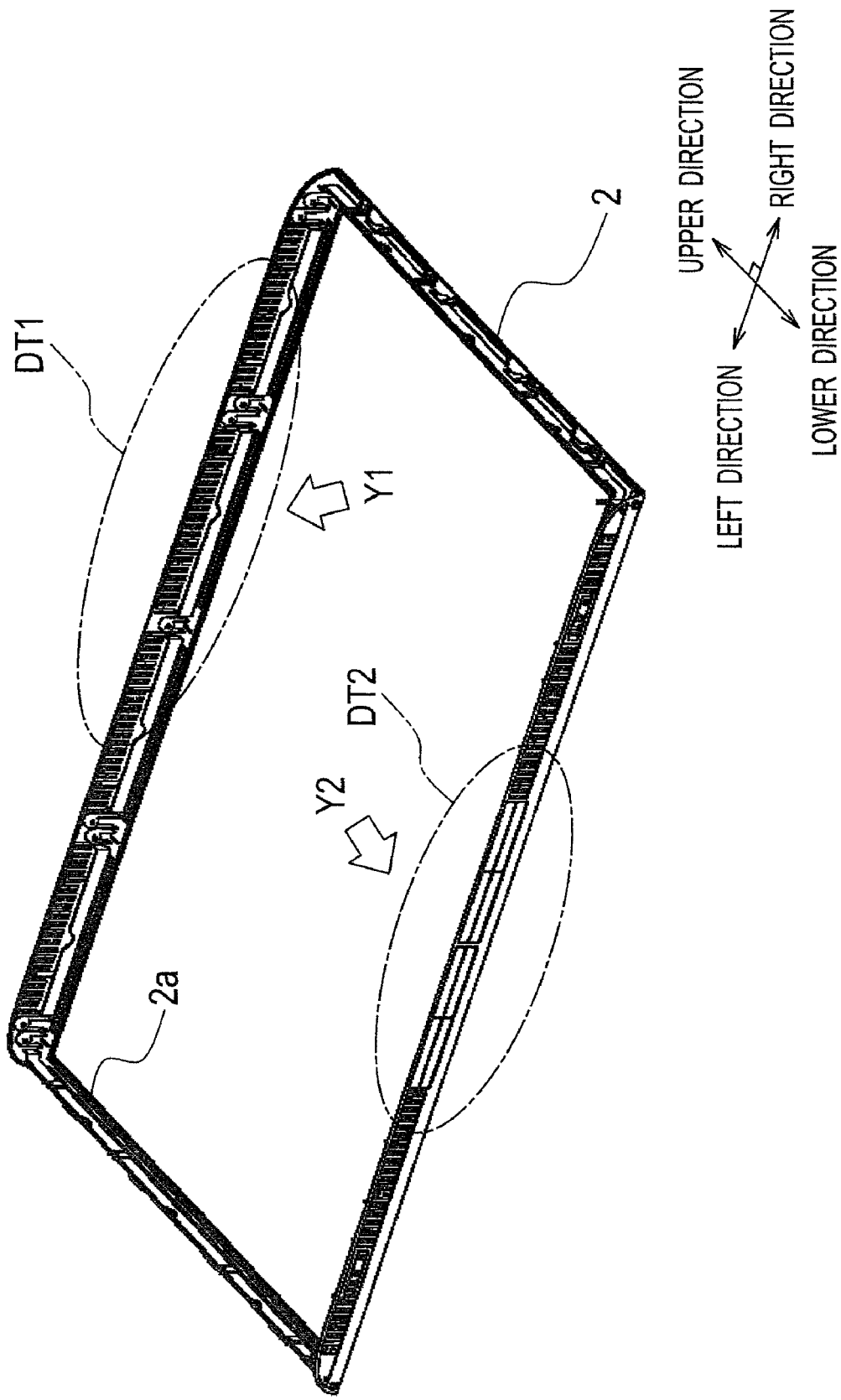
FIG. 7 is a perspective view on the back face side of the F cover according to the embodiment of the present invention.
Figure 8:
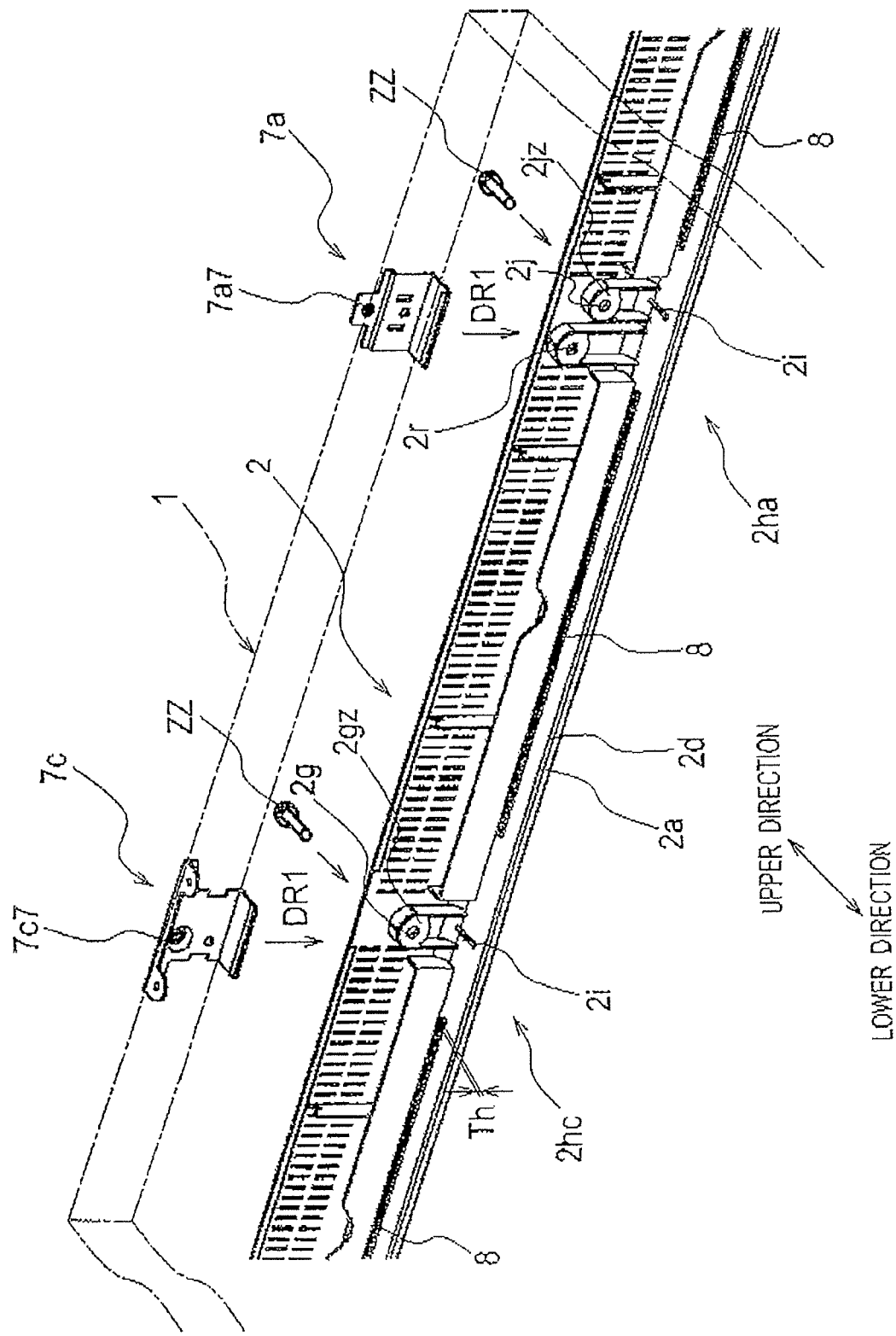
FIG. 8 is an enlarged perspective view when an upper part DT1 in FIG. 7 is seen from an arrow Y1 direction.

FIG. 7 is a perspective view of the F cover 2 when seen from an oblique lower-rightward direction on the back face side of the F cover 2. FIG. 8 is an enlarged perspective view when an upper part DT1 in FIG. 7 is seen from an arrow Y1 direction. In FIG. 8, a part of the liquid crystal module 1 attached with the fixing members 7a, 7c is shown with dotted lines.

The buffer member 8 is stuck to the inner face of a step section 2d of the opening window. The buffer member 8 is split so as not to interfere with the upper fixing member 7a, the upper fixing member 7b, and the upper center fixing member 7c, and the split buffer members 8 are discretely stuck to the inner face of the step section 2d of the opening window. In a state where the liquid crystal module 1 is attached to the F cover 2, the buffer member 8 is crushed to such an extent that no gap is produced between the liquid crystal module 1 and the F cover 2.

In FIG. 8, the step section 2d of the opening window is formed in the edge of the opening 2a. The step section 2d of the opening window protrudes in the same direction as the direction in which the buffer member 8 protrudes. Providing the step section 2d of the opening window has effects in making the fixing members 7a, 7b and 7c hardly visible from outside and in making a foreign substance, such as dust or dirt, difficult to enter the interior of the liquid crystal module 1. Moreover, providing the step section 2d of the opening window can increase the strength and rigidity against a deformation and the like of the F cover 2 itself. The height of the step section 2d of the opening window is set so that the step section 2d of the opening window does not contact the liquid crystal module 1 in a state where the liquid crystal module 1 is attached to the F cover 2.

In FIG. 8, the upper fixing member 7a and upper center fixing member 7c attached to the liquid crystal module 1 are mounted in the arrow DR1 direction with respect to the F cover 2. A section to be attached with the upper fixing member 7a in the inner face of the F cover 2 is a holding section 2ha formed in a shape corresponding to the upper fixing member 7a. A section to be attached with the upper center fixing member 7c in the inner face of the F cover 2 is a holding section 2hc formed in a shape corresponding to the upper center fixing member 7c. In each of the holding sections 2ha, 2hc, a protruding part 2i that extends outward from the F cover 2 as proceeding to the inside of the F cover 2 (protruding part 2i that extends in the vertical direction while slightly protruding in the back and forth direction) is formed. The position of the liquid crystal module 1 in the front face to back face direction (thickness direction) of the image display apparatus 50 is defined by the upper fixing member 7a and upper center fixing member 7c abutting against the protruding part 2i.

The female screw 7a7 of the upper fixing member 7a and the female screw 7c7 of the upper center fixing member 7c are provided in the upper fixing member 7a and the upper center fixing member 7c, respectively, so that the axial centers of the female screw 7a7 and female screw 7c7 may coincide with the axial centers of the through-hole 2j and through-holes 2g, respectively. Accordingly, by inserting the male screw ZZ into the through-hole 2j and tightening these parts together with the female screw 7a7 and also by inserting the male screw ZZ into the through-holes 2g and tightening these parts together with the female screw 7c7, the upper fixing member 7a and the upper center fixing member 7c are fixed to the F cover 2. A through-hole 2r is provided in the F cover 2. The through-hole 2r is used for fastening the F cover 2 to the R cover 3. By inserting a male screw (illustration is omitted) into the through-hole 2r and tightening these parts together with a female screw (illustration is omitted) provided in the R cover 3, the F cover 2 and the R cover 3 are fixed.

In the inner face of the F cover 2, a thickness Th of the buffer member 8 provided in the area where the upper fixing member 7a and upper center fixing member 7c are not attached differs from the thickness of the buffer members 9a, 9c present in an area where the upper fixing member 7a and upper center fixing member 7c are attached. Specifically, the thickness Ta of FIG. 5 and the thickness Tc of FIG. 6 are the same as the thickness Th of the buffer member 8. That is, a summed value of the thickness of the upper fixing member 7a and the thickness of the buffer member 9a is equal to a summed value of the thickness of the upper center fixing member 7c and the thickness of the buffer member 9c, and is equal to the value of the thickness of the buffer member 8. The fixing member 7 is fixed to the F cover 2 or the R cover 3 (frame-like housing) in other face (such as in the upper or lower side face) other than the display face.

In this manner, in this embodiment, the liquid crystal panel 5 and the back light part 6 are integrated using a plurality of small fixing members 7. Therefore, a conventional frame member (e.g., metal bezel), which is provided so as to abut against a peripheral area other than the image display region of the liquid crystal panel 5, is not used. Accordingly, in this embodiment using the fixing member 7 as the frame member, the amount or volume of the frame member can be reduced as compared with the conventional frame member, and a reduction in the mass of the frame member can be achieved. Moreover, a reduction in the thickness of the whole image display apparatus can be achieved because the conventional frame member is not used.

Furthermore, even if the liquid crystal module 1 is removed from the housing at the time of maintenance, a foreign substance, such as dust or dirt, is unlikely to enter the interior of the back light part 6 and a problem, such as damage of the liquid crystal panel 5, is unlikely to occur during operations because the liquid crystal panel 5 and the back light part 6 are connected by means of the fixing member 7.

In the configuration of this embodiment, if the rigidity of the image display apparatus main body 50A is increased further, the rigidity of the image display apparatus main body 50A may be partially reinforced by installing, with respect to a sheet-metal frame 6a (see FIG. 12) connected to the flat plate part 11d serving as the back face of the panel chassis 11 of the back light part 6, a metallic reinforcing sheet metal member, which is a separate component, in the frame part and the like in the longitudinal direction on the upper side. Moreover, the rigidity of the image display main body 50A may be reinforced by installing a reinforcing sheet metal member in the flat plate part 11d. In the description below, assume that the flat plate part 11d and the sheet-metal frame 6a are of the same member. Note that the center frame 3c shown in FIG. 1 is an example of the reinforcing sheet metal member. The upper center fixing member 7c is attached to the center frame 3c. If a reinforcing sheet metal member is provided in the sheet-metal frame 6a in this manner, the rigidity of the image display apparatus main body 50A can be maintained with the use of a plurality of fixing members 7 as the frame member while achieving a reduction in the thickness and mass of the image display apparatus 50. Note that, the reinforcing sheet metal member is an example of the columnar member, and the reinforcing sheet metal member may be replaced with a columnar member other than the sheet metal (e.g., a columnar member by die-casting), or may be made of a material other than metal.

Figure 9:
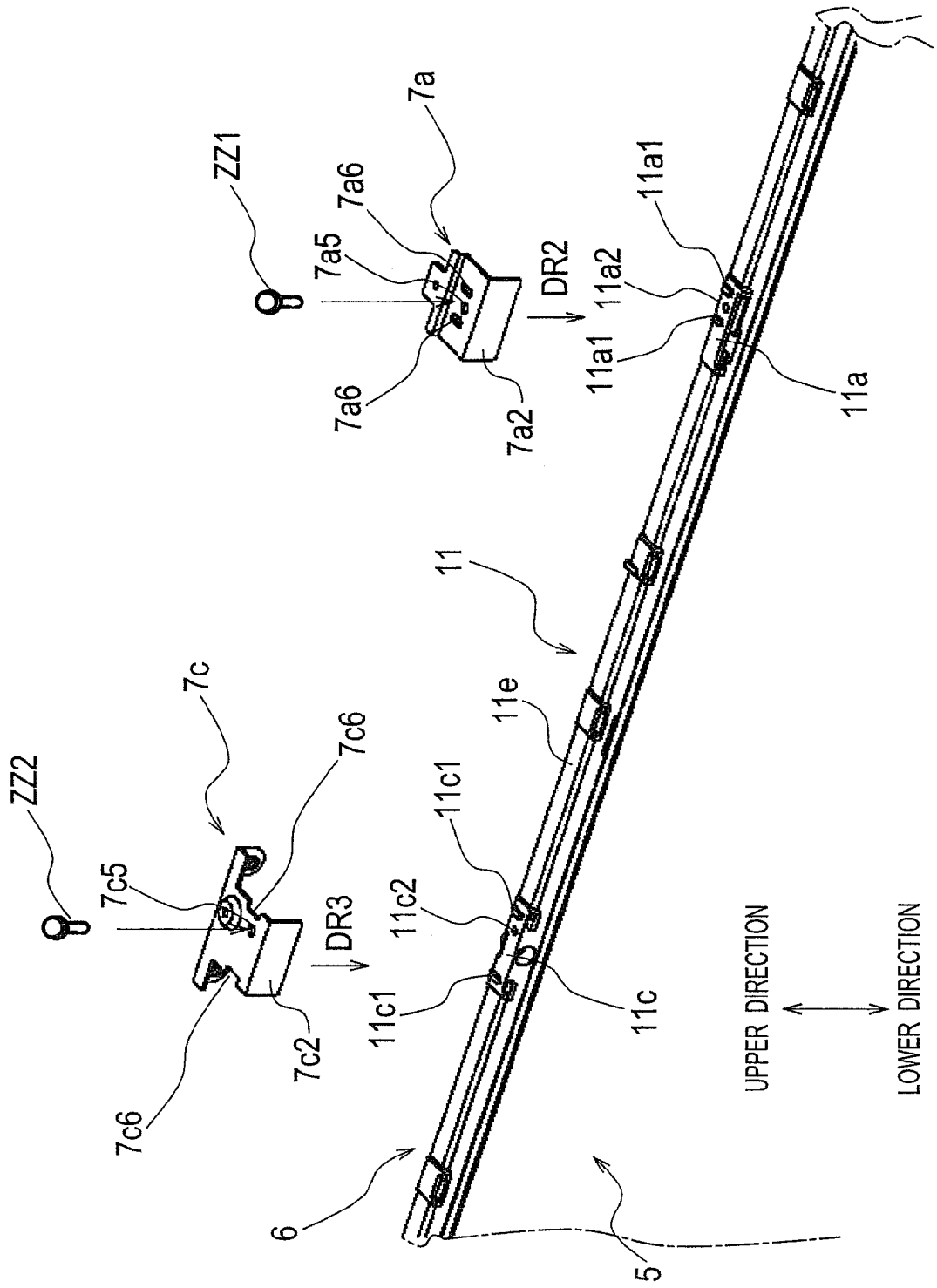
FIG. 9 is a perspective view for illustrating an assembly configuration of a liquid crystal panel and a back light part according to the embodiment of the present invention.

FIG. 9 is a perspective view for illustrating an assembly configuration of the liquid crystal panel 5 and the back light part 6. FIG. 9 shows a state where the liquid crystal panel 5 and the back light part 6 are overlapped with each other at a predetermined relative position, the state being prior to integrally fixing the liquid crystal panel 5 and the back light part 6 with the upper fixing member 7a and the upper center fixing member 7c. As shown in FIG. 9, the fixing member 7 and the panel chassis 11 are fixed to the liquid crystal panel 5 in other face (such as in the upper or lower side face) other than the display face. In FIG. 9, in the upper side face of the panel chassis 11 there are provided four pedestal parts 11a and one pedestal part 11c protruding upward (see FIGS. 4, 9).

As shown in FIG. 9, the upper fixing member 7a is mounted to the pedestal part 11a. The mounting procedure is as follows; (1) move the upper fixing member 7a in an arrow DR2 direction from above; (2) engage a pair of long holes 7a6 of the upper fixing member 7a with a pair of protruding parts 11a1 of the pedestal part 11a and mount the upper fixing member 7a to the pedestal part 11a so that the inner face of the panel holding section 7a2 may abut against the surface of the liquid crystal panel 5; and (3) insert the male screw ZZ1 into the through-hole 7a5 and tighten these parts together with the female screw 11a2, thereby integrally fixing the liquid crystal panel 5 and the back light part 6. Thus, a position in the front face to back face direction (in the thickness direction) and a position in the upper side face to the inside of the liquid crystal module direction (in the vertical direction) of the panel chassis 11 are restricted. The pair of long holes 7a6 is longer than the protruding part 11a1 in the front face to back face direction (in the thickness direction). When the fixing member 7a is mounted to the liquid crystal panel 5, the positioning for fixing the upper fixing member 7a to the panel chassis 11 with the screw is performed so that the fixing member 7a may not damage the liquid crystal panel 5. After positioning the upper fixing member 7a, the liquid crystal panel 5 is fixed to the back light part 6 with the male screw ZZ1.

The upper center fixing member 7c is mounted to the pedestal part 11c. The mounting procedure is as follows; (1) move the upper center fixing member 7c in an arrow DR3 direction from above; (2) engage a pair of cutouts 7c6 of the upper center fixing member 7c with a pair of protruding sections 11c1 of the pedestal part 11c, and also mount the upper center fixing member 7c to the pedestal part 11c so that the inner face of the panel holding section 7c2 may abut against the surface of the liquid crystal panel 5; and (3) insert the male screw ZZ2 into the through-hole 7c5 and tighten these parts together with the female screw 11c2, thereby integrally fixing the liquid crystal panel 5 and the back light part 6.

Since a pair of long holes 7a6 in the upper fixing member 7a and a pair of cutouts 7c6 in the upper center fixing member 7c have a function similar to each other, either one of the pair of long holes 7a6 and the pair of cutouts 7c6 may be formed in the upper fixing member 7a and in the upper center fixing member 7c. For example, in a state where the upper fixing member 7a and the upper center fixing member 7c are attached to the panel chassis 11, if the length (width) in the horizontal direction of the respective upper fixing member 7a and upper center fixing member 7c is large, then a pair of long holes 7a6 is formed in the upper fixing member 7a and the upper center fixing member 7c, while if the length (width) in the horizontal direction of the respective upper fixing member 7a and upper center fixing member 7c is small, a pair of cutouts 7c6 is formed in the respective upper fixing member 7a and upper center fixing member 7c.

Figure 10:
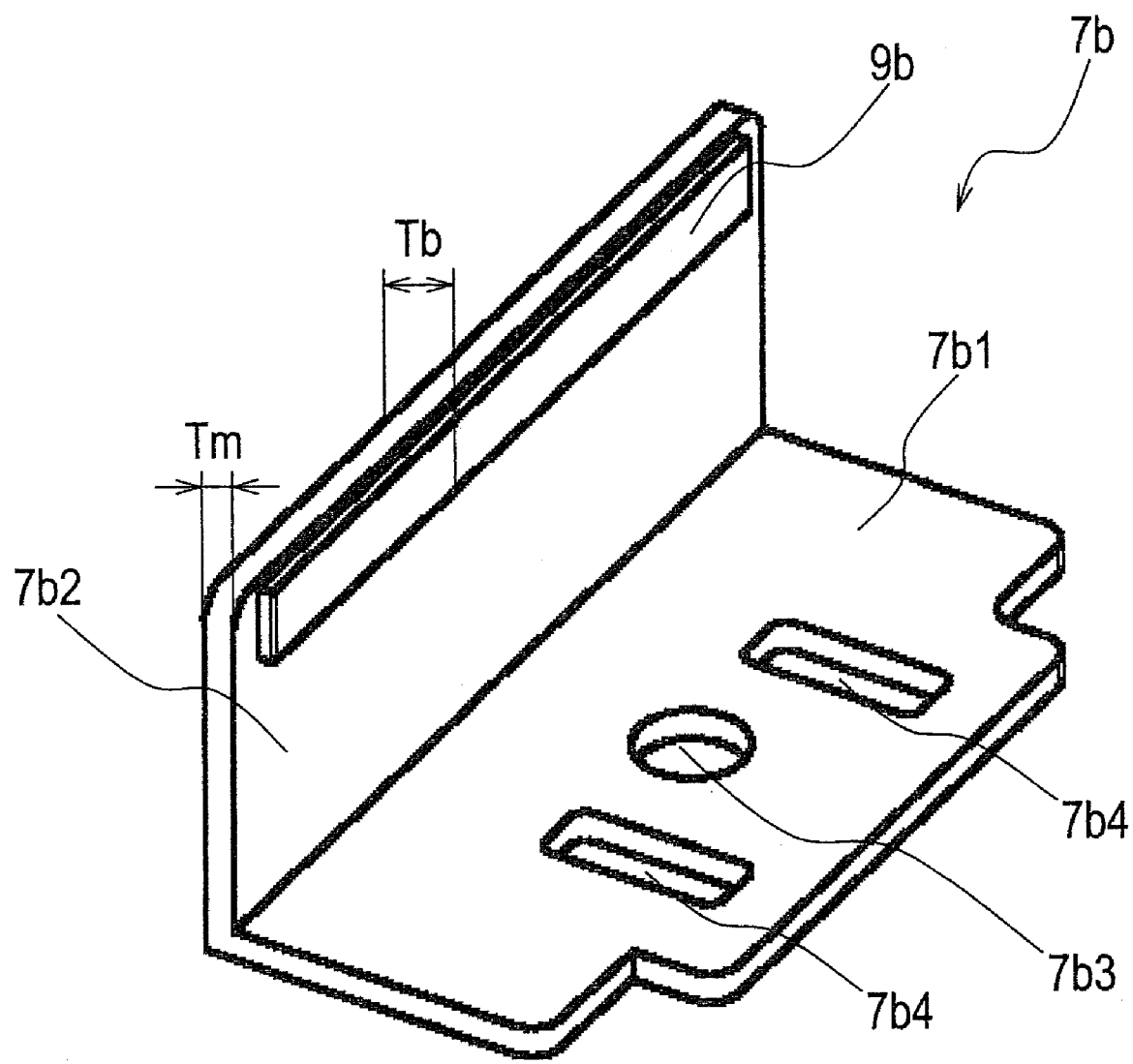
FIG. 10 is a perspective view of a lower fixing member according to the embodiment of the present invention.

FIG. 10 is a perspective view of the lower fixing member 7b. The lower fixing member 7b is formed by pressing a metal plate, and includes a chassis connecting section 7b1 and a panel holding section 7b2. The chassis connecting section 7b1 is formed in a generally rectangular shape. The panel holding section 7b2 is continuously connected to one long side of the chassis connecting section 7b1 and is extended upward. The metal plate comprising the chassis connecting section 7b1 and the panel holding section 7b2 is folded upward. Specifically, the panel holding section 7b2 is folded by approximately 90° with respect to the chassis connecting section 7b1.

The inner face of the panel holding section 7b2 is the face to contact the liquid crystal panel 5. A buffer member 9b is stuck to the inner face of the panel holding section 7b2. The buffer member 9b is stuck to the inner face of the panel holding section 7b2 so that the buffer member 9b, when the lower fixing member 7b is fixed to the panel chassis 11, may abut against the vicinity of the outer side of the outer area AR2 without entering the image display region AR1 of the liquid crystal panel 5. The lower fixing member 7b, in a state of being attached to the panel chassis 11, holds the liquid crystal panel 5 by making the buffer member 9b abut against the liquid crystal panel 5. In FIG. 10, a thickness Tb is a combined thickness of the thickness Tm of the lower fixing member 7b and the thickness of the buffer member 9b.

In the center portion of the chassis connecting section 7b1, a through-hole 7b3 is formed. In the chassis connecting section 7b1, a pair of long holes 7b4 is formed with the through-hole 7b3 therebetween.

In the panel chassis 11, a pedestal part (illustration is omitted) similar to the pedestal part 11a is provided in a portion to be attached with the lower fixing member 7b. By engaging a protruding section of the pedestal part with the long holes 7b4, the lower fixing member 7b is positioned and fixed to the panel chassis 11. In the pedestal part of the panel chassis 11, in a state where the lower fixing member 7b is attached to the panel chassis 11, a female screw (illustration is omitted) is provided in a portion corresponding to the through-hole 7b3. The liquid crystal panel 5 and the back light part 6 are integrally fixed by inserting a male screw (illustration is omitted) into the through-hole 7b3 and tightening these parts together with a female screw after positioning and fixing the lower fixing member 7b to the panel chassis 11. That is, the liquid crystal panel 5 is sandwiched between the panel holding section 7b2 and the panel chassis 11. At this time, the buffer member 9b may be compressed to some extent. In this case, if the buffer member 10 is held between the liquid crystal panel 5 and the back light part 6, the buffer member 10 is compressed to some extent.

Figure 11:
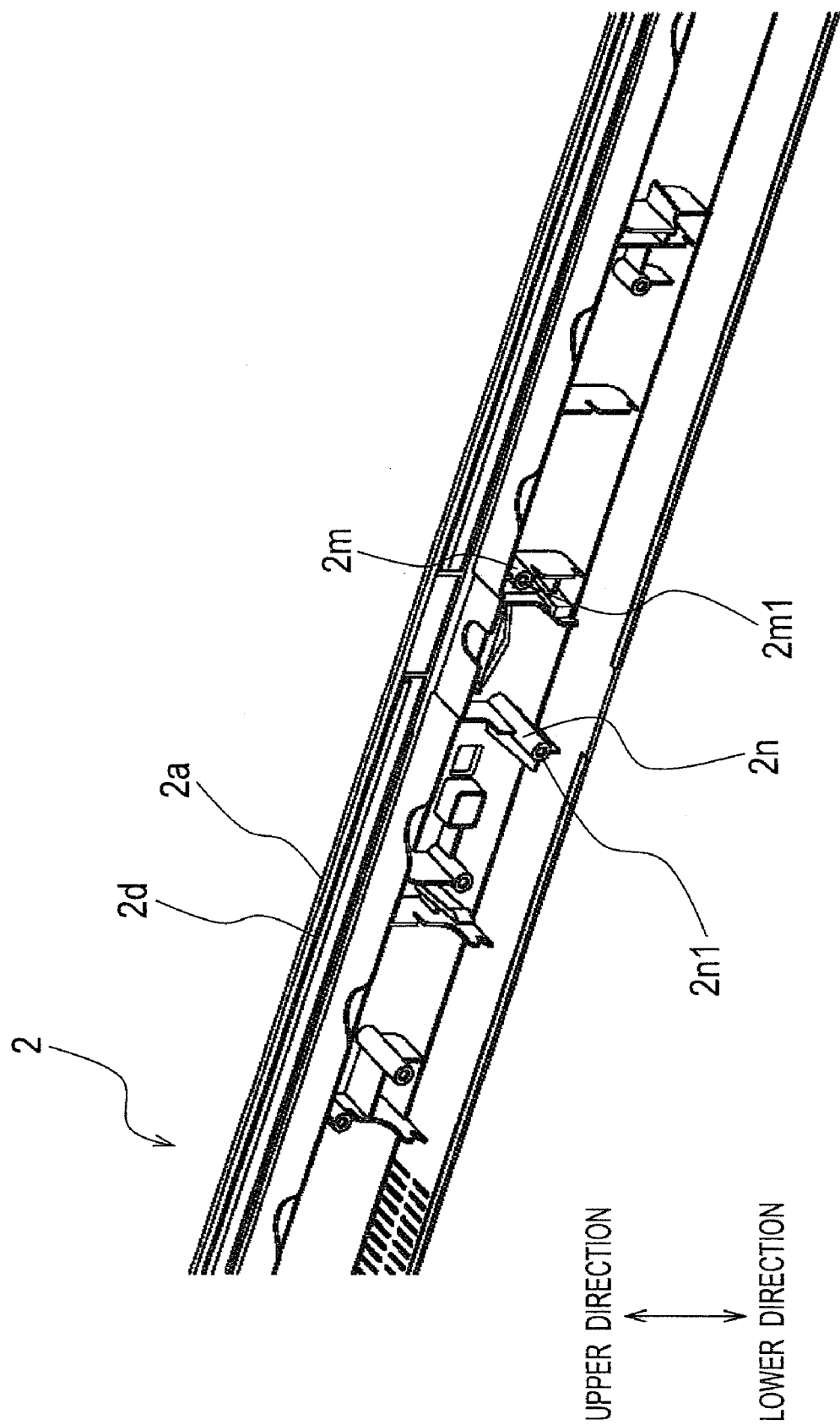
FIG. 11 is an enlarged perspective view when a lower part DT2 in FIG. 7 is seen from an arrow Y2 direction.

FIG. 11 is an enlarged perspective view when the lower part DT2 in FIG. 7 is seen from the arrow Y2 direction. On the lower side of the liquid crystal module 1, the liquid crystal module 1 is fixed to the F cover 2 without directly screwing the lower fixing member 7b to the F cover 2. Specifically, as shown in FIG. 11, in a portion, to which the lower fixing member 7b is mounted, inside the lower frame of the F cover 2, a boss 2m having a prepared-hole 2m1 is provided. In the panel chassis 11, in a state where the liquid crystal module 1 is attached to the F cover 2, a through-hole (illustration is omitted) corresponding to the prepared-hole 2m1 is formed. By inserting a male screw (illustration is omitted) into the through-hole and screwing this into the prepared-hole 2m1, the F cover 2 and the panel chassis 11 are integrally fixed. Therefore, the panel chassis 11 and the F cover (frame-like housing) 2 are fixed to each other on the side face which is other face other than the front face having the image display region AR1 of the liquid crystal panel 5. In a portion, to which the center frame 3c (see FIG. 13) is mounted, inside the lower frame of the F cover 2, a boss 2n having a prepared-hole 2n1 is provided.

The respective fixing members 7 are not necessarily limited to the ones of the shape provided with the F cover holding section or the R cover holding section. For example, the F cover holding section or the R cover holding section may be provided in the panel chassis 11 whereby the F cover 2 or the R cover 3 may be fixed to the panel chassis 11.

As described above, the buffer member 8 is provided in a portion, where the upper fixing member 7a, the lower fixing member 7b, and the upper center fixing member 7c are not present, in an area between the liquid crystal panel 5 and the F cover 2. That is, the buffer member 8 is provided between the liquid crystal panel 5 and the F cover 2 so as not to interfere with the fixing member 7. The thickness Th (see FIG. 8) of the buffer member 8 differs from the thicknesses of the buffer members 9a, 9b and 9c that are attached to the upper fixing member 7a, the lower fixing member 7b and the upper center fixing member 7c, respectively. For example, the respective thicknesses Ta, Tb and Tc (see FIGS. 5, 6, 10), which are the combined thickness of the thickness Tm of the respective upper fixing member 7a, lower fixing member 7b and upper center fixing member 7c and the thickness of the respective buffer members 9a, 9b and 9c are equal to the thickness Th of the buffer member 8. If the thicknesses of the upper fixing member 7a, the lower fixing member 7b, and the upper center fixing member 7c differ to each other, the thicknesses of the buffer members 9a, 9b and 9c may be adjusted so that the respective thicknesses Ta, Tb and Tc, which are the combined thickness of the thickness Tm of the respective upper fixing member 7a, lower fixing member 7b and upper center fixing member 7c and the thickness of the respective buffer members 9a, 9b and 9c, may be equal to the thickness Th of the buffer member 8. At least, the thickness Th of the buffer member 8 just needs to be larger than the thickness Tm of the respective upper fixing member 7a, lower fixing member 7b, and upper center fixing member 7c. If the respective thicknesses Tm of the upper fixing member 7a, the lower fixing member 7b, and the upper center fixing member 7c differ from each other, the thickness of the buffer member 8 attached adjacent to the upper fixing member 7a, the lower fixing member 7b, and the upper center fixing member 7c just needs to be larger than the respective thicknesses Tm of the upper fixing member 7a, the lower fixing member 7b, and the upper center fixing member 7c.

In this embodiment, the fixing members 7 are mounted to the upper side face and lower side face of the liquid crystal panel 5, but not limited thereto. For example, the fixing members 7 may be mounted to the right side face and left side face of the liquid crystal panel 5. Moreover, in this embodiment, the fixing member 7 is fixed to the F cover 2 or R cover 3 (frame-like housing) on the side face, which is other face other than the display face, however, the fixed position is not to be limited to the side-face side, and may be the back face side.

Figure 12:
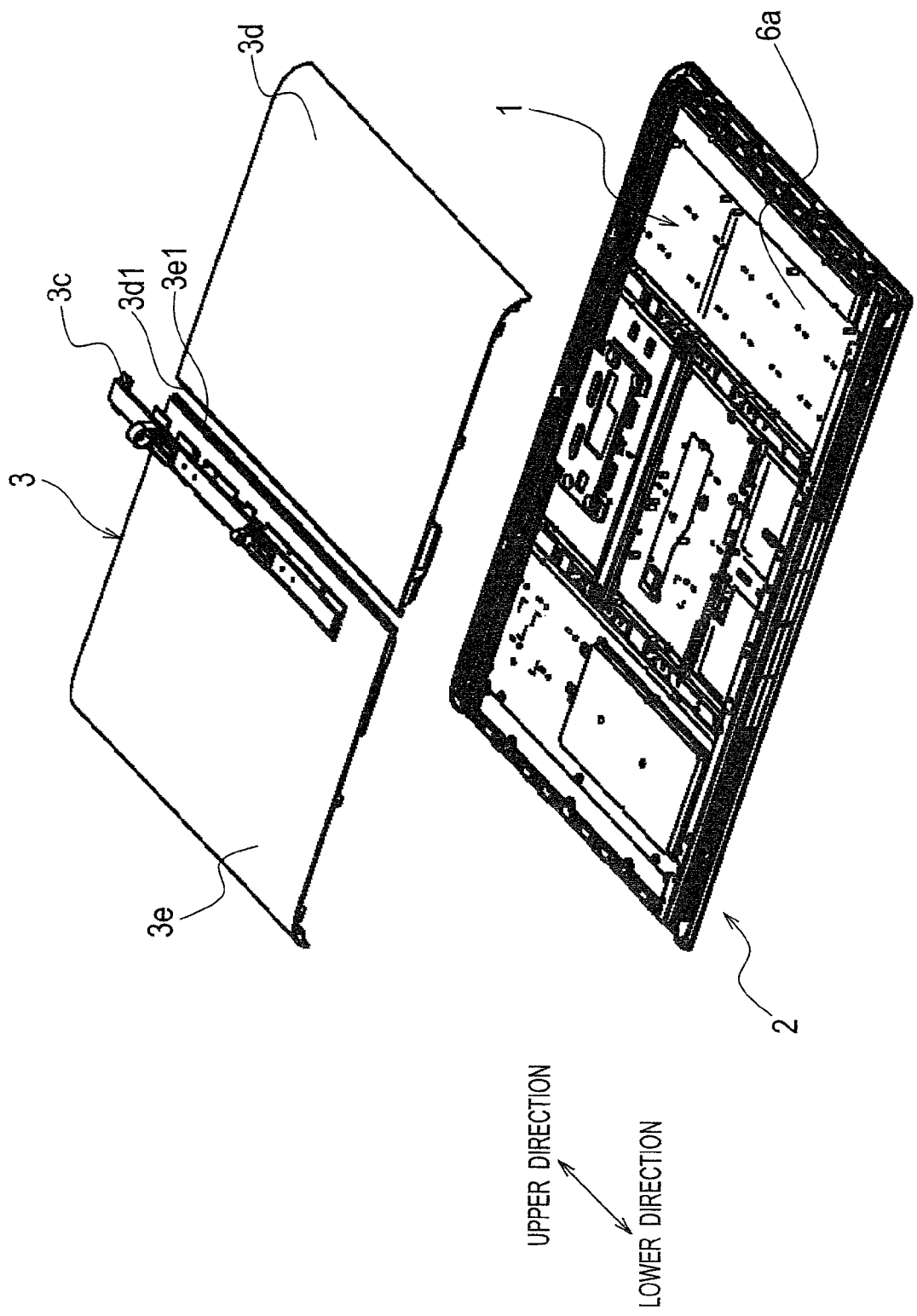
FIG. 12 is an exploded view on the back face side of the image display apparatus according to the embodiment of the present invention.

FIG. 12 is an exploded view on the back face side of the image display apparatus 50. With reference to FIG. 12, an assembly and fixing configuration on the back face side of the image display apparatus 50 is described.

In FIG. 12, the liquid crystal module 1 with the F cover 2 attached thereto is placed with the back face side of the image display apparatus 50 facing upward. The R cover 3 includes the center frame 3c, the right R cover 3d, and the left R cover 3e. A method of assembling the R cover 3 to the liquid crystal module 1 is as follows: (1) the center frame 3c is attached to the liquid crystal module 1 and the F cover 2; and (2) the right R cover 3d and the left R cover 3e are attached to the liquid crystal module 1 and the F cover 2.

The center frame 3c is formed by integrally molding a plate made of metal such as aluminium. The center frame 3c serves as the reinforcing sheet metal member for reinforcing the rigidity of the sheet-metal frame 6a. The center frame 3c contributes to a reduction in the thickness of the image display apparatus main body 50A, the reduction being equal to or greater than at least the thickness of the R cover 3. In the actual product, the center frame 3c is painted taking into consideration the designability. Since the center frame 3c and the sheet-metal frame 6a are made of metal, these parts are excellent in thermal conductivity. Since a part of the center frame 3c and sheet-metal frame 6a is exposed to the outside on the back face side of the image display apparatus 50, the heat generated in the inside of the housing of the image display apparatus main body 50A is directly and efficiently radiated to the outside through the part of the center frame 3c and sheet-metal frame 6a. As shown in FIG. 1, a base 3f of the center frame 3c is continuously attached to the right R cover 3d and left R cover 3e without a step, in an exposed state on the same plane as the reference back face 3b of the right R cover 3d and left R cover 3e. That is, the center frame 3c is configured as apart of the housing 4, wherein in order to achieve a reduction in the thickness of the image display apparatus main body 50A, the base 3f of the center frame 3c is attached so as to maintain a minimum distance TK between the reference front face 2b and the reference back face 3b.

Figure 13:
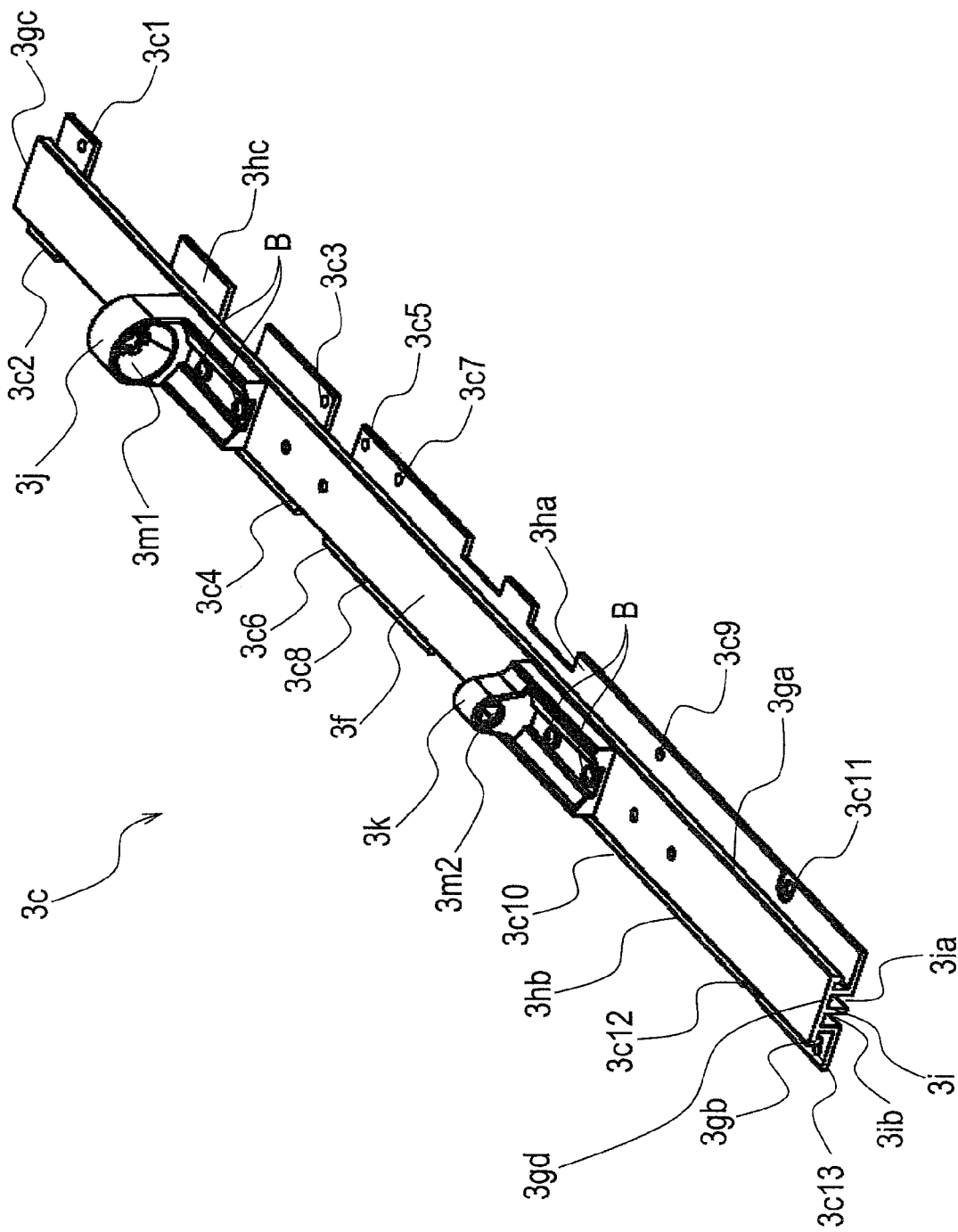
FIG. 13 is a perspective view of a center frame of an R cover according to the embodiment of the present invention.

FIG. 13 is a perspective view of the center frame 3c. The center frame 3c includes the base 3f, a right side cover connecting part 3ga, a left side cover connecting part 3gb, a right R cover abutment 3ha, a left R cover abutment 3hb, and a protruding part 3i. The base 3f connects the upper side to the lower side of the sheet-metal frame 6a on the back face of the liquid crystal module 1 to reinforce the sheet-metal frame 6a. The right side cover connecting part 3ga is continuously connected to one long side of the base 3f and extends in the thickness direction of the base 3f. The left side cover connecting part 3gb is continuously connected to the other long side of the base 3f and extends in the thickness direction of the base 3f. The right R cover abutment 3ha is continuously connected to the rear face of the base 3f and is formed in an L shape as viewed in cross-section. The right R cover abutment 3ha includes a lower part that extends in parallel to the base 3f. The left R cover abutment 3hb is continuously connected to the rear face of the base 3f and is formed in an L shape as viewed in cross-section. The left R cover abutment 3hb includes a lower part that extends in parallel to the base 3f. The protruding part 3i protrudes downward from the rear face of the base 3f. The protruding part 3i extends in the vertical direction of the image display apparatus main body 50A.

On the upper side of the base 3f, an upper pedestal fixing member connecting part 3j is fixed with a male screw (or bolt) B. On the lower side of the base 3f, an lower pedestal fixing member connecting part 3k is fixed with the male screw (or bolt) B. If the image display apparatus main body 50A is not supported by the pedestal part 50B (e.g., if the image display apparatus main body 50A is hung on a wall with a wall hanging member and the like), the upper pedestal fixing member connecting part 3j and the lower pedestal fixing member connecting part 3k are not installed in the base 3f.

The right R cover 3d includes a flange part 3d1 in a side opposite to the left R cover 3e (see FIG. 12). The flange part 3d1 is fitted into an L-shaped space formed by the right side cover connecting part 3ga, the base 3f, and the right R cover abutment aha shown in FIG. 13 and the right R cover 3d is continuously connected to the right side cover connecting part 3ga whereby the right R cover 3d is fixed to the center frame 3c. The left R cover 3e includes a flange part 3e1 in a side opposite to the right R cover 3d (see FIG. 12). The flange part 3e1 is fitted into an L-shaped space formed by the left side cover connecting part 3gb, the base 3f, and the left R cover abutment 3hb shown in FIG. 13 and the left R cover 3e is continuously connected to the left side cover connecting part 3gb whereby the left R cover 3e is fixed to the center frame 3c.

The protruding part 3i extends in the longitudinal direction of the base 3f, and has a function as a rib to reinforce the whole center frame 3c. The center frame 3c maintains a high strength by means of the protruding part 3i although the center frame 3c is lightweight. A pair of penetrating grooves 3ia, 3ib is formed in a rear side portion of the base 3f (a portion on the sheet-metal frame 6a side in the base 3f, a portion on the liquid crystal module 1 side in the base 3f). Specifically, the penetrating groove 3ia is formed between the rear side of the right R cover abutment 3ha and the protruding part 3i and extends in parallel to the long side of the base 3f. The penetrating groove 3ib is formed between the rear side of the left R cover abutment 3hb and the protruding part 3i and extends in parallel to the long side of the base 3f. The penetrating grooves 3ia, 3ib efficiently radiate a heat (to be described in detail later) to the outside of the housing 4, the heat being conducted to the interior of the back light part 6 or the center frame 3c. Note that, the penetrating grooves 3ia, 3ib are not limited to the shape of this embodiment, but can be suitably modified without departing from the scope of the present invention. For example, in place of the penetrating grooves 3ia, 3ib or in addition to the penetrating grooves 3ia, 3ib, a through-hole may be formed in the center frame 3c. The center frame 3c is installed in the image display main body 50A so that the longitudinal direction of the center frame 3c coincides with the vertical direction of the image display main body 50A. A through-hole is formed in the F cover 2 and/or R cover 3 so that the upper openings of the penetrating grooves 3ia, 3ib communicate with the outside of the housing 4. Note that the through-hole may be formed in the F cover and/or R cover 3 so that the lower openings of the penetrating grooves 3ia, 3ib communicate with the outside of the housing 4. Thus, the atmospheric air flows into the interior of the penetrating grooves 3ia, 3ib, and efficiently radiates a heat to the outside of the housing 4, the heat being conducted to the interior of the back light part 6 or the center frame 3c.

The upper pedestal fixing member connecting part 3j and the lower pedestal fixing member connecting part 3k are metal members, and are formed by die-casting, for example. The upper pedestal fixing member connecting part 3j and the lower pedestal fixing member connecting part 3k are disposed spaced apart from each other on the base 3f in the longitudinal direction of the center frame 3c, and are fixed at positions generally symmetric with respect to the center portion of the center frame 3c. Note that, in the longitudinal direction of the center frame 3c, the upper pedestal fixing member connecting part 3j may be disposed at a position closer to the center portion of the center frame 3c as compared with the fixed position of the lower pedestal fixing member connecting part 3k.

Figure 19:
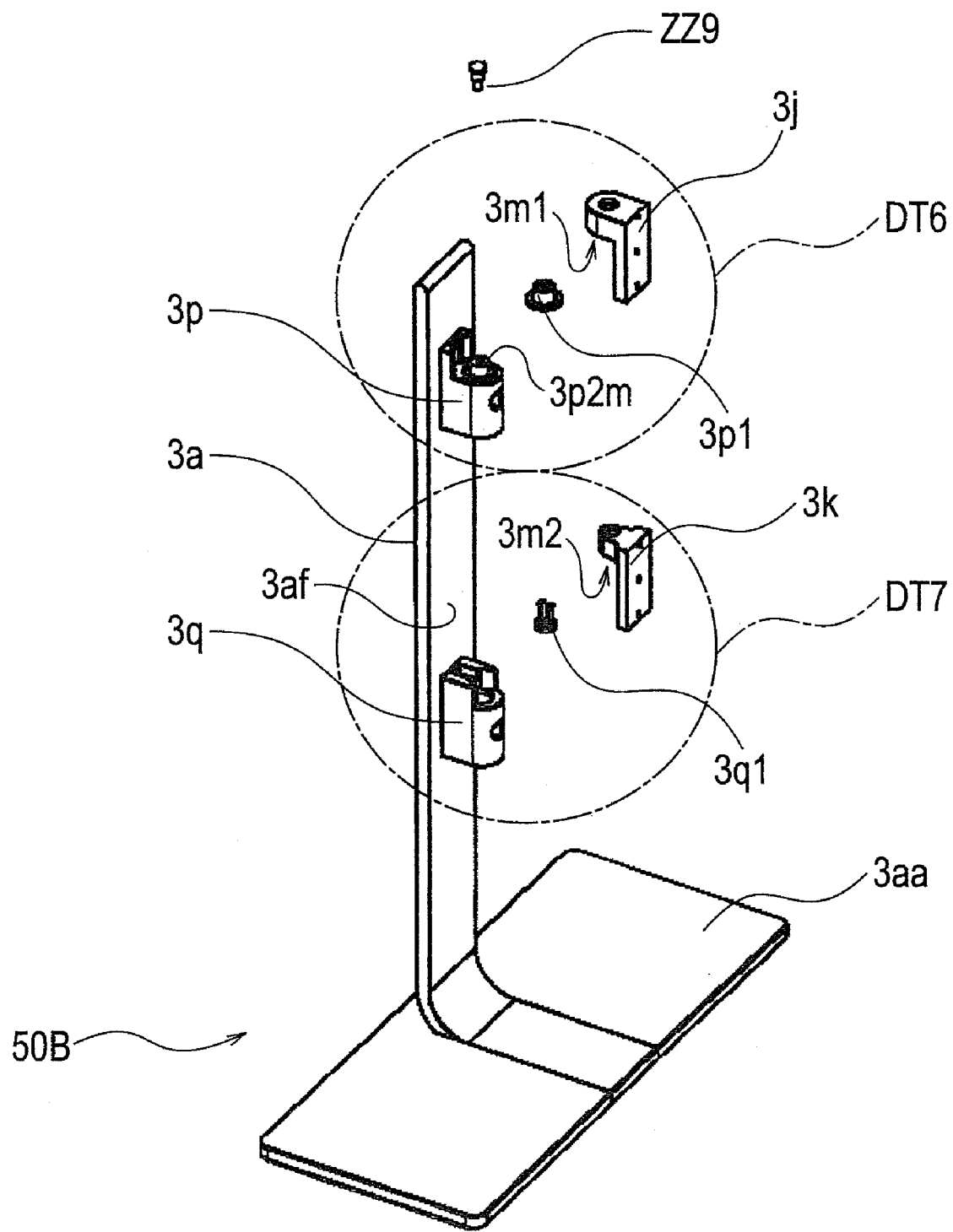
FIG. 19 is a perspective exploded view illustrating a connecting part of the pedestal part and the center frame according to the embodiment of the present invention.

As shown in FIG. 19, in the pedestal fixing member 3a of the pedestal part 50B, a metal upper center frame connecting part 3p and a metal lower center frame connecting part 3q are respectively fixed at positions corresponding to the upper pedestal fixing member connecting part 3j and lower pedestal fixing member connecting part 3k attached to the center frame 3c. By fitting an upper pedestal installing part 3m1 of the upper pedestal fixing member connecting part 3j and a lower pedestal installing part 3m2 of the lower pedestal fixing member connecting part 3k into the upper center frame connecting part 3p and the lower center frame connecting part 3q, respectively, the image display apparatus main body 50A is supported by the pedestal part 50B. The pedestal part 50B supports the image display apparatus main body 50A with the use of the upper pedestal installing part 3m1 and lower pedestal installing part 3m2, which are dents, so that the image display apparatus main body 50A is capable of a swing movement (swivel movement) in the horizontal direction.

Figure 14:
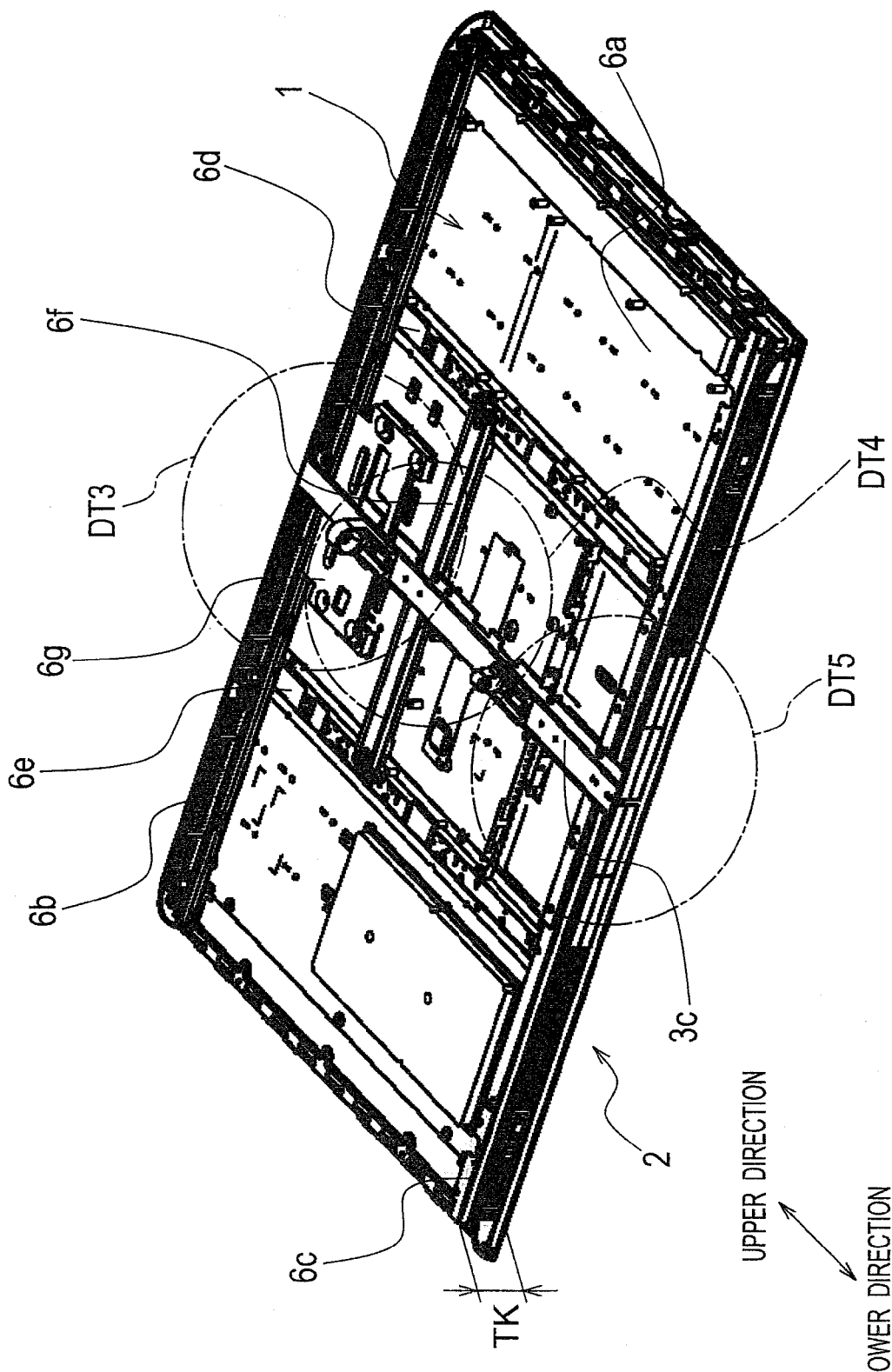
FIG. 14 is a perspective view on the back face side of the liquid crystal module in a state where a left R cover and a right R cover are removed from the R cover, according to the embodiment of the present invention.
Figure 15:
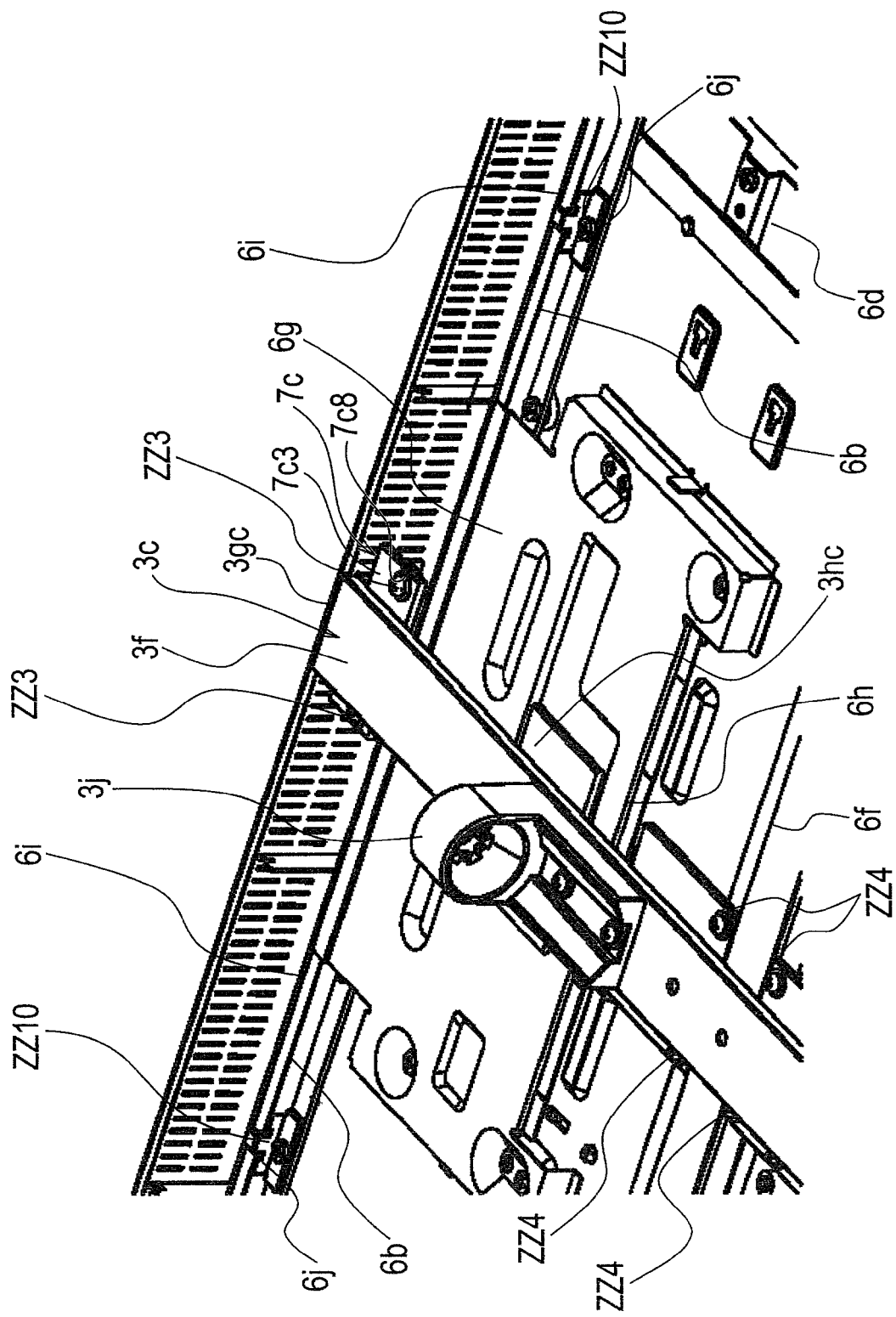
FIG. 15 is a partially enlarged view illustrating a portion where the center frame is attached to the liquid crystal module, according to the embodiment of the present invention.
Figure 16:
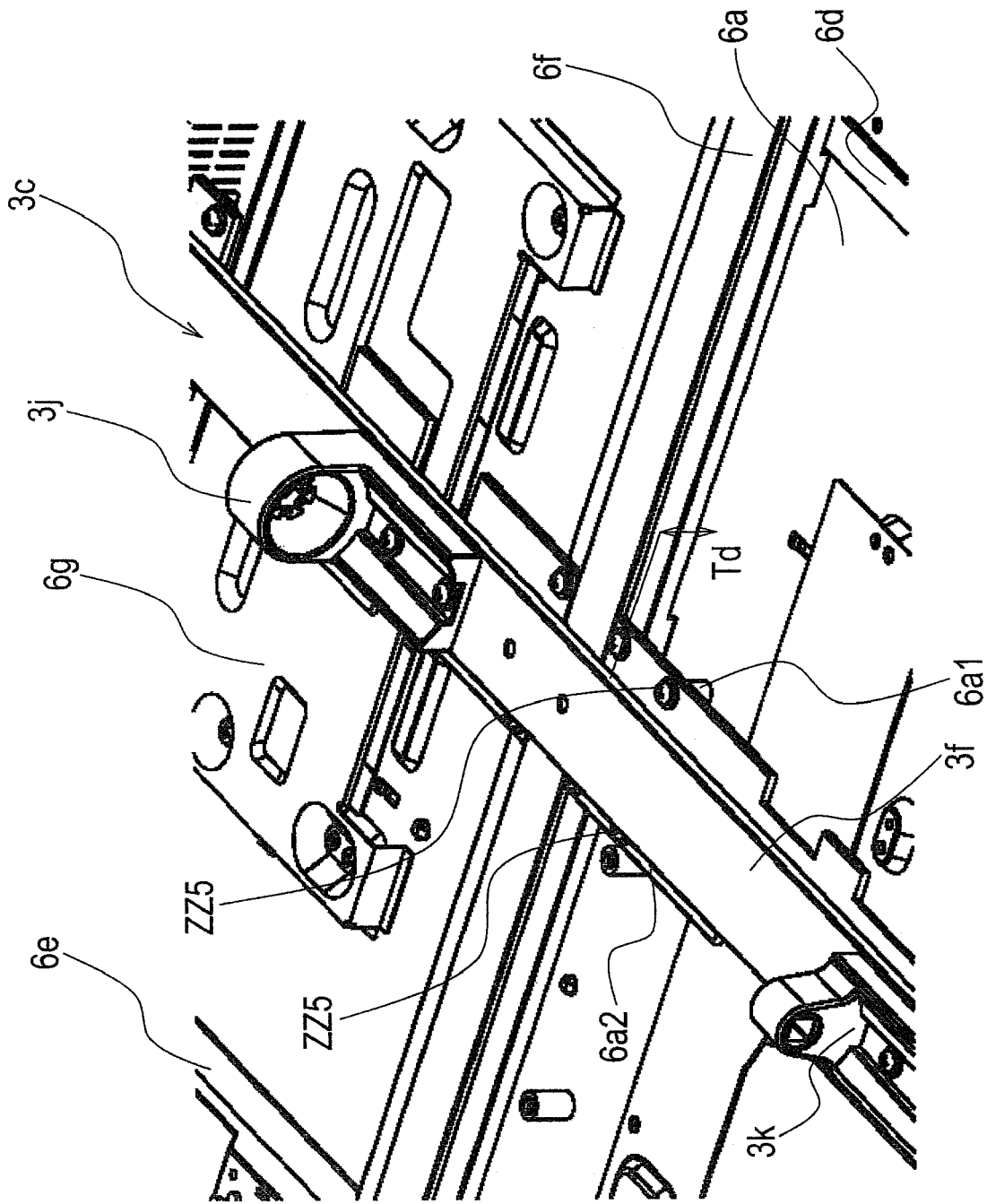
FIG. 16 is a partially enlarged view illustrating a portion where the center frame is attached to the liquid crystal module, according to the embodiment of the present invention.
Figure 17:
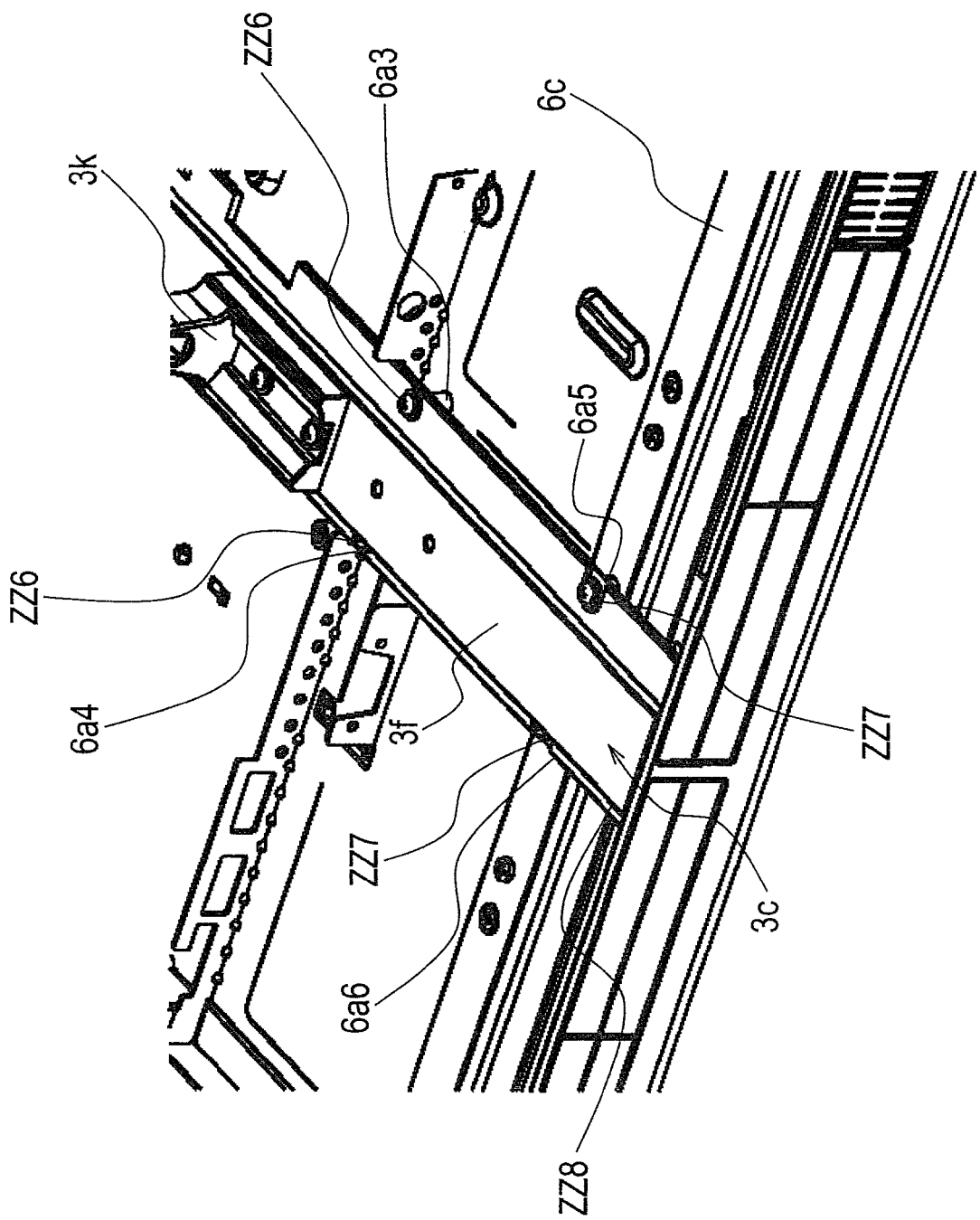
FIG. 17 is a partially enlarged view illustrating a portion where the center frame is attached to the liquid crystal module, according to the embodiment of the present invention.

FIG. 14 is a perspective view for illustrating an internal configuration on the back face side of the liquid crystal module 1. Specifically, FIG. 14 is a perspective view when the back face side of the liquid crystal module 1 is seen from an oblique lower-rightward direction in a state where the left R cover 3e and the right R cover 3d are removed from the R cover 3. FIG. 15 to FIG. 17 are partially enlarged views illustrating portions where the center frame 3c is attached to the liquid crystal module 1. Specifically, FIG. 15 is a perspective enlarged view when an upper area DT3 in FIG. 14 is seen from an oblique lower-rightward direction on the back face side of the F cover 2. FIG. 16 is a perspective enlarged view when an area DT4 in the center portion in FIG. 14 is seen from an oblique lower-rightward direction on the back face side of the F cover 2. FIG. 17 is a perspective enlarged view when a lower area DT5 in FIG. 14 is seen from an oblique lower-rightward direction on the back face side of the F cover 2.

In order to achieve a reduction in the thickness and mass of the whole liquid crystal module 1, the sheet-metal frame 6a shown in FIG. 14 comprises a lightweight metal such as aluminium and is formed by die-casting. In the conventional image display apparatus, a metal bezel and a sheet-metal frame are formed from an iron material. In contrast, in the image display apparatus 50, since the sheet-metal frame 6a is formed from a lightweight metal, if the thickness of the liquid crystal module is relatively large, the image display apparatus 50 may be unable to maintain the strength and rigidity of the image display apparatus main body 50A at the same level as the conventional image display apparatus. In order to solve this problem, a metal upper reinforcing plate 6b is installed in an upper frame section in the longitudinal direction of the sheet-metal frame 6a (see FIGS. 14, 15) and a metal lower reinforcing plate 6c is installed in a lower frame section in the longitudinal direction of the sheet-metal frame 6a (see FIG. 14, FIG. 17), thereby improving the rigidity of the image display apparatus main body 50A. The upper reinforcing sheet-metal 6b and the lower reinforcing sheet-metal 6c are beams having an L-shaped or generally U-shaped cross section.

Moreover, a pair of upper connection reinforcing sheet-metal 6d and lower connection reinforcing sheet-metal 6e that connect the upper reinforcing sheet-metal 6b and the lower reinforcing sheet-metal 6c are installed on the sheet-metal frame 6a. A right-and-left connection reinforcing sheet-metal 6f that connects the pair of upper connection reinforcing sheet-metal 6d and lower connection reinforcing sheet-metal 6e is installed on the sheet-metal frame 6a, and then the center frame 3c is fixed to the sheet-metal frame 6a. Thereby, the strength and rigidity of the image display apparatus main body 50A can be improved further. With the above-described configuration, a heat conduction path that transfers heat from a heat generating part of the image display apparatus 50 to the center frame 3c is formed in the inside of the liquid crystal module 1. Note that, four female screw parts 3n shown in FIG. 1 are attached onto the upper connection reinforcing sheet-metal 6d and the lower connection reinforcing sheet-metal 6e (illustration is omitted in FIG. 14). The upper reinforcing sheet-metal 6b, the lower reinforcing sheet-metal 6c, the upper connection reinforcing sheet-metal 6d, the lower connection reinforcing sheet-metal 6e, and the right-and-left connection reinforcing sheet-metal 6f are formed from a lightweight metal, such as aluminium.

In this manner, by providing the upper reinforcing sheet-metal 6b, the lower reinforcing sheet-metal 6c, the upper connection reinforcing sheet-metal 6d, the lower connection reinforcing sheet-metal 6e, and the right-and-left connection reinforcing sheet-metal 6f in the sheet-metal frame 6a, the rigidity of the image display apparatus main body 50A can be maintained while achieving a reduction in the mass of the liquid crystal module 1. By having the sheet-metal frame 6a, the upper reinforcing sheet-metal 6b, the lower reinforcing sheet-metal 6c, the upper connection reinforcing sheet-metal 6d, the lower connection reinforcing sheet-metal 6e, the right-and-left connection reinforcing sheet-metal 6f, and the pedestal fixing member 3a of the pedestal part 50B made of metal, an assembly of these parts has a heat sink function with an excellent thermal conductivity. Therefore, the heat generated in the inside of the housing 4 of the image display apparatus main body 50A is directly and efficiently radiated to the outside of the image display apparatus main body 50A.

Moreover, by attaching the center frame 3c to the liquid crystal module 1 so that the back face of the base 3f of the center frame 3c is on the same plane as the reference back face 3b, the inner volume of the housing 4 is minimized while improving the rigidity of the liquid crystal module 1. Therefore, since the thickness of the image display apparatus main body 50A can be maintained at the minimum thickness TK, a reduction in both mass and thickness of the image display apparatus main body 50A can be achieved. Furthermore, since the pedestal part 50B supports the image display apparatus main body 50 via the upper pedestal fixing member connecting part 3j and lower pedestal fixing member connecting part 3k provided in the upper section and lower section of the center frame 3c, respectively, it is possible to prevent a load from concentrating on a part of the back light part 6. Therefore, a degradation in the display image quality, such as a degradation in the luminance uniformity in the screen caused by a bend or distortion of the back light part 6, can be prevented. Note that, preferably, a plurality of pedestal fixing member connecting parts is installed at positions symmetric with respect to the center portion of the center frame 3c, in the longitudinal direction of the center frame 3c.

In the case where only the image display apparatus main body 50A is tilted forward and installed on a wall, because the female screw parts 3n are formed on the upper connection reinforcing sheet-metal 6d and lower connection reinforcing sheet-metal 6e, it is possible to prevent a load from concentrating on a part of the back light part 6 and also possible to prevent a degradation in the display image quality. Note that, as described later, if the upper pedestal fixing member connecting part 3j is fitted into a rotary shaft on the pedestal part 50B side, then in the longitudinal direction of the center frame 3c, the upper pedestal fixing member connecting part 3j may be disposed at a position closer to the center portion of the center frame 3c as compared with the fixed position of the lower pedestal fixing member connecting part 3k.

Next, with reference to FIGS. 13, 15, a configuration for attaching the center frame 3c to the liquid crystal module 1 is described. As shown in FIG. 15, the upper section of the center frame 3c is attached to the liquid crystal module 1 by abutting the center frame 3c against the R cover holding section 7c3 (see FIG. 6 as well) of the upper center fixing member 7c and inserting a pair of male screws ZZ3 into the through-holes 3c1 and 3c2 and tightening these parts together with a pair of female screws 7c8 (see FIG. 6), respectively. At this time, an F cover top-side abutment 3gc that is the upper end face of the center frame 3c abuts against an inner section of the upper face of the F cover 2. In addition, as described in FIG. 8, the F cover 2 and the upper center fixing member 7c are fixed with the male screw ZZ.

As shown in FIG. 15, in the upper back face of the liquid crystal module 1, there is provided a timing controller board 6h for controlling display of the liquid crystal panel 5. The timing controller board 6h is covered with a metal timing controller shield part 6g for shielding a spurious radiation and the like generated from the timing controller board 6h. In the center frame 3c, a timing controller shield fixing part 3hc is provided in a flange-like shape (see FIG. 13). The timing controller shield fixing part 3hc is disposed so as to abut against the vicinity of the center of the timing controller shield part 6g. The timing controller shield fixing part 3hc abuts against the timing controller shield part 6g and transfers the heat generated from the timing controller board 6h to the center frame 3c. Thus, the transferred heat is directly radiated to the outside of the housing 4 via the center frame 3c.

On the upper reinforcing sheet-metal 6b, there is provided a driver board (illustration is omitted) for driving a TFT of each pixel of the liquid crystal panel 5. The driver board is covered with a metal driver shield cover 6i for shielding a spurious radiation and the like generated from the driver board. The driver shield cover 6i is fixed to the upper reinforcing sheet-metal 6b with a driver shield cover holding part 6j. The driver shield cover holding part 6j and the upper reinforcing sheet-metal 6b are fixed with a male screw ZZ10. The driver shield cover 6i is disposed so as to abut against the timing controller shield part 6g on the upper side of liquid crystal module 1. Therefore, if the heat generated from the driver board is transferred to the driver shield cover 6i, the heat is transferred from the driver shield cover 6i to the timing controller shield part 6g and is directly radiated to the outside of the housing 4 through the timing controller shield fixing part 3hc and the center frame 3c.

The center frame 3c is fixed to the right-and-left connection reinforcing sheet-metal 6f in the vicinity of the center of the longitudinal direction. By abutting the center frame 3c against the right-and-left connection reinforcing sheet-metal 6f, inserting the male screws ZZ4 into the through-holes 3c3, 3c4, 3c5 and 3c6 (see FIG. 13), and tightening these parts together with the female screws (illustration is omitted) of the right-and-left connection reinforcing sheet-metal 6f corresponding to the through-holes 3c3, 3c4, 3c5 and 3c6, respectively, the center frame 3c is fixed to the right-and-left connection reinforcing sheet-metal 6f. The right-and-left connection reinforcing sheet-metal 6f abuts against a flat section of the sheet-metal frame 6a, and transfers the heat generated from the inside of the back light part 6 to the center frame 3c. Therefore, the transferred heat is directly and efficiently radiated to the outside of the housing 4 through the center frame 3c.

FIGS. 16, 17 show configurations for fixing the center frame 3c to the sheet-metal frame 6a in a center section and a lower section in the vertical direction of the liquid crystal module 1, respectively. In the sheet-metal frame 6a, four boss parts 6a1 to 6a4 are integrally and protrudingly provided (boss parts 6a1, 6a2 are shown in FIG. 16, and boss parts 6a3, 6a4 are shown in FIG. 17). By abutting the center frame 3c against the boss parts 6a1, 6a2, inserting male screws ZZ5 into through-holes 3c7, 3c8 (see FIG. 13), and tightening these parts together with female screws (illustration is omitted) provided in the boss parts 6a1, 6a2, respectively, the center frame 3c is fixed to the sheet-metal frame 6a. Likewise, by abutting the center frame 3c against the boss parts 6a3, 6a4, inserting male screws ZZ6 into through-holes 3c9, 3c10 (see FIG. 13), and tightening these parts together with female screws (illustration is omitted) provided in the boss parts 6a3, 6a4, respectively, the center frame 3c is fixed to the sheet-metal frame 6a.

In FIG. 16, a thickness Td from the flat part of the sheet-metal frame 6a to the base 3f of the center frame 3c corresponds to a height that is required to house a board having the circuits for signal processing and the like of the image display apparatus main body 50A mounted thereon, a power supply section, the wirings between the boards, and the like into the liquid crystal module 1.

FIG. 17 shows a configuration for fixing the center frame 3c to the tail-side reinforcing sheet metal 6c in the back face on the lower side of the liquid crystal module 1. In the lower reinforcing sheet-metal 6c attached to the sheet-metal frame 6a, a pair of boss parts 6a5, 6a6 is protrudingly provided in portions abutting against the center frame 3c. By abutting the center frame 3c against the boss parts 6a5, 6a6, inserting male screws ZZ7 into through-holes 3c11, 3c12 (see FIG. 13), and tightening these parts together with female screws (illustration is omitted) provided in the boss parts 6a5, 6a6, respectively, the center frame 3c is fixed to the reinforcing sheet metal 6c.

In the center portion on the back face of the lower side of the F cover 2, the center frame 3c is fixed to the F cover 2. In the F cover 2, the boss 2n is integrally provided in a portion corresponding to a through-hole 3c13 (see FIG. 13) provided in the center frame 3c (see FIG. 11). By abutting the center frame 3c against the boss 2n of the F cover 2, inserting a male screw ZZ8 into the through-hole 3c13, and tightening these parts together in the prepared hole 2n1 (see FIG. 11) provided in the boss 2n of the F cover 2, the center frame 3c is fixed to the F cover 2. At this time, the center frame 3c is attached to the F cover 2 so that the a lower abutment 3gd of the F cover (see FIG. 13) that is the lower end face of the center frame 3c abuts against a lower inner section of the F cover 2.

Figure 18:
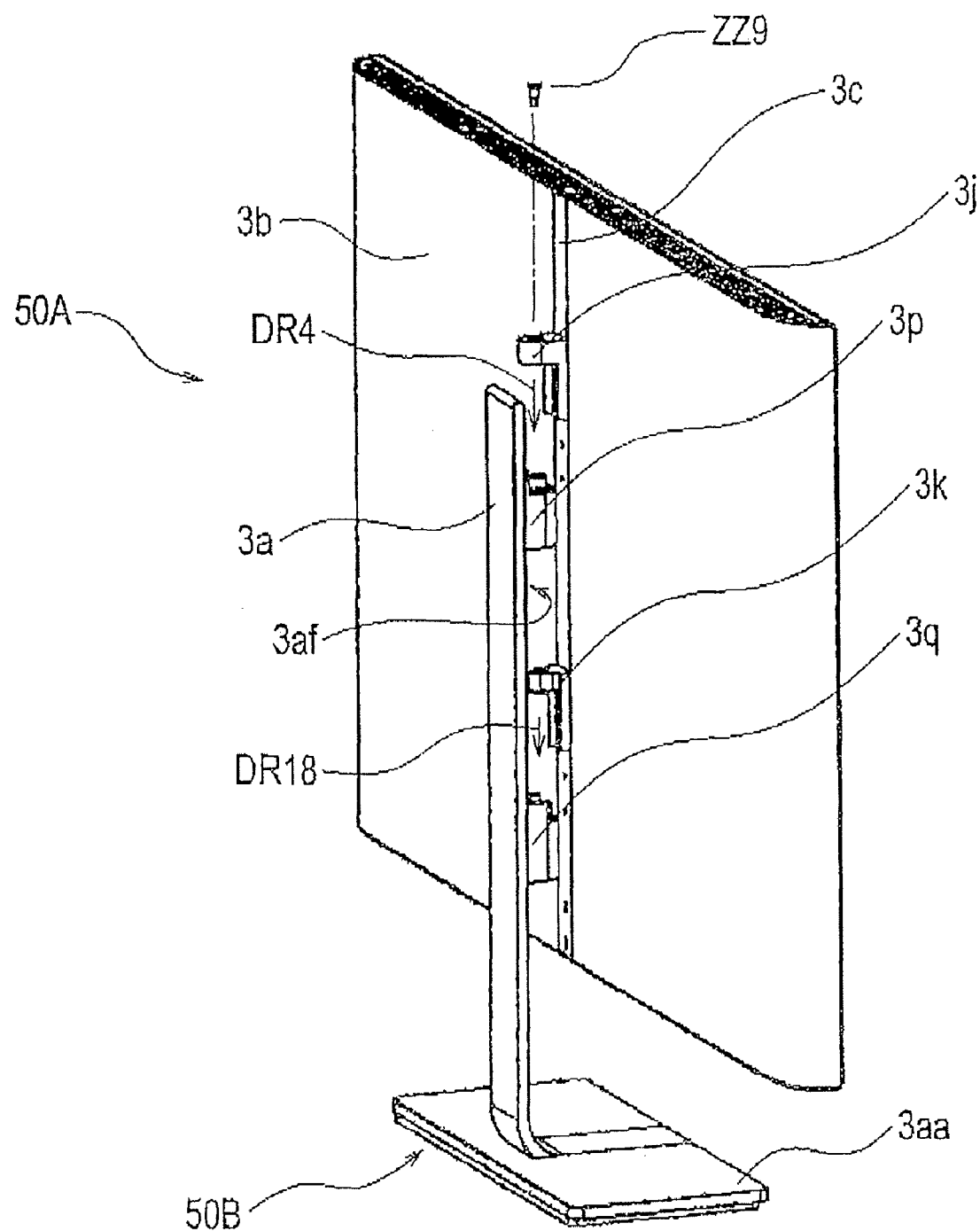
FIG. 18 is an external perspective view illustrating a connection configuration of an image display apparatus main body and a pedestal part according to the embodiment of the present invention.

Next, with reference to FIG. 18 to FIG. 21E, a connection configuration of the image display apparatus main body 50A and the pedestal part 50B is described. FIG. 18 is an external perspective view when the image display apparatus 50 is seen from behind on the right, and a view showing a state just prior to assembling the image display apparatus main body 50A into the pedestal part 50B. FIG. 19 is a perspective exploded view illustrating a connection part of the pedestal part 50B and the center frame 3c. FIGS. 20A and 20B are exploded views illustrating the upper pedestal fixing member connecting part 3j and the upper center frame connecting part 3p shown in the area DT6 of FIG. 19. FIGS. 21A to 21E are exploded views for illustrating the lower pedestal fixing member connecting part 3k and the lower center frame connecting part 3q shown in the area DT7 of FIG. 19. Specifically, FIG. 21A is a perspective view showing the lower pedestal fixing member connecting part 3k and a washer 3q1. FIG. 21B is a perspective view of the lower pedestal fixing member connecting part 3k seen from an oblique lower direction. FIG. 21C is a perspective view of the lower center frame connecting part 3q. FIG. 21D is a perspective view at a different angle of the lower center frame connecting part 3q. FIG. 21E is a perspective view at a different angle of the lower pedestal fixing member connecting part 3k, showing a state where the washer 3q1 is fitted thereto.

The upper pedestal fixing member connecting part 3j, the upper center frame connecting part 3p, the lower pedestal fixing member connecting part 3k, and the lower center frame connecting part 3q are collectively referred to as a connecting member.

The upper pedestal fixing member connecting part 3j and lower pedestal fixing member connecting part 3k attached to the center frame 3c are fitted into the upper center frame connecting part 3p and lower center frame connecting part 3q attached to the pedestal fixing member 3a, respectively, from an arrow DR4 direction from above. Then, by inserting a male screw ZZ9 into the upper pedestal fixing member connecting part 3j and tightening these parts together with a female screw 3p2m provided in the upper center frame connecting part 3p, the image display apparatus main body 50A is connected to the pedestal part 50B.

As shown in FIG. 1, between the bottom end of the image display apparatus main body 50A and the upper face of the bottom plate part 3aa of the pedestal part 50B there is provided a space STB with a height TBB. On the bottom plate part 3aa of the pedestal part 50B, apparatuses, such as a separate tuner box, a recording/reproducing apparatus, and/or a speaker, can be installed in the space STB. Moreover, apparatuses, such as a speaker connected to the side on the lower side of the image display apparatus main body 50A, can be installed in the space STB.

As shown in FIG. 18, between a front face 3af (see FIG. 19 as well) of the pedestal fixing member 3a of the pedestal part 50B and the reference back face 3b of the image display apparatus main body 50A, there is provided a space with a width that does not prevent the swivel movement of the image display apparatus main body 50A. Apparatuses, such as a separate tuner box, a recording/reproducing apparatus, and/or a speaker, can be installed in this space.

Each of the upper center frame connecting part 3$p$ and the lower center frame connecting part 3$q$ is fixed to the pedestal fixing member 3$a$ with two male screws (illustration is omitted). Each of the upper pedestal fixing member connecting part 3$j$ and the lower pedestal fixing member connecting part 3$k$ is fixed to the center frame 3$c$ with two male screws (illustration is omitted).

In the following descriptions, the assembly of the upper pedestal fixing member connecting part 3$j$ into the lower pedestal fixing member connecting part 3$k$ and the assembly of the lower pedestal fixing member connecting part 3$k$ into the lower center frame connecting part 3$q$ are described individually. However, actually, the upper pedestal fixing member connecting part 3$j$ and the lower pedestal fixing member connecting part 3$k$ are fixed to the center frame 3$c$ and therefore the both assemblies are simultaneously performed in the work of mounting the image display apparatus main body 50A to the pedestal fixing member 3$a$.

Figure 20B:
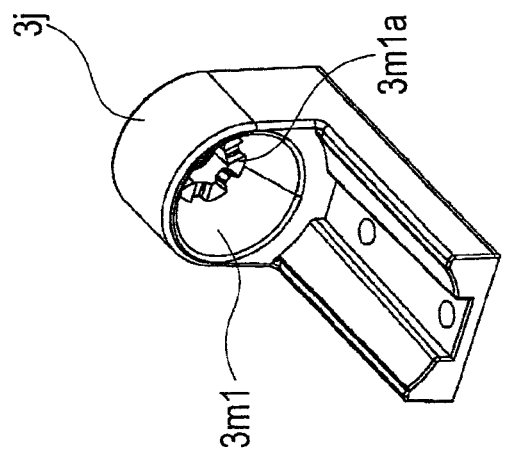
FIGS. 20A and 20B are exploded views illustrating an upper pedestal fixing member connecting part and an upper center frame connecting part shown in an area DT6 of FIG. 19.
Figure 20A:
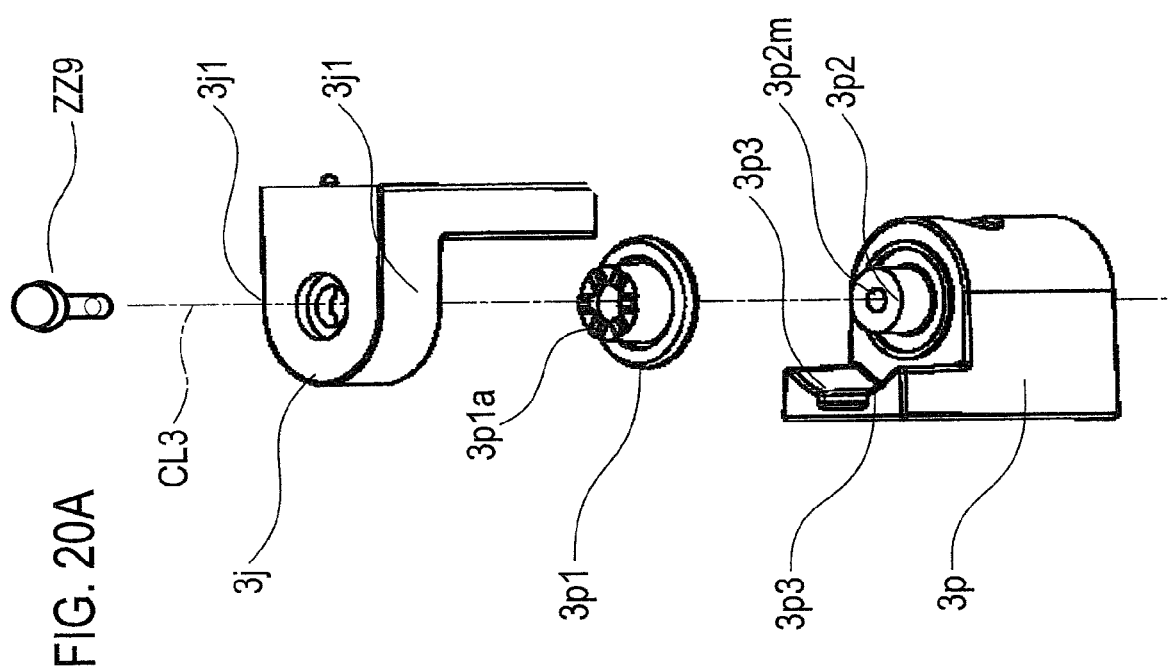

FIG. 20A is an assembly view of the upper pedestal fixing member connecting part 3$j$ and the upper center frame connecting part 3$p$. FIG. 20B is a perspective view when the upper pedestal fixing member connecting part 3$j$ is seen from an oblique lower direction.

As shown in FIG. 20A, first, a swivel washer 3$p$1 is pressed and fitted into a protruding part 3$p$2 provided in the upper center frame connecting part 3$p$, the protruding part 3$p$2 protruding in an axis line CL3 direction. The swivel washer 3$p$1 is a member made of resin, such as a POM (polyacetal) resin. The axis line CL3 is a line that extends in the vertical direction when the pedestal part 50B is horizontally installed. The swivel washer 3$p$1 includes a concavo-convex part 3$p$1$a$ that is circumferentially formed in a concavo-convex shape in the upper part of the swivel washer 3$p$1. The upper pedestal fixing member connecting part 3$j$ includes a convexo-concave part 3$m$1$a$, which is circumferentially formed in a convexo-concave shape corresponding to the concavo-convex part 3$p$1$a$ of the swivel washer 3$p$1, in the upper part of the inside of the upper pedestal installing part 3$m$1.

With regard to the upper connection portion, first, above the upper side of the upper center frame connecting part 3$p$, into which the swivel washer 3$p$1 is fitted, the upper pedestal fixing member connecting part 3$j$ is placed. At this time, the concavo-convex part 3$p$1$a$ engages with the convexo-concave part 3$m$1$a$. Next, the male screw ZZ9 is inserted into the upper pedestal fixing member connecting part 3$j$ and swivel washer 3$p$1, and these parts are tightened together with a female screw part 3$p$2$m$ of the upper center frame connecting part 3$p$. The swivel washer 3$p$1 can be rotated until a side wall 3$j$1 of the upper pedestal fixing member connecting part 3$j$ abuts against a side wall 3$p$3 erected in the upper center frame connecting part 3$p$ because the swivel washer 3$p$1 is capable of rotating about the axis line CL3 with respect to the upper center frame connecting part 3$p$. That is, the rotation angle of the upper pedestal fixing member connecting part 3$j$ is restricted by the side wall 3$p$3.

As shown in FIG. 21A, with regard to the lower connection portion, first, the washer 3$q$1 is fitted into a through-hole 3$k$1 of the lower pedestal fixing member connecting part 3$k$ from below (see FIG. 21E). At this time, the washer 3$q$1 is fitted into the through-hole 3$k$1 in a predetermined direction. The washer 3$q$1 is a member made of resin, such as a POM resin. Next, as shown by a wavy line with an arrow DR5, the lower pedestal fixing member connecting part 3$k$, into which the washer 3$q$1 has been fitted, is fitted into a bottom 3$q$2 of the lower center frame connecting part 3$q$. The bottom 3$q$2 is formed as a recessed face having a shape slightly larger than the washer 3$q$1.

The washer 3$q$1 projects downward from the lower pedestal fixing member connecting part 3$k$. The projection amount of the washer 3$q$1 on a side (pn side of FIG. 21E) near the lower center frame connecting part 3$q$ is smaller than the projection amount of the washer 3$q$1 on a side (pf side of FIG. 21E) away from the center frame connecting part 3$q$. Thus, after the lower pedestal fixing member connecting part 3$k$ contacts the lower center frame connecting part 3$q$, the lower pedestal fixing member connecting part 3$k$ is easily pulled into the bottom 3$q$2. In the lower connection portion, the washer 3$q$1 rotates about the axis line CL3 while contacting the face of the bottom 3$q$2 of the lower center frame connecting part 3$q$. The washer 3$q$1 is rotatable about the axis line CL3 until a side wall 3$k$2 of the lower pedestal fixing member connecting part 3$k$ abuts against a side wall 3$q$3 of the lower center frame connecting part 3$q$.

The rotary shaft is designed so that a rotary torque may apply only to the upper connecting member when the image display apparatus main body 50A is rotated about the axis line CL3 with respect to the pedestal part 50B. That is, when the image display apparatus main body 50A is rotated in the horizontal direction, the rotary torque is generated as an appropriate drag because the swivel washer 3$p$1 is pressed and fitted into the protruding part 3$p$2. Moreover, as described above, by inserting the male screw ZZ9 into the upper pedestal fixing member connecting part 3$j$ and swivel washer 3$p$1 and tightening these parts together with the female screw part 3$p$2$m$ of the upper center frame connecting part 3$p$, the rotary torque generated between the swivel washer 3$p$1 and protruding part 3$p$2 can be increased. The male screw ZZ9 is made of metal. With such a configuration, the rotary torque generated by press fitting and the rotary torque generated by tightening the male screw ZZ9 can be generated by the same rotary shaft between the same members of the upper pedestal fixing member connecting part 3$j$, and therefore a compact swivel configuration can be provided. Note that, in view of the center-of-gravity balancing of the image display apparatus main body 50A, the upper connecting member and the lower connecting member are preferably installed at positions symmetric with respect to the center portion of the center frame 3$c$ in the longitudinal direction of the center frame 3$c$.

The center of gravity position of the image display apparatus main body 50A is in the center portion of the image display apparatus main body 50A (see FIG. 22). As with this embodiment, in the configuration wherein a rotary torque is applied only to the upper connecting member, that is, in the configuration wherein a rotary torque is generated at a fitting part of the protruding part 3$p$2 and the swivel washer 3$p$1 and wherein a tightening torque of the male screw ZZ9 increases a rotary torque generated at the fitting part of the protruding part 3$p$2 and the swivel washer 3$p$1, if the upper connecting member is arranged near the center portion of the center frame 3$c$ in the longitudinal direction of the center frame 3$c$ and also in the vicinity of the center of gravity position of the image display apparatus main body 50A, then a moment due to the gravity applied to the image display apparatus main body 50A can be reduced. The arrangement of the connecting member, to which the rotary torque is applied, near the center of the center frame 3$c$ can suppress a strength load on the image display apparatus main body 50A, the strength load being generated when the image display apparatus main body 50A is rotated in the horizontal direction.

As shown in FIG. 22, the image display apparatus main body 50A is supported by the pedestal part 50B so that a center portion CTRa of the image display apparatus main body 50A may overlap with a center portion CTRb of the bottom plate part 3aa when seen from above the image display apparatus 50. The center of gravity of the image display apparatus main body 50A is generally on the center portion CTRa of the image display apparatus main body 50A. In this state, a center of gravity G of the image display apparatus main body 50A is positioned in the vertical direction of the center portion CTRb of the bottom plate part 3aa and generally in the center portion of the image display apparatus main body 50A (see FIG. 1) when seen from the front face of the image display apparatus 50. In view of the swivel movement to swing the image display apparatus main body 50A in the horizontal direction, a vertical distance Lg between the position of the center of gravity G of the image display apparatus main body 50A and the upper pedestal fixing member connecting part 3j serving as the source of the rotary torque becomes significantly shorter than the vertical distance between the center of gravity position and the rotary torque generating source in the conventional image display apparatus. Usually, in the conventional image display apparatus, the rotary torque generating source is positioned on the bottom side of the image display apparatus main body. Accordingly, even if the swivel movement is performed on the image display apparatus main body 50A, a large load will not be applied to the image display apparatus main body 50A.

The pedestal fixing member 3a corresponding to the column section of the pedestal part 50B is positioned backward from the center portion CTRa of the bottom plate part 3aa. Note that, in FIG. 22, although the pedestal fixing member 3a is positioned forward (in the upper direction of FIG. 22) from the back face 3ad of the bottom plate part 3aa, the pedestal fixing member 3a may be positioned on the back face 3ad of the bottom plate part 3aa. In this case, since the pedestal fixing member 3a abuts against the wall face together with the back face 3ad of the bottom plate part 3aa, the pedestal part 50B can be moved to a wall and the installation stability of the image display apparatus 50 can be improved.

Figure 23:
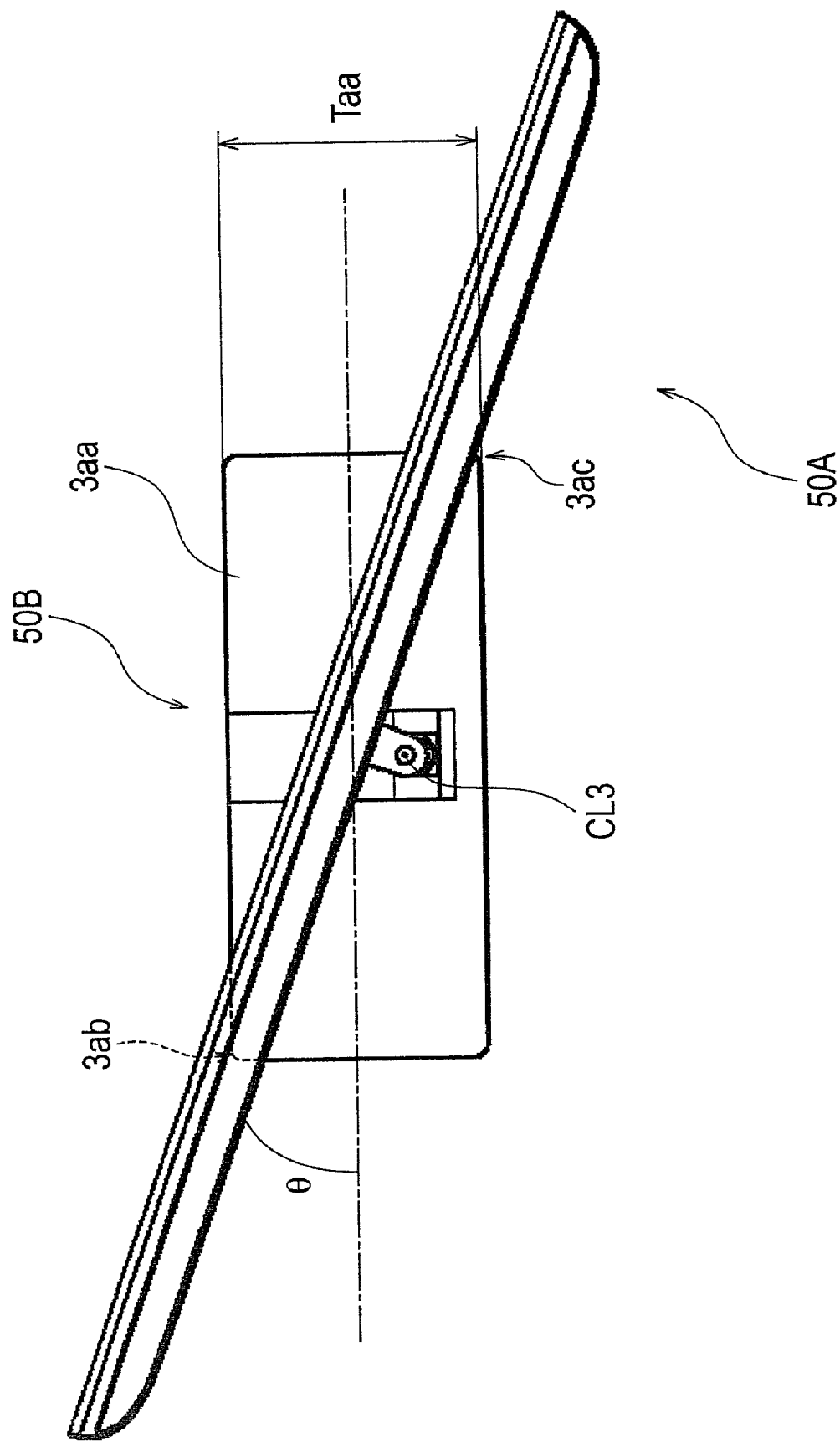
FIG. 23 is a top view illustrating a swivel movement according to the embodiment of the present invention.

As shown in FIG. 23, the depth of the bottom plate part 3aa of the pedestal part 50B is represented by Taa, and the allowable swing angle in the clockwise direction of the axis line CL3 with respect to the front face of the image display apparatus main body 50A is defined as θ. The allowable swing angle θ is usually around 15 to 20°.

The depth Taa of the bottom plate part 3aa is determined so that the image display apparatus main body 50A, when swung to the allowable swing angle θ, may be positioned on a diagonal line connecting corner portions 3ab, 3ac of the bottom plate part 3aa of the pedestal part 50B when seen from above the image display apparatus 50. Thus, when the image display apparatus main body 50A is swung, the bottom plate part 3aa of the pedestal part 50B will not float from the ground plane and the image display apparatus 50 can be maintained in a stable state.

In this embodiment, the bottom plate part 3aa of the pedestal part 50B comprises an iron material with a large specific gravity, and the pedestal fixing member 3a of the pedestal part 50B and each of the connecting members comprise a lightweight metal member made of aluminum or the like. Since a heavy column with a large width is not used in the pedestal part unlike the conventional image display apparatus, a reduction in the mass of the pedestal part 50B can be achieved. Moreover, in this embodiment, the reinforcing sheet metal member and fixing member 7, including the sheet-metal frame 6a installed in the back face of the back light part 6 and the center frame 3c, comprise a lightweight metal member made of aluminum or the like. The depth Taa of the bottom plate part 3aa is around 40 cm in the conventional image display apparatus, while with the configuration of the image display apparatus in this embodiment, in the image display apparatus of this embodiment, the depth Taa can be set to around 20 cm. Furthermore, in this embodiment, by a connection path from the sheet-metal frame 6a of the liquid crystal module 1 leading to the center frame 3c, upper pedestal fixing member connecting part 3j, male screw ZZ9, upper center frame connecting part 3p, and pedestal fixing member 3a, the pedestal fixing member 3a that is the column of the pedestal part 50B is directly connected to the liquid crystal module 1 via the metal members. Since the sheet-metal frame 6a, the center frame 3c, the upper pedestal fixing member connecting part 3j, the male screw ZZ9, the upper center frame connecting part 3p, and the pedestal fixing member 3a comprise metal, this connection path is a heat transfer path serving as a heat sink. Thus, the heat generated in the inside of the housing 4 of the image display apparatus main body 50A is directly and efficiently radiated to the outside of the image display apparatus main body 50A by this connection path.

The embodiment of the present invention is not limited to the configuration and structure described above, but alternative embodiments may be made without departing from the gist of the present invention.

In this embodiment, the center frame 3c is installed in the center portion in the horizontal direction of the back face of the liquid crystal module 1, and the center frame 3c is attached to the pedestal fixing member 3a of the pedestal part 50B. However, the number of center frames 3c is not limited to one. For example, a plurality of center frames 3c may be installed in the back face of the liquid crystal module. Specifically, two metal center frames may be installed as a part of the R cover 3 at the positions corresponding to the connection reinforcing sheet-metals 6d, 6e in the horizontal direction of the back face of the liquid crystal module 1 so as to be exposed to the outside of the housing 4, and whereby these two center frames may be attached to the pedestal fixing member 3a of the pedestal part 50B, respectively. In this case, four female screw parts 3n that are the receptacles for attaching a metal wall-hanging bracket and the like may be used in attaching the pedestal part 50B. With such a configuration, the heat generated from the inside of the back light part 6 or from the driver board of the liquid crystal panel 5, or the heat generated in the power supply section, signal processing section, and the like in the inside of the housing 4 of the image display apparatus main body 50A can be directly and more efficiently radiated to the outside of the image display apparatus 50 through two center frames and metal wall-hanging brackets.

The respective mounting positions of the reinforcing sheet metals (6b to 6f) also are not limited to the positions of this embodiment. Moreover, the base 3f of the center frame 3c may have a function to connect and reinforce the sides facing each other (the side on the right side and the side on the left side) of the image display apparatus main body 50A.

In this embodiment, pedestal fixing member connecting parts are installed in the upper section and lower section of the base 3f of the center frame 3c, respectively. However, the number of pedestal fixing member connecting parts is not limited to two. For example, one pedestal fixing member connecting part may be installed in the base 3f of the center frame 3c. Moreover, instead of installing the pedestal fixing member connecting part in the center frame 3c, the center frame 3c may be connected to the pedestal fixing member 3a by tightening a male screw together with a female screw.

In this embodiment, the base 3f of the center frame 3c, the right R cover 3d, and the left R cover 3e are continuously connected to each other without a step on the same plane of the reference back face 3b so as to be exposed to the outside, which is a preferable example for achieving a reduction in the thickness of the image display apparatus main body 50A. However, a method of connecting the base 3f of the center frame 3c, the right R cover 3d, and the left R cover 3e to each other is not limited thereto. For example, in order to radiate the heat in the inside of the housing 4 of the image display apparatus main body 50A, the base 3f of the center frame 3c may have a step section with respect to the R cover 3.

Next, with reference to FIG. 24 to FIG. 35 B, an assembly configuration of the F cover 2 and R cover 3 in the image display apparatus main body 50A is described.

Figure 24:
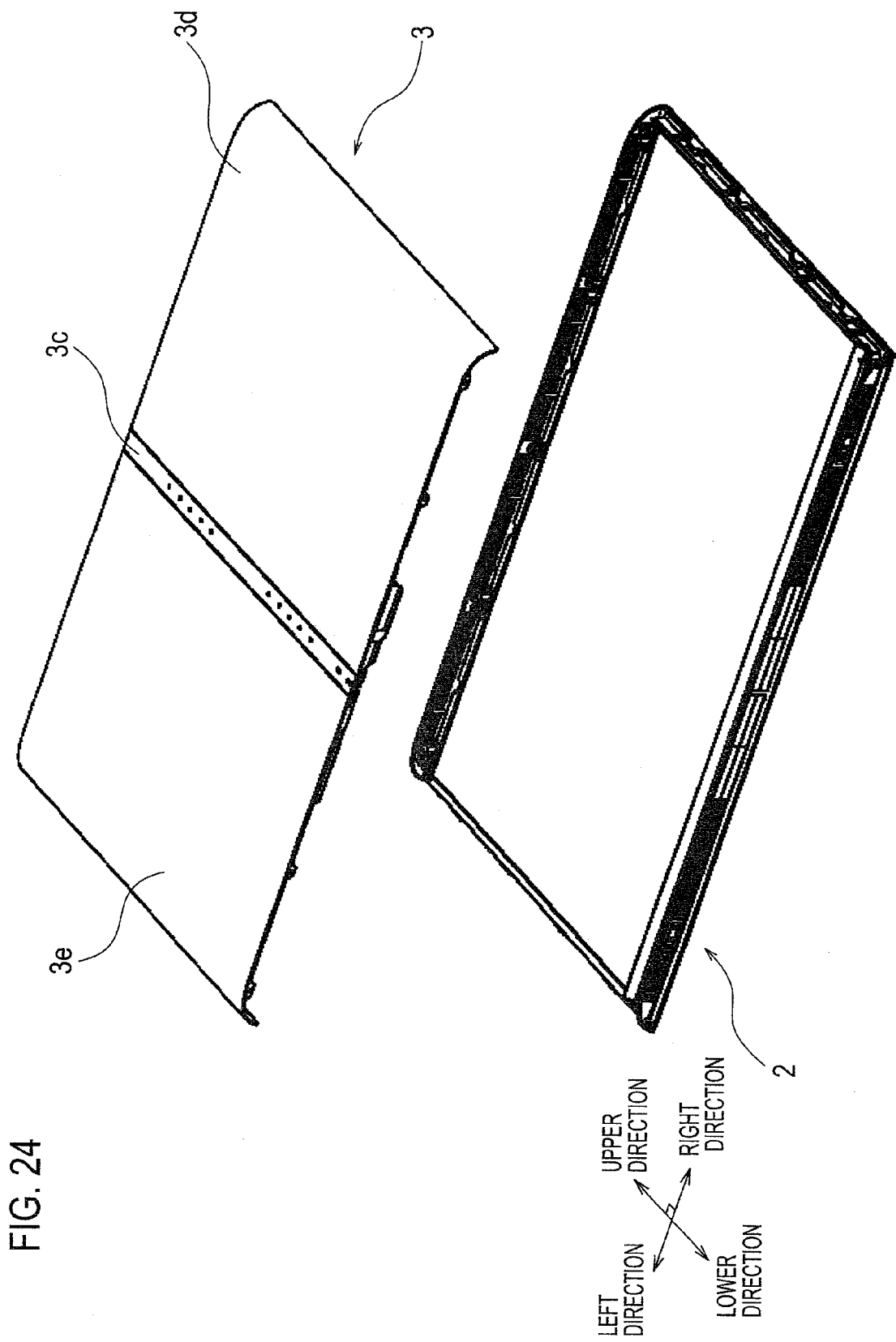
FIG. 24 is a perspective view of the F cover and the R cover according to the embodiment of the present invention.
Figure 25:
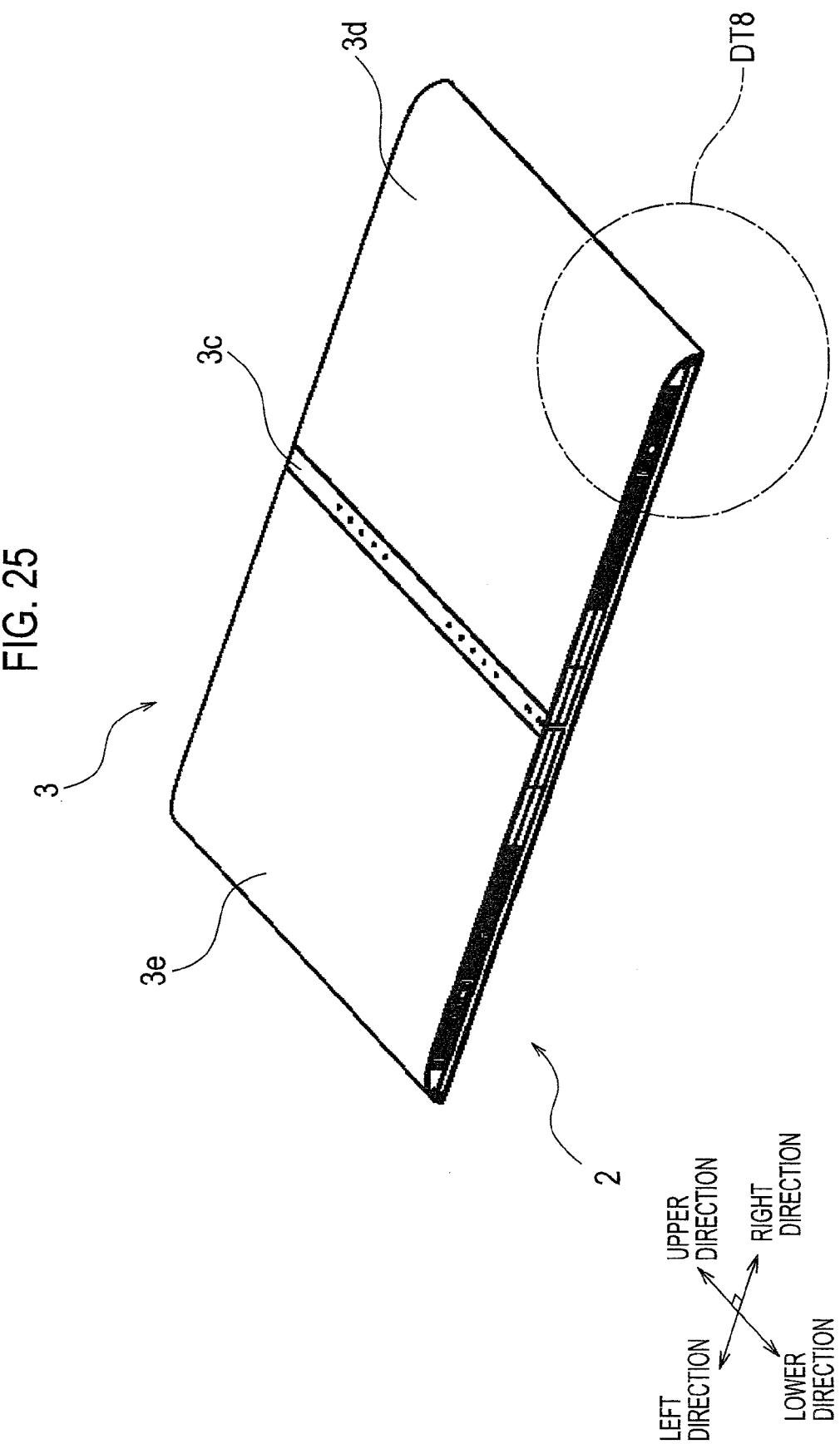
FIG. 25 is an external perspective view on the back face side of the image display apparatus main body according to the embodiment of the present invention.

FIG. 24 shows a perspective view of the F cover 2 and the R cover 3. FIG. 25 is an external perspective view on the back face side of the image display apparatus main body in a state where the F cover 2 and the R cover 3 are assembled. As shown in FIG. 24, the R cover 3 comprises the right R cover 3d, the left R cover 3e, and the center frame 3c. Note that the R cover 3 may be comprised of one resin member.

The F cover 2 includes the reference front face 2b formed in a frame shape. The R cover 3 includes the reference back face 3b formed in a generally rectangular shape. The F cover 2 and the R cover 3 are formed in a generally U-shape. The F cover 2 includes a bent section continuously connected to two long sides. The R cover 3 includes a bent section continuously connected to two short sides. When the F cover 2 and the R cover 3 are assembled, the F cover 2 and the R cover 3 are disposed facing each other so that the bent section of the R cover 3 may be perpendicular to the bent section of the F cover 2.

Since the housing 4 is formed by disposing and combining the F cover 2 and the R cover 3 as described above, the allowable range of variations in thermal shrinkage that occurs when the F cover 2 and R cover 3 are injection-molded and cooled can be increased. For this reason, molding variations occurring when manufacturing the housing 4 can be absorbed. In this embodiment, as a configuration preferable to absorb the molding variations, the bent section continuously connected to two long sides of the F cover 2 and the bent section continuously connected to two short sides of the R cover 3 are enumerated. However, the configuration to absorb the molding variations is not limited thereto. For example, the F cover 2 may include a bent section continuously connected to two short sides while the R cover 3 may include a bent section continuously connected to two long sides.

Figure 26:
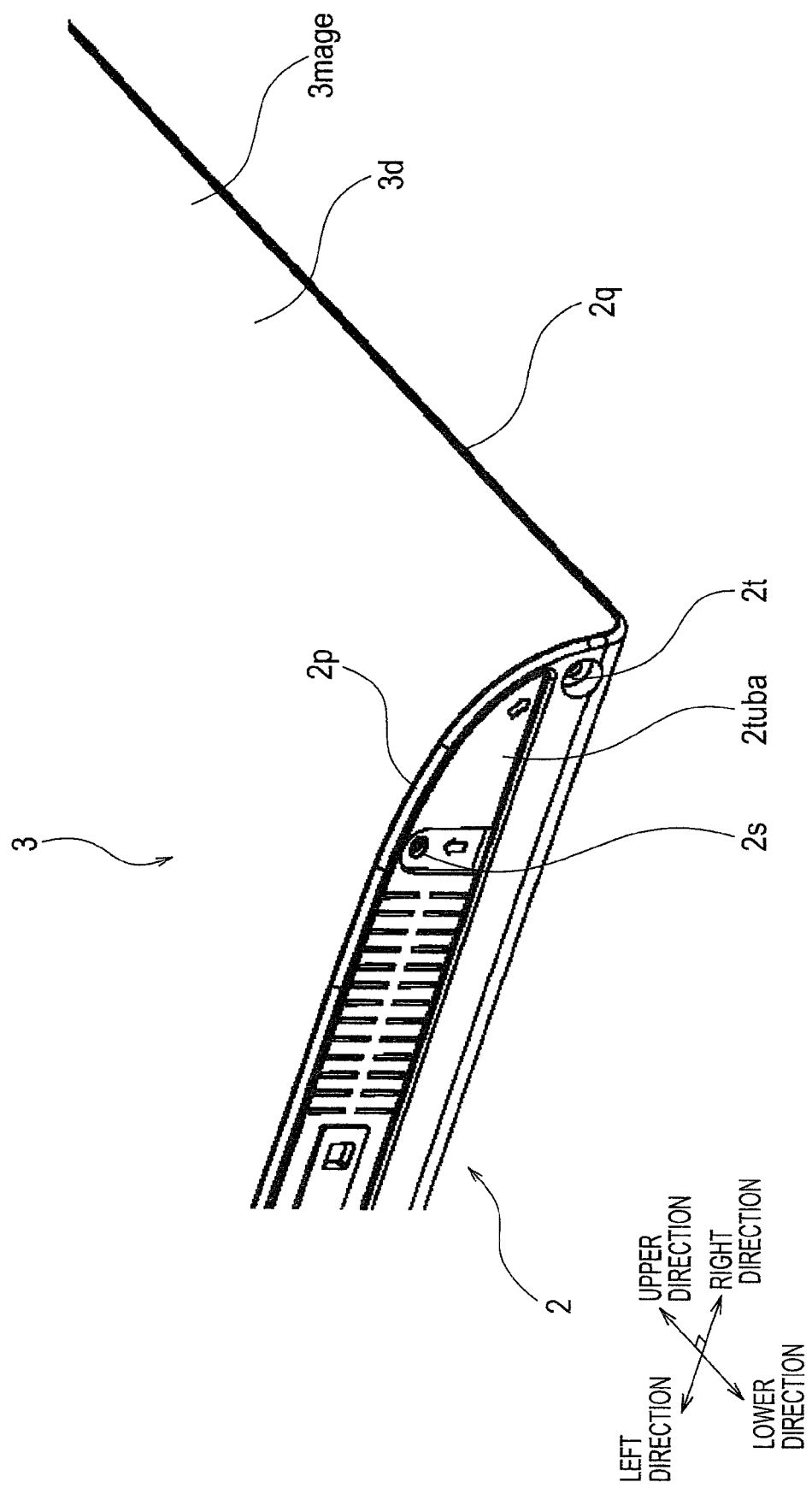
FIG. 26 is an enlarged view of an area DT8 of FIG. 25.
Figure 29:
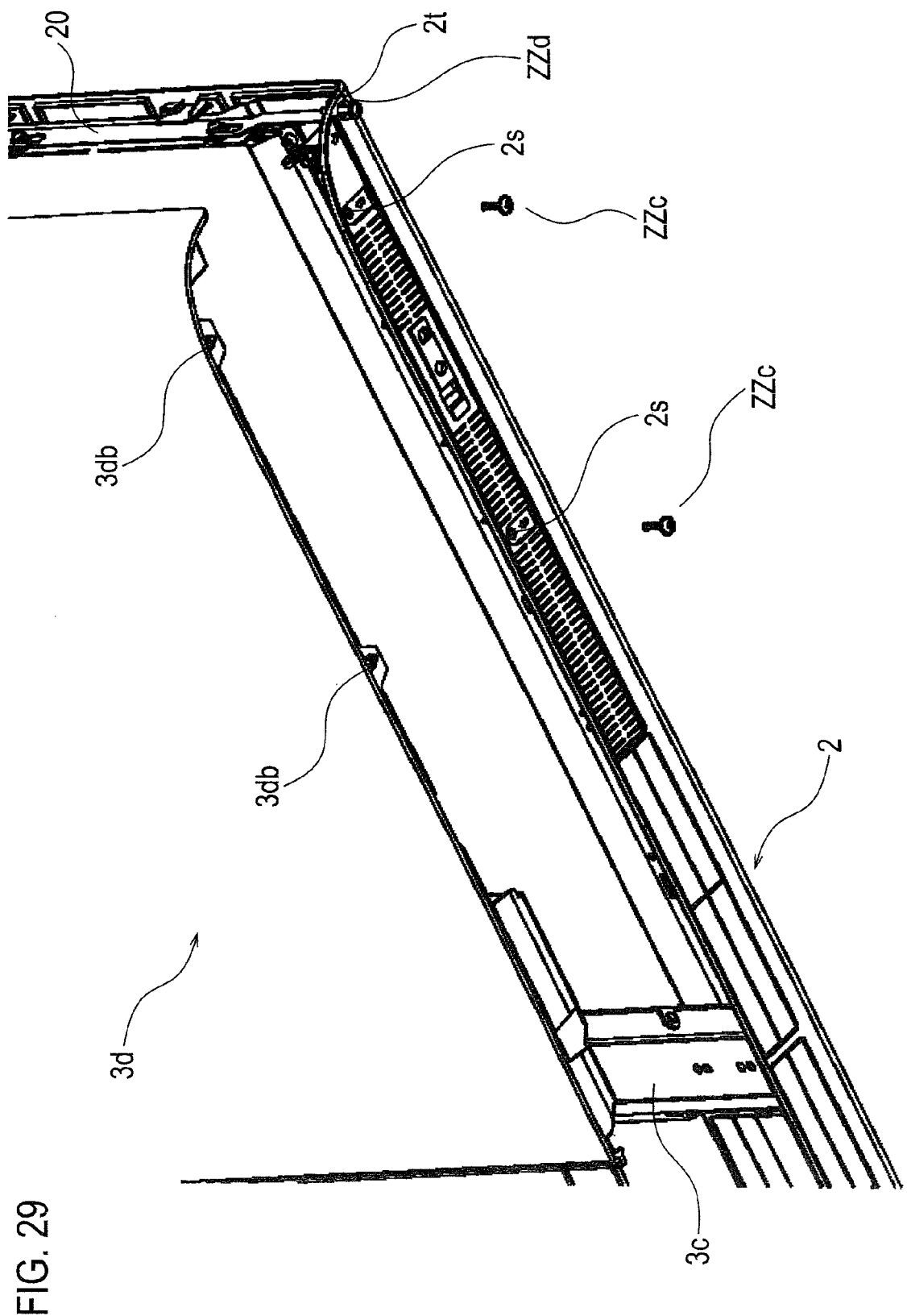
FIG. 29 is an enlarged perspective view when a lower area DT10 in FIG. 27 is seen from an arrow Yb direction.

FIG. 26 is an enlarged view of an area DT8 of FIG. 25. In the F cover 2, four through-holes 2s for fixing the F cover 2 to the right R cover 3d are provided (see FIGS. 26, 29). As shown in FIG. 29, two through-holes 2s are provided on the right of a side on the lower side of the F cover 2. Moreover, two through-holes 2s are provided on the left of the side on the lower side of the F cover 2 (illustration is omitted). Two through-holes 2s provided on the right of the side on the lower side of the F cover 2 and two through-holes 2s provided on the left of the side on the lower side of the F cover 2 are disposed at positions symmetric with respect to the center of the F cover 2.

In the F cover 2, two through-holes 2t for inserting a male screw ZZd, which is used when assembling the F cover 2 and the right R cover 3d, are provided (see FIGS. 26 and 29). The male screw ZZd is tightened to a slide bracket 20 that is a fitting member shown in FIG. 27. Two through-holes 2t are provided on the right and left of the side on the lower side of the F cover 2, respectively. The through-hole 2t provided on the right of the side on the lower side of the F cover 2 and the through-hole 2t provided on the left of the side on the lower side of the F cover 2 are disposed at positions symmetric with respect to the center portion of the F cover 2.

The F cover 2 includes four flange parts 2tuba, which are generally perpendicular to the frame edge part 2c and extend in the same direction as the extending direction of the frame edge part 2c, at both ends on the upper side and at both ends on the lower side. The R cover 3 includes a bent section 3mage curving toward the F cover 2 side, at the left side edge and at the right side edge. As shown in FIG. 26, when the F cover 2 and the right R cover 3d are assembled, two edges 2p on the upper and lower sides of the long side of the F cover 2 and an edge 2q on the short side of the F cover 2 are exposed to the outside of the housing 4. Likewise, when the F cover 2 and the left R cover 3e are assembled, two edges 2p on the upper and lower sides of the long side of the F cover 2 and the edge 2q on the short side of the F cover 2 are exposed to the outside of the housing 4 (illustration is omitted).

In this manner, the edge on the long side and the edge on the short side of the right R cover 3d are housed inside the F cover 2 (inside the housing 4) without being exposed to the outside of the housing 4. Likewise, the edge on the long side and the edge on the short side of the left R cover 3e are housed inside the F cover 2 (inside the housing 4) without being exposed to the outside of the housing 4.

With such a configuration, the molding variation that occurs when manufacturing the housing 4 can be absorbed, and a user cannot see at least the edge of the R cover 3 from a position which is right in front of the image display apparatus and likely to catch someone's attention, when viewing the display face 1a. Since the exterior face of the image display apparatus main body 50A becomes flat by aligning the joints of the F cover 2 and R cover 3, the appearance quality of the whole image display apparatus becomes extremely high and the interior nature will improve.

Figure 27:
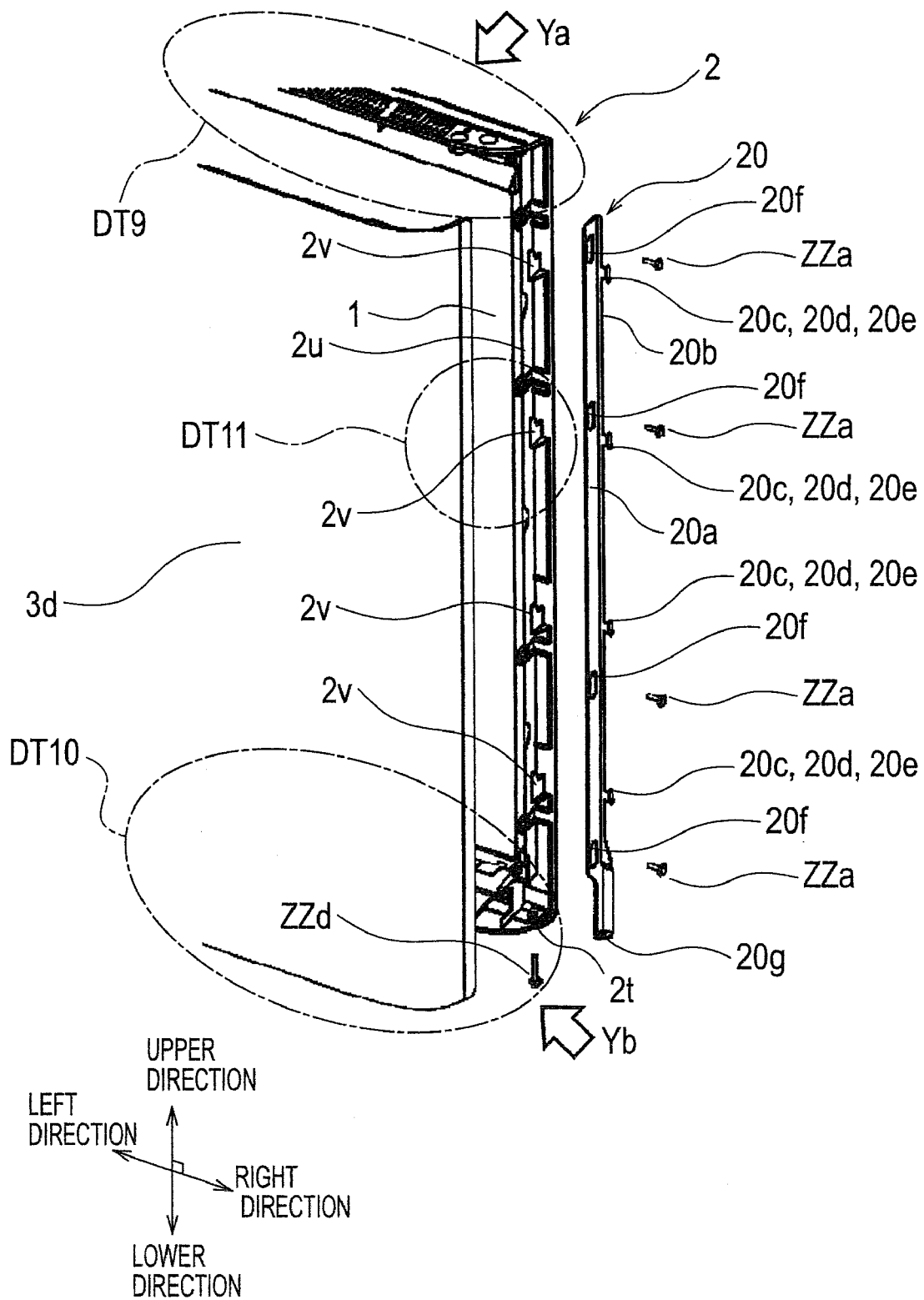
FIG. 27 is an exploded view of the right-side back face of the image display apparatus according to the embodiment of the present invention.

FIG. 27 is an exploded view of the back face on the right side of the image display apparatus 50A in a state prior to mounting the slide bracket 20, which is used in assembling the F cover 2 and the right R cover 3d, to the F cover 2. In FIG. 27, the liquid crystal module 1 and the center frame 3c are mounted to the F cover 2 (see FIG. 14). Hereinafter, a method of assembling the back face on the right side of the image display apparatus main body 50A will be described. Since a method of assembling the back face on the left side of the image display apparatus main body 50A is also same as that of the right side, the drawings and descriptions related to the method of assembling the back face on the left side of the image display apparatus main body 50A is omitted.

Figure 28:
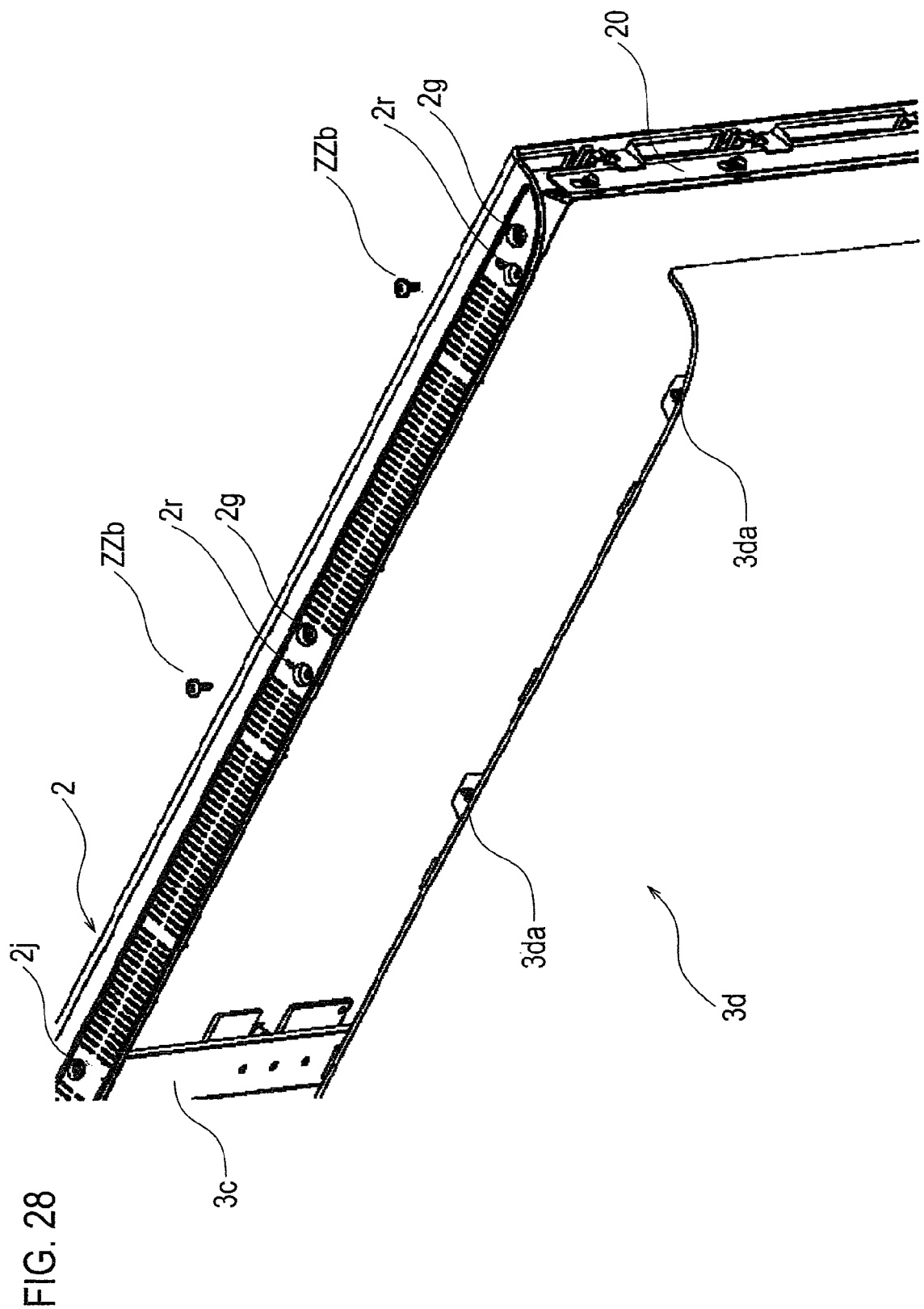
FIG. 28 is an enlarged perspective view when an upper area DT9 in FIG. 27 is seen from an arrow Ya direction.
Figure 30:
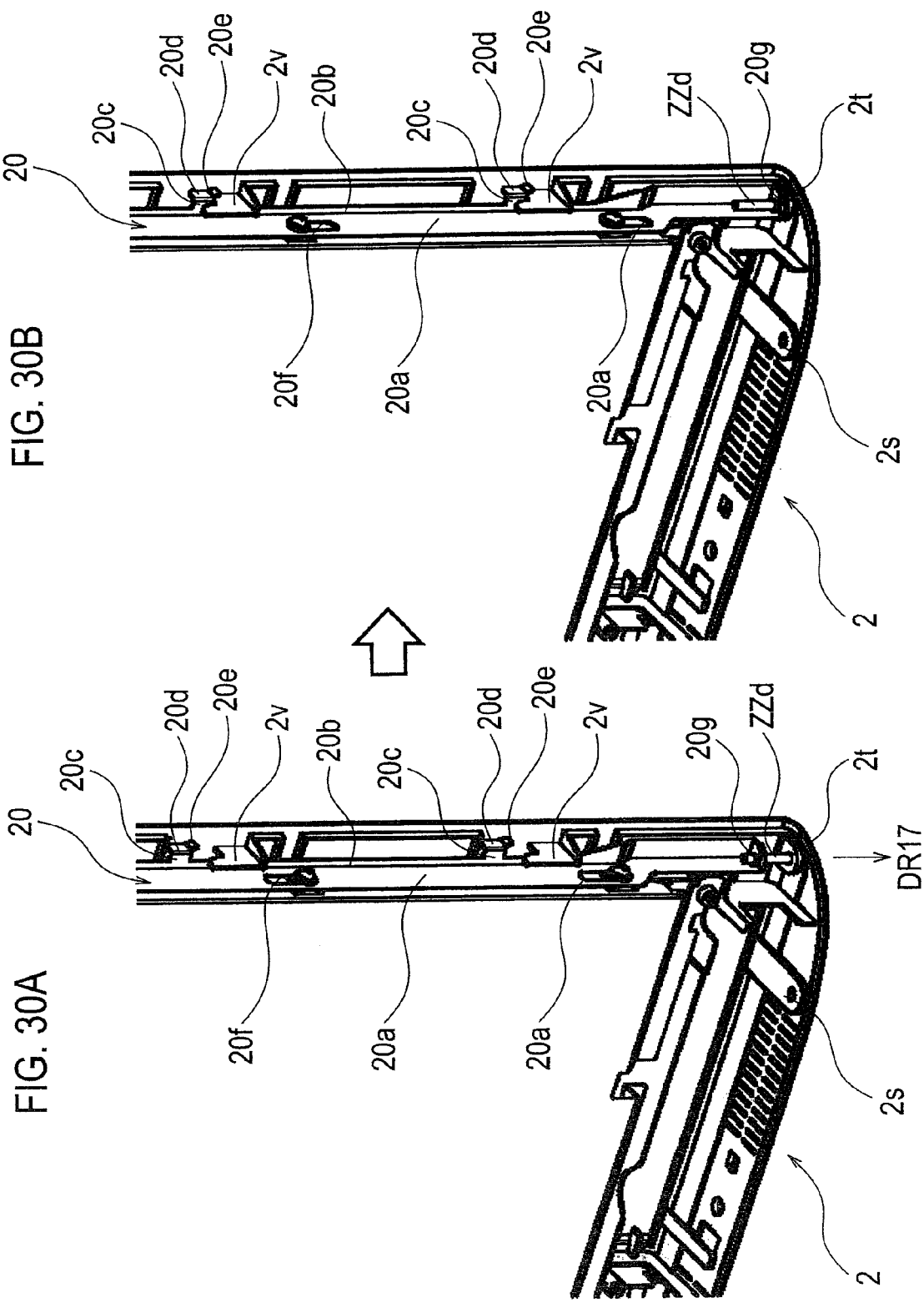
FIGS. 30A and 30B are enlarged perspective views of the lower part (DT8 area of FIG. 25) of FIG. 27.

FIG. 28 is an enlarged perspective view when an upper area DT9 in FIG. 27 is seen from an arrow Ya direction. FIG. 29 is an enlarged perspective view when a lower area DT10 in FIG. 27 is seen from an arrow Yb direction. FIG. 30 are enlarged perspective views of the lower part (DT8 area of FIG. 25) of FIG. 27.

In FIG. 27, prior to mounting the right R cover 3d to the F cover 2 having the liquid crystal module 1 mounted thereon, the slide bracket 20 is attached to the right side of the short side in the back face of the F cover 2, first.

The slide bracket 20 is formed by pressing a metal plate. The slide bracket 20 includes a base 20a, a first bent section 20b, and four assemblies comprising a fitting part 20c, a second bent section 20d, and a tongue part 20e. The base 20a has an elongated and generally rectangular shape. The first bent section 20b is continuously connected to the long side of the base 20a. Four assemblies comprising the fitting part 20c, the second bent section 20d, and the tongue part 20e are continuously connected to the long side of the first bent section 20b, and are arranged spaced apart from each other along the longitudinal direction of the first bent section 20b. The first bent section 20b is folded by approximately 90° with respect to the base 20a. In the base 20a, four long holes 20f are arranged spaced apart in the longitudinal direction.

In the right side face in the rear face of the F cover 2, there is provided an inner wall section 2u for restricting the position in the horizontal direction of the liquid crystal module 1 and fixing the liquid crystal module 1. The slide bracket 20 is attached to the F cover 2 so that the rear face of the base 20a may be abutted against the inner wall section 2u of the F cover 2 and also the first bent section 20b may be abutted against the rear face of the frame edge part 2c of the F cover 2.

In a portion corresponding to the long hole 20f of the slide bracket 20 in attaching the slide bracket 20 to the F cover 2, a through-hole (illustration is omitted) is provided in the inner wall section 2u of the F cover 2 while in the liquid crystal module 1, a female screw (illustration is omitted) is provided. After abutting the base 20a of the slide bracket 20 against the inner wall section 2u of the F cover 2, a male screw ZZa with a washer is inserted into the long hole 20f and the through-hole of the inner wall section 2u and these parts are tightened together with the female screw of the liquid crystal module 1, thereby fixing the slide bracket 20 to the F cover 2.

Usually, the liquid crystal panel 5, the back light part 6, and the like inside the liquid crystal module 1 are fixed with screws in advance in the side face of the short side of the liquid crystal module 1. In this embodiment, since the same male screw ZZa is used in screwing and fixing in the side face of the short side of the liquid crystal module 1 and in screwing and fixing the F cover 2 via the slide bracket 20, the number of the male screw components can be substantially reduced. Moreover, since no screw is exposed to the exterior faces (left and right side faces) of the R cover 3, the appearance quality of the image display apparatus 50 also becomes extremely high.

Next, a method of mounting and fixing the right R cover 3d to the F cover 2 having the liquid crystal module 1 mounted thereon is described.

First, into a space with an L-shaped cross section, the space being formed by the right side cover connecting portion 3ga, base 3f, and right R cover abutment 3ha of the center frame 3c, the flange part 3d1 of the right R cover 3d is inserted and fitted while slightly tilting the right R cover 3d obliquely (see FIGS. 12, 13). As shown in FIG. 28, on the right in the side on the upper side of the F cover 2, two through-holes 2r for fixing the F cover 2 to the right R cover 3d are provided. Moreover, also on the left in the side on the upper side of the F cover 2, two through-holes 2r for fixing the F cover 2 to the left R cover 3e are provided. The through-holes 2r on the right and the through-holes 2r on the left are disposed at positions bilaterally symmetric with respect to the center portion of the side on the upper side of the F cover 2.

As shown in FIG. 28, after fitting the right R cover 3d into the center frame 3c, in the upper side of the F cover 2, a male screw ZZb is inserted into a through-hole 2r and these parts are tightened together with a female screw 3da provided in the right R cover 3d, thereby fixing the F cover 2 and the R cover 3. Moreover, as shown in FIG. 29, in the lower side of the F cover 2, a male screw ZZc is inserted into a through-hole 2s and these parts are tightened together with a female screw 3db provided in the right R cover 3d, thereby fixing the F cover 2 and the R cover 3.

Next, a method of fitting and fixing the F cover 2 and the right R cover 3d via the slide bracket 20 is described.

FIG. 30A is a perspective view showing a state prior to fitting the F cover 2 and the right R cover 3 by means of the slide bracket 20. FIG. 30B is a perspective view showing a state after fitting the F cover 2 and the right R cover 3d by means of the slide bracket 20. In FIGS. 30A, 30B, the right R cover 3d is omitted. Note that, since the F cover 2 and the right R cover 3d are actually fitted by means of the slide bracket 20 in the inside of the housing 4, the fitting portion cannot be viewed from the outside. However, for convenience's sake, the fitting portion is described in detail using the drawings, in which some components related to the fitting portion in the right R cover 3d are used, or using cross-section image views of the fitting part, and the like.

Figure 31:
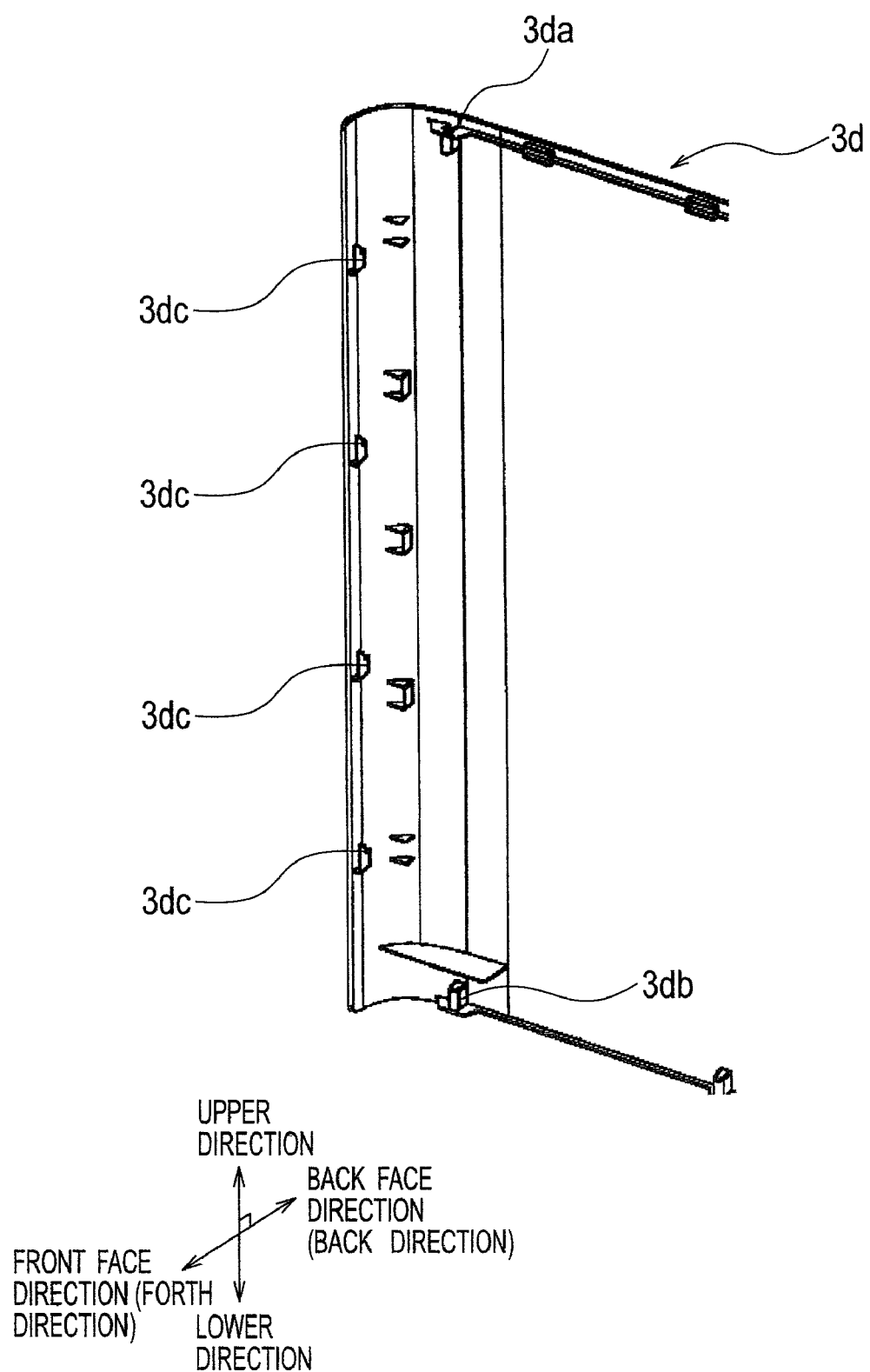
FIG. 31 is a partial perspective view of an inner face of the right R cover according to the embodiment of the present invention.

FIG. 31 is a partial perspective view showing a configuration of a side of the rear face of the right R cover 3d. FIG. 32 to FIG. 35B are enlarged views of a part of an area DT11 of the fitting part in FIG. 27. Note that, since the configurations and mounting methods of other parts of the fitting part, i.e., three areas other than the area DT11, are the same as those of the area DT11, the description thereof is suitably omitted.

As shown in FIGS. 30A, 30B, the slide bracket 20 has a configuration capable of sliding in a DR17 direction along the long hole 20f of the base 20a. As shown in FIG. 27, the F cover 2 includes four fitted parts 2v slightly near the outer edge of the rear face of the frame edge part 2c of the F cover 2 corresponding to four assemblies comprising the fitting part 20c, second bent part 20d, and tongue part 20e of the slide bracket 20. As shown in FIG. 31, the right R cover 3d includes four fitted part 3dc near the side of the rear face of the right R cover 3d corresponding to four fitted parts 2v. Accordingly, the fitted parts 2v and the fitted parts 3dc are not exposed to the outside of the housing 4 and are formed in the inside of the housing 4. When the slide bracket 20 is slid from the upper side to lower side, the assembly comprising the fitting part 20c, second bent section 20d, and tongue part 20e of the slide bracket 20 is fitted into the fitted part 2v of the F cover 2 and the fitted part 3d of the right R cover 3d.

In the lower face of the slide bracket 20, a female screw part 20g is formed by burring. The female screw part 20g is formed in either one of both ends of the base 20a of the slide bracket 20. That is, the female screw part 20g is formed in the face on the short side of the slide bracket 20. In this embodiment, although the female screw part 20g is formed in the lower face, the female screw part 20g may be formed in the upper face. By inserting the male screw ZZd into the through-hole 2t of the F cover 2 from the outside of the housing 4 and tightening these parts together with the female screw part 20g, the slide bracket 20 is slid from the upper side to the lower side.

Figures 34A, 34B:
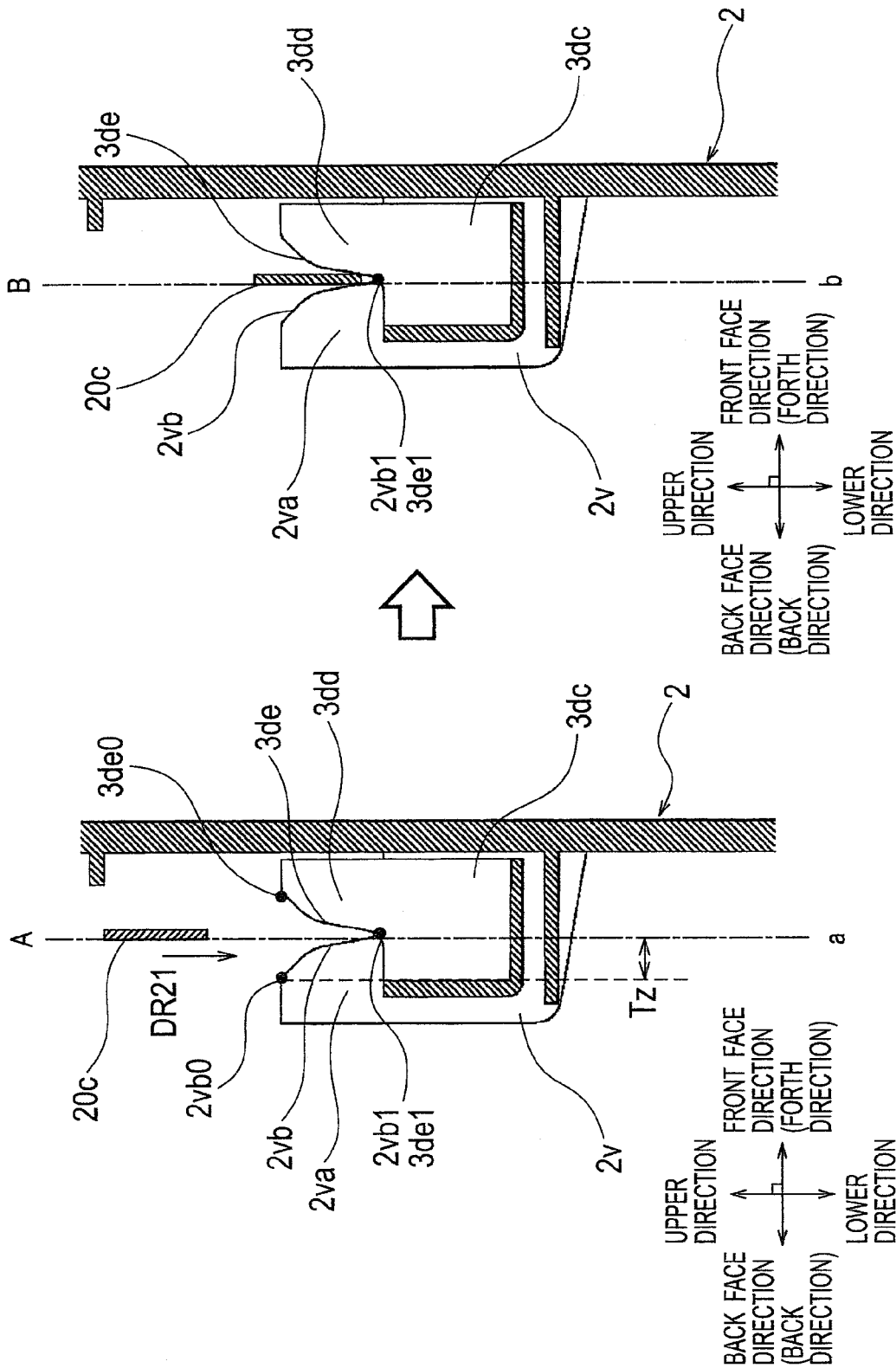
FIGS. 34A and 34B are cross-sectional image views in the same cross-section as with FIG. 32.

FIG. 32 is a cross-sectional image view of a positional relationship seen from the right face side when the fitted part 2v of the F cover 2 and the fitted part 3dc of the right R cover 3d are fitted by means of the slide bracket 20. FIG. 32 shows a cross-section image of the fitting part 20c of the slide bracket 20 related to the fitting of the fitted part 2v and the fitted part 3dc. Note that, FIGS. 34A, 34B are cross-sectional image views in the same cross section as that of FIG. 32.

As shown in FIG. 32, when the F cover 2 and the right R cover 3d are fitted by means of the slide bracket 20, the fitted part 2v of the F cover 2 and the fitted part 3dc of the right R cover 3d are disposed so that a pawl part 2va of the fitted part 2v of the F cover 2 may face a pawl part 3dd of the fitted part 3dc of the right R cover 3d in the vertical direction in FIG. 27. As shown in FIGS. 32, 34A, and 34B, when the F cover 2 and the right R cover 3d are fitted by means of the slide bracket 20, the fitting part 20c of the slide bracket 20 abuts against an inclination part 2vb (on a line from an inclination position 2vb0 to an inclination position 2vb1) of the fitted part 2v of the F cover 2 and an inclination part 3de (on a line from an inclination position 3de0 to an inclination position 3de1) of the fitted part 3*dc* of the right R cover 3*d*, in the back and forth direction (in the thickness direction of the image display apparatus main body 50A).

FIG. 33A is a perspective view showing a state prior to fitting the F cover 2 and the right R cover 3 by means of the slide bracket 20. FIG. 33B is a perspective view showing a state after the slide bracket 20 moves in a DR20 direction and fits the F cover 2 and the right R cover 3*d* by means of the slide bracket 20. With regard to the right R cover 3*d*, FIGS. 33A, 33B show only the fitted part 3*dc* for convenience of description. The state of FIG. 33A is the same as the states of FIGS. 34A, 35A. The state of FIG. 33B is the same as the states of FIGS. 34B, 35B. FIG. 35A is a view when an A-a cross section in FIG. 34A is seen from the reference back face 3*b* to the direction of the reference front face 2*b*. FIG. 35B is a view when a B-b cross section in FIG. 34B is seen from the reference back face 3*b* to the direction of the reference front face 2*b*.

In FIGS. 33A, 33B, the fitting part 20*c* of the slide bracket 20 is continuously connected to the second bent section 20*d* in a long side that is different from the long side continuously connected to the first bent section 20*b*. In the tip of the second bent section 20*d*, the tongue part 20*e* continuously connected to the short side of the second bent section 20*d* is formed. The second bent section 20*d* is folded by approximately 90.degree. with respect to the first bent section 20*b* or the fitting part 20*c*, and is formed so as to be generally parallel to the base 20*a*. The tongue part 20*e* inclines at approximately 30.degree. with respect to the second bent section 20*d*. Note that, the angle of the tongue part 20*e* may be suitably set according to the variation amount in manufacturing due to the screen size of the screen display apparatus main body 50A, i.e., the size of the housing 4.

When the slide bracket 20 is attached to the F cover 2 via the male screw ZZa, the long side on the fitting part 20*c* side of the first bent section 20*b* generally abuts against the back side of the fitted part 2*v* of the F cover 2 (see FIG. 22). Thus, when the fitted part 2*v* of the F cover 2 and the fitted part 3*dc* of the right R cover 3*d* are fitted by means of the slide bracket 20, the first bent section 20*b* serves to suppress the fitted part 2*v* against a force pulled to the left side (the center side of the liquid crystal module 1) of the fitted part 2*v* of the F cover 2.

In this embodiment, in order to absorb molding variations due to a thermal shrinkage in the manufacturing of the housing 4, the image display apparatus 50 has both of a configuration for absorbing a molding error in the longitudinal direction (in the horizontal direction of the right R cover 3*d*) of the R cover 3 in fitting and fixing the F cover 2 and the right R cover 3*d* by means of the slide bracket 20 and a configuration for absorbing a molding error in the thickness direction (in the back and forth direction) of the image display apparatus main body 50A. Note that, FIGS. 34A, 34B are views for illustrating the configuration for absorbing a molding error in the thickness direction of the image display apparatus main body 50A. FIGS. 35A, 35B are views for illustrating the configuration for absorbing a molding error in the longitudinal direction of the R cover 3.

FIG. 34A shows a state where the right R cover 3*d* abuts against the F cover 2 without an error in the back and forth direction. If the fitting part 20*c* of the slide bracket 20 is slid in a DR21 direction from the state of FIG. 34A, then as shown in FIG. 34B, the fitting part 20*c* slides to the inclination position 2*vb*1 of the inclination part 2*vb* of the F cover 2 and to the inclination position 3*de*1 of the inclination part 3*de* of the fitted part 3*dc* of the right R cover 3*d*. The fitting part 20*c* completely fits into the fitted part 2*v* and the fitted part 3*dc* by the fitting part 20*c* sliding to the inclination positions 2*vb*1, 3*de*1. Thus, even if a configuration without screwing in the reference front face 2*b* or the reference back face 3*b* is employed in appearance design, a gap in the back and forth direction can be eliminated and the F cover 2 and the R cover 3 can be assembled. Note that, the space (width) between the inclination position 2*vb*1 and the inclination position *de*1 is substantially the same as the thickness of the fitting part 20*c* of the slide bracket 20 at a maximum.

Next, an attachment method in a state where the F cover 2 and the right R cover 3*d* shift from each other in the back and forth direction (a state where a gap is produced between the F cover 2 and the right R cover 3*d*) is described.

Assume, the right R cover 3*d* has a molding error and slightly shrinks as compared with the normal length of the right R cover 3*d* in the back and forth direction and therefore the right R cover 3*d* is disposed at a position backward from the normal position at the time of assembly of the F cover 2 and the right R cover 3*d*, or the right R cover 3*d* imperfectly abuts against the F cover 2 at the time of assembly of the F cover 2 and the right R cover 3*d* and therefore the right R cover 3*d* is disposed at a position backward from the normal position of the right R cover 3*d* and a gap is produced between the F cover 2 and the right R cover 3*d* in the back and forth direction. In a state where a gap is produced between the F cover 2 and the right R cover 3*d*, as shown in FIG. 34A, if a positional deviation amount of the fitted part 3*dc* is within an allowable width Tz, i.e., from the normal position to the inclination position 2*vb*0 of the fitted part 2*v*, then by inserting the male screw ZZb into the through-hole 2*r* and tightening these parts together with the female screw 3*da* provided in the right R cover 3*d*, the fitting part 20*c* can be fitted into the fitted part 2*v* and the fitted part 3*dc*. The fitting part 20*c* abuts against any position on a line from the inclination position 3*de*0 to the inclination position 3*de*1 of the fitted part 3*dc*, and slides in the DR21 direction while pulling in the right R cover 3*d* forward along the inclination part 3*de* in the direction from the inclination position 3*de*0 to the inclination position 3*de*1. Finally, the fitting part 20*c* fits into the fitted part 2*v* and the fitted part 3*dc* in the state shown in FIG. 34B. That is, due to the slide movement of the slide bracket 20, the right R cover 3*d* (and the left R cover 3*e*) is combined with the F cover 2 while being pulled into the F cover 2 side so as to approach the F cover 2.

FIG. 35A shows a state where the F cover 2 and the right R cover 3*d* are abutted against each other without an error in the horizontal direction. If the fitting part 20*c* of the slide bracket 20 is slid in a DR22 direction from the state of FIG. 35A, the fitting part 20*c* will slide to the position of FIG. 35B. This state shows a state where the fitting part 20*c* has slid to the inclination position 2*vb*1 (also to the inclination position 3*de*1), as described in FIG. 34B.

As shown in FIG. 34B, the state where the fitted part 2*v* of the F cover 2 and the fitted part 3*dc* of the right R cover 3*d* house therein the fitting part 20*c* of the slide bracket 20 (the state where the fitting part 20*c* is held between the fitted part 2*v* and the fitted part 3*dc*) turns into a state where the fitted part 2*v* of the F cover 2 and the fitted part 3*dc* of the right R cover 3*d* are completely fitted by means of the slide bracket 20. Thus, in assembling the F cover 2 and the R cover 3, even if the image display apparatus 50 has a configuration without screwing in the reference front face 2*b* or the reference back face 3*b* in appearance design, it is possible to eliminate a deviation (gap) between the F cover 2 and the R cover 3 in the horizontal direction and also possible to assemble the F cover 2 and the R cover 3 without exposing the edge of the R cover 3 to the reference front face 2*b*. Note that, the value of the length (width) of the short side of the fitting part 20*c* is set so as to be substantially equal to a total value of the thickness of the fitted part 2v of the F cover 2 and the thickness of the fitted part 3dc of the right R cover 3d.

Next, an attachment method in a state where a deviation (gap) is produced between the F cover 2 and the right R cover 3d in the horizontal direction is described. As shown in FIG. 35A, the tongue part 20e of the slide bracket 20 includes one end 20e1 connected to the second bent section 20d and other end 20e0 that is a free end.

Assume, the right R cover 3d has a molding error and the right R cover 3d extends slightly outward (rightward) from the normal position in the horizontal direction, or the right R cover 3d imperfectly abuts against the F cover 2 at the time of assembly of the F cover 2 and the right R cover 3d and therefore the right R cover 3d is disposed slightly outward (rightward) from the normal position with respect to the F cover 2. In the state where the right R cover 3d is disposed rightward from the normal position with respect to the F cover 2, as shown in FIG. 35A, if the positional deviation amount of the fitted part 3dc is within an allowable width Tx i.e., from the normal position to the end 20e0 of the tongue part 20e, then by inserting the male screw ZZd into the through-hole 2r and tightening these parts together with the female screw 3da provided in the right R cover 3d, the fitting part 20c can be fitted into the fitted part 2v and the fitted part 3dc. The fitting part 20c slides in the DR22 direction while the fitted part 3dc abuts against any position on a line from the position 20e0 to the position 20e1 of the tongue part 20e and pulls in the right R cover 3d leftward along the inclination in the direction from the position 20e0 to the position 20e1. Finally, the fitting part 20c fits into the fitted part 2v and the fitted part 3dc, in the state shown in FIG. 35B.

According to the above-described fitting configuration, when the F cover 2 and R cover 3 having molding variations due to a thermal shrinkage in manufacturing (that is, having different amounts of thermal shrinkage) are assembled, the molding errors in the thickness direction (back and forth direction) and in the horizontal direction of the image display apparatus main body 50A can be simultaneously absorbed with a simple configuration. As described in FIGS. 24 to 26, by having the F cover 2 opposed to the R cover 3 and combining these covers so that the bent section of the R cover 3 becomes perpendicular to the bent section of the F cover 2, the allowable range of the combined molding error of the F cover 2 and the R cover 3 can be further extended. In this case, by exposing the end on the long side and the end on the short side of one cover (F cover 2 in this embodiment) among the F cover 2 and the R cover 3 to the outside of the housing 4, and also by housing the ends on the long side and short side of the other cover (R cover 3 in this embodiment) among the F cover 2 and the R cover 3 into the housing 4, the allowable range of the combined molding error of the F cover 2 and the R cover 3 can be extended.

In the embodiment of the present invention, in the assembly configuration of the housing 4 comprising the F cover 2 (front cover) and the R cover 3 (rear cover), the F cover 2 and the R cover 3 are combined by causing the end face of the R cover 3 to face (abut against) the inner face on the upper side of the F cover 2, the inner face on the lower side thereof, and the inner faces of the right and left edges thereof. That is, the end face of the R cover 3 cannot be viewed from the outside and only the end face of the F cover 2 can be viewed from the outside. Thanks to this configuration, even if a variation in dimensions or a distortion due to thermal shrinkage, a residual stress, or the like occurs when the F cover 2 and the R cover 3 are injection-molded using plastic, the deviation or distortion in the combined portion of the F cover 2 and R cover 3 is extremely inconspicuous. Moreover, the number of male screws used at the time of assembly of the F cover 2 and the R cover 3 can be significantly reduced as compared with the conventional image display apparatus. Furthermore, on the back face and side face of the housing 4, the male screw cannot be viewed from the outside and therefore the appearance quality of the housing 4 can be improved.

In the inner faces of the F cover 2 and R cover 3, U-shaped or L-shaped arms opened to the same side (e.g., to the upper side) are provided, respectively, so that these openings may overlap with each other in a state where the F cover 2 and the R cover 3 are combined. Moreover, a slide bracket that slides and engages with these openings is disposed in the inside of one cover among the F cover 2 and the R cover 3, and after the F cover 2 and the R cover 3 are combined, the slide bracket is engaged with the openings using screws from the outside of the housing 4, thereby pulling in the F cover 2 and the R cover 3 so as to approach each other and combining the same. Thus, the F cover 2 and the R cover 3 can be assembled firmly without fastening the back face side and the side face side of the housing 4 by means of male screws. As a result, even if there is a variation in dimensions, a distortion, or a bend of the F cover 2 and the R cover 3, these variation, distortion, and bend are inconspicuous from the outside and the housing 4 with an excellent quality can be assembled. These configurations are applied suitably to the housing of the image display apparatus. In particular, the larger the display screen size of the image display apparatus becomes, the greater effect can be obtained.

Note that the embodiment of the present invention is not limited to the above-described configuration and may be modified without departing from the gist of the present invention.

In this embodiment, the slide bracket 20 is disposed on the short side of the housing 4, however, the slide bracket 20 may be disposed on the long side of the housing 4.

In this embodiment, the F cover 2 and the R cover 3 are formed in a generally U-shape, however, the shapes of the F cover 2 and the R cover 3 are not limited thereto. For example, four sides of the F cover 2 may have side walls while the four sides of the R cover 3 may not have the side wall. Moreover, four sides of the F cover 2 and the four sides of the R cover 3 may have side walls. As with this embodiment, the image display apparatus 50 has a side wall formed on the long side (or short side) of the F cover 2, and has a side wall formed on the short side (or long side) of the R cover 3 whereby the allowable range of the combined molding error of the F cover 2 and the R cover 3 can be extended. Therefore, the probability of occurrence of a defective product can be suppressed and the manufacturing cost of the image display apparatus 50 can be suppressed.

According to this embodiment or an alternative embodiment of this embodiment, in a large-size image display apparatus, even if a housing comprising a molding member made of plastic is used in order to achieve a reduction in the mass of the apparatus, a thermal shrinking error due to injection molding in manufacturing the housing is absorbed at the time of assembly of the F cover and the R cover. Accordingly, the cost, quality, and assembly performances of the housing can be maintained. Moreover, since the number of screws can be reduced at the time of assembly of the F cover and the R cover, the number of components of the image display apparatus and the assembly man-hours thereof can be reduced and also the interior nature of the image display apparatus can be improved without degrading the aesthetic appearance in appearance design in large-size image display apparatuses.

What is claimed is:

1. An image display apparatus comprising:
an image display apparatus main body, wherein the image display main body includes:
  a display module that displays an image on a front face thereof;
  a columnar member that is connected to a back face of the display module, wherein a part thereof is exposed to an outside;
  a rear cover that is connected to the columnar member and covers the back face of the display module; and
  a supported part that is provided protruding backward from the columnar member; and
a pedestal part that supports the image display apparatus main body, wherein the pedestal part includes:
  a bottom plate part;
  a column that is provided in the bottom plate part; and
  a supporting part that is provided in the column and supports the image display apparatus main body via the supported part.

2. The image display apparatus according to claim 1, wherein the supporting part supports the supported part rotatably about an axis line extending in a vertical direction when the pedestal part is horizontally installed.

3. The image display apparatus according to claim 1, wherein the display module is connected to the column via a metallic material.

4. The image display apparatus according to claim 1, wherein the image display main body further includes at least one other supported part that is provided protruding backward from the columnar member,
  wherein a supporting member of the pedestal part supports the image display apparatus via the supported part and the at least one other supported part, and
  wherein the supported part and the at least one other supported part are arranged spaced apart from each other in a vertical direction in a state where the image display apparatus is installed.

5. An image display apparatus comprising:
a display module that has on a front face thereof a display face for displaying an image;
a columnar member that is connected to a rear face of the display module; and
a housing that houses the display module therein,
  wherein the columnar member includes a base that connects sides of the display module, the sides facing each other, and
  wherein the base is exposed to an outside as a part of the housing.

6. The image display apparatus according to claim 5, further comprising a supporting part that supports the housing,
  wherein the supporting part is fixed to a position symmetric with respect to a center portion of the columnar member in a longitudinal direction thereof.

7. The image display apparatus according to claim 5, wherein the housing and the base of the columnar member are continuously formed without a step on the same plane in a back face of the image display apparatus.

8. The image display apparatus according to claim 5, wherein a through-hole or groove extending in parallel to a long side of the base is formed on the display module side of the base.

9. The image display apparatus according to claim 8, wherein the columnar member is installed 80 that a longitudinal direction of the columnar member becomes a vertical direction, and
  wherein the housing includes a through hole corresponding to an upper opening of the through-hole or the groove.

10. An image display apparatus comprising:
a rectangular and tabular image display module; and
a housing that houses the image display module, wherein the housing includes:
  a first cover that has a rectangular profile, is disposed so as to cover at least a part of one face side of the image display module, and has flange parts each protruding toward other face side of the image display module in a first pair of edges facing each other; and
  a second cover that has a rectangular profile, is disposed so as to cover at least a part of the other face side of the image display module, and has bent parts each being bent so that an end face faces the first cover, in a second pair of edges not facing the first pair of edges,
  wherein the end faces of the bent parts in the second cover face and abut on or come close to an inner face of a third pair of edges different from the first pair of edges in the first cover, and
  wherein the first cover is combined with the second cover so that end faces of a fourth pair of edges different from the second pair of edges in the second cover face and abut on or come close to an inner face of the flange parts in the first cover.

* * * * *